United States Patent
Schomer et al.

(10) Patent No.: US 12,498,363 B2
(45) Date of Patent: Dec. 16, 2025

(54) COMBINED INVASION AND CYTOTOXICITY ASSAY USING CHEMOKINE SECRETING TARGET CELLS

(71) Applicant: NantKwest, Inc., San Diego, CA (US)

(72) Inventors: Nathan Thomas Schomer, San Diego, CA (US); Laurent H. Boissel, San Diego, CA (US); Hans G. Klingemann, San Diego, CA (US)

(73) Assignee: ImmunityBio, Inc., San Diego, CA (US)

( * ) Notice: Subject to any disclaimer, the term of this patent is extended or adjusted under 35 U.S.C. 154(b) by 1052 days.

(21) Appl. No.: 17/264,601

(22) PCT Filed: Aug. 1, 2019

(86) PCT No.: PCT/US2019/044652
§ 371 (c)(1),
(2) Date: Jan. 29, 2021

(87) PCT Pub. No.: WO2020/028654
PCT Pub. Date: Feb. 6, 2020

(65) Prior Publication Data
US 2021/0293787 A1    Sep. 23, 2021

Related U.S. Application Data

(60) Provisional application No. 62/713,287, filed on Aug. 1, 2018.

(51) Int. Cl.
| | |
|---|---|
| *G01N 33/50* | (2006.01) |
| *A61K 40/15* | (2025.01) |
| *A61K 40/31* | (2025.01) |
| *A61K 40/42* | (2025.01) |

(52) U.S. Cl.
CPC ......... *G01N 33/5029* (2013.01); *A61K 40/15* (2025.01); *A61K 40/31* (2025.01); *A61K 40/4202* (2025.01); *A61K 40/4211* (2025.01); *A61K 40/4219* (2025.01); *A61K 40/4234* (2025.01); *G01N 33/5047* (2013.01); *G01N 2333/521* (2013.01)

(58) Field of Classification Search
CPC ........... G01N 33/5029; G01N 33/5047; G01N 2333/521; A61K 40/15; A61K 40/31; A61K 40/4202; A61K 40/4211; A61K 40/4219; A61K 40/4234; A61K 39/4613; A61K 39/4631; A61K 39/464402; A61K 39/464412; A61K 39/464421; A61K 39/46444; C07K 14/7051; C07K 2319/03; C12M 41/46

See application file for complete search history.

(56) References Cited

U.S. PATENT DOCUMENTS

| | | |
|---|---|---|
| 2018/0163176 A1 | 6/2018 | Lee |
| 2021/0198342 A1 | 7/2021 | Boissel et al. |

OTHER PUBLICATIONS

Berencsi et al. Journal of Translational Medicine, 9:33 (Year: 2011).*
Zhang et al., Int. J. Mol. Sci., 20(2): 317, published Jan. 14, 2019.*
Teng et al., Human Gene Therapy, 17:1134-43 (Year: 2006).*
Ward et al., Frontiers in Immunology, vol. 9, article 2231, October 2018.*
Kahlmann et al, BMC Genetics, 8:33 (Year: 2007).*
Wang et al. Cancer Immunol Immunother., 66:537-548, Feb. 9, 2017.*
Berahovich et al., J Immunology, 177(11): 7833-40, 2006 and Peng et al., Int J Mol Sci, 19(5): 1366, May 2018.*
Peng et al., Int J Mol Sci, 19(5): 1366, May 2018.*
Tomlin et al., Chapter 6, in Natural Killer Cells: Methods and Protocols, Methods in Molecular Biology, vol. 1441, Springer Science (Year: 2016).*
International Search Report and Written Opinion from PCT/US2019/044652, dated Oct. 30, 2019, 15 pages.
Kremer, et al., "Genetic engineering of human NK cells to express CXCR2 improves migration to renal cell carcinoma," Journal for ImmunoTherapy of Cancer, 2017, 5:73, 13 pages.
Lin, et al., "Natural killer cells suppress enzalutamide resistance and cell invasion in the castration resistant prostate cancer via targeting the androgen receptor splicing variant 7 (Arv7)," Cancer Letters 398, 2017, pp. 62-69.
Klingemann, et al., "Natural Killer Cells for Immunotherapy—Advantages of the NK-92 Cell Line over Blood NK Cells," Frontiers in Immunology, 2016, 7:91, pp. 1-7.

(Continued)

*Primary Examiner* — Kimberly Ballard
*Assistant Examiner* — Stacey N Macfarlane
(74) *Attorney, Agent, or Firm* — Kilpatrick Townsend & Stockton LLP

(57) ABSTRACT

Provided herein are compositions and methods for detecting migration of effector cells towards a target cell, and cytotoxicity of the migrated effector cells against the target cells. The effector cells are modified to express a homing or migratory receptor, and the target cells are modified to express the cognate ligand. The methods can be carried out in a Boyden chamber or tranwells with a porous membrane between the wells. The membrane can be coated with an extracellular matrix component to simulate a solid tumor environment.

13 Claims, 12 Drawing Sheets
Specification includes a Sequence Listing.

(56) References Cited

OTHER PUBLICATIONS

Carlsten, et al., "Efficient mRNA-Based Genetic Engineering of Human NK Cells with High-Affinity CD16 and CCR7 Augments Rituximab-Induced ADCC against Lymphoma and Targets NK Cell Migration toward the Lymph Node-Associated Chemokine CCL19," Frontiers in Immunology, 2016, 7:105, pp. 1-9.
Schomer, et al, "Providing a Homing Receptor for CAR Engineered NK Cells—Improving Cellular Immunotherapy for B-Cell Lymphoma," Blood, 2018, 132:4547, pp. 1-5.
Hughes, Catherine E, and Robert J B Nibbs. "A guide to chemokines and their receptors." The FEBS Journal vol. 285,16 (2018): 2944-2971. doi:10.1111/febs.14466.
Sadelain, Michel et al. "The basic principles of chimeric antigen receptor design." Cancer Discovery vol. 3,4 (2013): 388-98. doi:10.1158/2159-8290.CD-12-0548.
Ahmed, Nabil et al. "Human Epidermal Growth Factor Receptor 2 (HER2)—Specific Chimeric Antigen Receptor-Modified T Cells for the Immunotherapy of HER2-Positive Sarcoma." Journal of Clinical Oncology : Official Journal of the American Society of Clinical Oncology vol. 33,15 (2015): 1688-96.
Mardiros, Armen et al. "T Cells Expressing CD123 Chimeric Antigen Receptors for Treatment of Acute Myeloid Leukemia." Current Opinion in Hematology vol. 22,6 (2015): 484-8.

\* cited by examiner

SEQUENCE LISTING

```
<160> NUMBER OF SEQ ID NOS: 115

<210> SEQ ID NO 1
<211> LENGTH: 297
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 1
atggccctgc tactggccct cagcctgctg gttctctgga cttccccagc cccaactctg      60
agtggcacca atgatgctga agactgctgc ctgtctgtga cccagaaacc catccctggg     120
tacatcgtga ggaacttcca ctaccttctc atcaaggatg gctgcagggt gcctgctgta     180
gtgttcacca cactgagggg ccgccagctc tgtgcacccc agaccagcc ctgggtagaa      240 cgcatcatcc agagactgca gaggacctca gccaagatga agcgccgcag cagttaa         297

<210> SEQ ID NO 2
<211> LENGTH: 98
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 2

Met Ala Leu Leu Leu Ala Leu Ser Leu Leu Val Leu Trp Thr Ser Pro
1               5                   10                  15

Ala Pro Thr Leu Ser Gly Thr Asn Asp Ala Glu Asp Cys Cys Leu Ser
                20                  25                  30

Val Thr Gln Lys Pro Ile Pro Gly Tyr Ile Val Arg Asn Phe His Tyr
            35                  40                  45

Leu Leu Ile Lys Asp Gly Cys Arg Val Pro Ala Val Val Phe Thr Thr
        50                  55                  60

Leu Arg Gly Arg Gln Leu Cys Ala Pro Pro Asp Gln Pro Trp Val Glu
65                  70                  75                  80

Arg Ile Ile Gln Arg Leu Gln Arg Thr Ser Ala Lys Met Lys Arg Arg
                85                  90                  95

Ser Ser

<210> SEQ ID NO 3
```

<211> LENGTH: 405
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 3

```
atggctcagt cactggctct gagcctcctt atcctggttc tggcctttgg catccccagg      60
acccaaggca gtgatggagg ggctcaggac tgttgcctca gtacagcca aaggaagatt     120
cccgccaagg ttgtccgcag ctaccggaag caggaaccaa gcttaggctg ctccatccca    180
gctatcctgt tcttgccccg caagcgctct caggcagagc tatgtgcaga cccaaaggag    240
ctctgggtgc agcagctgat gcagcatctg gacaagacac atccccaca gaaaccagcc     300
cagggctgca ggaaggacag ggggccctcc aagactggca gaaaggaaa gggctccaaa    360
ggctgcaaga ggactgagcg gtcacagacc cctaaagggc catag                     405
```

<210> SEQ ID NO 4
<211> LENGTH: 134
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 4

```
Met Ala Gln Ser Leu Ala Leu Ser Leu Leu Ile Leu Val Leu Ala Phe
1               5                   10                  15
Gly Ile Pro Arg Thr Gln Gly Ser Asp Gly Gly Ala Gln Asp Cys Cys
            20                  25                  30
Leu Lys Tyr Ser Gln Arg Lys Ile Pro Ala Lys Val Val Arg Ser Tyr
        35                  40                  45
Arg Lys Gln Glu Pro Ser Leu Gly Cys Ser Ile Pro Ala Ile Leu Phe
    50                  55                  60
Leu Pro Arg Lys Arg Ser Gln Ala Glu Leu Cys Ala Asp Pro Lys Glu
65                  70                  75                  80
Leu Trp Val Gln Gln Leu Met Gln His Leu Asp Lys Thr Pro Ser Pro
                85                  90                  95
Gln Lys Pro Ala Gln Gly Cys Arg Lys Asp Arg Gly Ala Ser Lys Thr
            100                 105                 110
Gly Lys Lys Gly Lys Gly Ser Lys Gly Cys Lys Arg Thr Glu Arg Ser
        115                 120                 125
Gln Thr Pro Lys Gly Pro
    130
```

<210> SEQ ID NO 5
<211> LENGTH: 300
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 5

```
atgacttcca agctggccgt ggctctcttg gcagccttcc tgatttctgc agctctgtgt      60
gaaggtgcag ttttgccaag gagtgctaaa gaacttagat gtcagtgcat aaagacatac    120
```

```
tccaaaccctt tccaccccaa atttatcaaa gaactgagag tgattgagag tggaccacac    180
tgcgccaaca cagaaattat tgtaaagctt tctgatggaa gagagctctg tctggacccc    240
aaggaaaact gggtgcagag ggttgtggag aagtttttga agagggctga gaattcataa    300
```

```
<210> SEQ ID NO 6
<211> LENGTH: 99
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 6
```

Met Thr Ser Lys Leu Ala Val Ala Leu Leu Ala Ala Phe Leu Ile Ser
1               5                   10                  15

Ala Ala Leu Cys Glu Gly Ala Val Leu Pro Arg Ser Ala Lys Glu Leu
                20                  25                  30

Arg Cys Gln Cys Ile Lys Thr Tyr Ser Lys Pro Phe His Pro Lys Phe
            35                  40                  45

Ile Lys Glu Leu Arg Val Ile Glu Ser Gly Pro His Cys Ala Asn Thr
        50                  55                  60

Glu Ile Ile Val Lys Leu Ser Asp Gly Arg Glu Leu Cys Leu Asp Pro
65                  70                  75                  80

Lys Glu Asn Trp Val Gln Arg Val Val Glu Lys Phe Leu Lys Arg Ala
                85                  90                  95

Glu Asn Ser

```
<210> SEQ ID NO 7
<211> LENGTH: 324
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 7
atggcccgcg ctgctctctc cgccgccccc agcaatcccc ggctcctgcg agtggcactg    60
ctgctcctgc tcctggtagc cgctggccgg cgcgcagcag gagcgtccgt ggccactgaa   120
ctgcgctgcc agtgcttgca gaccctgcag ggaattcacc ccaagaacat ccaaagtgtg   180
aacgtgaagt cccccggacc ccactgcgcc caaaccgaag tcatagccac actcaagaat   240
gggcggaaag cttgcctcaa tcctgcatcc cccatagtta agaaaatcat cgaaaagatg   300
ctgaacagtg acaaatccaa ctga                                          324
```

```
<210> SEQ ID NO 8
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 8
```

Met Ala Arg Ala Ala Leu Ser Ala Ala Pro Ser Asn Pro Arg Leu Leu
1               5                   10                  15

Arg Val Ala Leu Leu Leu Leu Leu Val Ala Ala Gly Arg Arg Ala
                20                  25                  30

Ala Gly Ala Ser Val Ala Thr Glu Leu Arg Cys Gln Cys Leu Gln Thr
                35                  40                  45

Leu Gln Gly Ile His Pro Lys Asn Ile Gln Ser Val Asn Val Lys Ser
        50                  55                  60

Pro Gly Pro His Cys Ala Gln Thr Glu Val Ile Ala Thr Leu Lys Asn
65                  70                  75                  80

Gly Arg Lys Ala Cys Leu Asn Pro Ala Ser Pro Ile Val Lys Lys Ile
                85                  90                  95

Ile Glu Lys Met Leu Asn Ser Asp Lys Ser Asn
                100                 105

<210> SEQ ID NO 9
<211> LENGTH: 336
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 9
atgtccctgc tcccacgccg cgcccctccg gtcagcatga ggctcctggc ggccgcgctg      60
ctcctgctgc tgctggcgct gtacaccgcg cgtgtggacg ggtccaaatg caagtgctcc     120
cggaagggac ccaagatccg ctacagcgac gtgaagaagc tggaaatgaa gccaaagtac     180
ccgcactgcg aggagaagat ggttatcatc accaccaaga gcgtgtccag gtaccgaggt     240
caggagcact gcctgcaccc caagctgcag agcaccaagc gcttcatcaa gtggtacaac     300
gcctggaacg agaagcgcag ggtctacgaa gaatag                               336

<210> SEQ ID NO 10
<211> LENGTH: 111
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 10

Met Ser Leu Leu Pro Arg Arg Ala Pro Pro Val Ser Met Arg Leu Leu
1               5                   10                  15

Ala Ala Ala Leu Leu Leu Leu Leu Ala Leu Tyr Thr Ala Arg Val
                20                  25                  30

Asp Gly Ser Lys Cys Lys Cys Ser Arg Lys Gly Pro Lys Ile Arg Tyr
                35                  40                  45

Ser Asp Val Lys Lys Leu Glu Met Lys Pro Lys Tyr Pro His Cys Glu
        50                  55                  60

Glu Lys Met Val Ile Ile Thr Thr Lys Ser Val Ser Arg Tyr Arg Gly
65                  70                  75                  80

Gln Glu His Cys Leu His Pro Lys Leu Gln Ser Thr Lys Arg Phe Ile
                85                  90                  95

Lys Trp Tyr Asn Ala Trp Asn Glu Lys Arg Arg Val Tyr Glu Glu
                100                 105                 110

<210> SEQ ID NO 11
<211> LENGTH: 1119
<212> TYPE: DNA
<213> ORGANISM: Artificial Sequence
<220> FEATURE:

<221> NAME/KEY: source
<223> OTHER INFORMATION: /note="Description of Artificial Sequence:
      Synthetic polynucleotide"

<400> SEQUENCE: 11

```
atgatatttc catggaaatg tcagagcacc cagagggact tatggaacat cttcaagttg    60
tgggggtgga caatgctctg ttgtgatttc ctggcacatc atggaaccga ctgctggact   120
taccattatt ctgaaaaacc catgaactgg caaagggcta aagattctg ccgagacaat    180
tacacagatt tagttgccat acaaaacaag gcggaaattg agtatctgga aagactctg    240
cctttcagtc gttcttacta ctggatagga atccggaaga taggaggaat atggacgtgg   300
gtgggaacca acaaatctct tactgaagaa gcagagaact ggggagatgg tgagcccaac   360
aacaagaaga acaaggagga ctgcgtggag atctatatca agagaaacaa agatgcaggc   420
aaatggaacg atgacgcctg ccacaaacta aaggcagccc tctgttacac agcttcttgc   480
cagccctggt catgcagtgg ccatggagaa tgtgtagaaa tcatcaataa ttacacctgc   540
aactgtgatg tggggtacta tgggcccag tgtcagtttg tgattcagtg tgagcctttg    600
gaggccccag agctgggtac catggactgt actcacccct tgggaaactt cagcttcagc   660
tcacagtgtg ccttcagctg ctctgaagga acaaacttaa ctgggattga agaaccacc    720
tgtggaccat ttggaaactg gtcatctcca gaaccaacct gtcaagtgat tcagtgtgag   780
cctctatcag caccagattt ggggatcatg aactgtagcc atccctggc cagcttcagc    840
tttacctctg catgtacctt catctgctca gaaggaactg agttaattgg gaagaagaaa   900
accatttgtg aatcatctgg aatctggtca atcctagtc caatatgtca aaaattggac    960
aaaagtttct caatgattaa ggagggtgat tataacccc tcttcattcc agtggcagtc  1020
atggttactg cattctctgg gttggcattt atcattggc tggcaaggag attaaaaaaa  1080
ggcaagaaat ccaagagaag tatgaatgac ccatattaa                         1119
```

<210> SEQ ID NO 12
<211> LENGTH: 372
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 12

```
Met Ile Phe Pro Trp Lys Cys Gln Ser Thr Gln Arg Asp Leu Trp Asn
1               5                   10                  15

Ile Phe Lys Leu Trp Gly Trp Thr Met Leu Cys Cys Asp Phe Leu Ala
            20                  25                  30

His His Gly Thr Asp Cys Trp Thr Tyr His Tyr Ser Glu Lys Pro Met
        35                  40                  45

Asn Trp Gln Arg Ala Arg Arg Phe Cys Arg Asp Asn Tyr Thr Asp Leu
    50                  55                  60

Val Ala Ile Gln Asn Lys Ala Glu Ile Glu Tyr Leu Glu Lys Thr Leu
65                  70                  75                  80

Pro Phe Ser Arg Ser Tyr Tyr Trp Ile Gly Ile Arg Lys Ile Gly Gly
                85                  90                  95

Ile Trp Thr Trp Val Gly Thr Asn Lys Ser Leu Thr Glu Glu Ala Glu
            100                 105                 110

Asn Trp Gly Asp Gly Glu Pro Asn Asn Lys Lys Asn Lys Glu Asp Cys
        115                 120                 125
```

Val Glu Ile Tyr Ile Lys Arg Asn Lys Asp Ala Gly Lys Trp Asn Asp
130                 135                 140

Asp Ala Cys His Lys Leu Lys Ala Ala Leu Cys Tyr Thr Ala Ser Cys
145                 150                 155                 160

Gln Pro Trp Ser Cys Ser Gly His Gly Glu Cys Val Glu Ile Ile Asn
                165                 170                 175

Asn Tyr Thr Cys Asn Cys Asp Val Gly Tyr Tyr Gly Pro Gln Cys Gln
                180                 185                 190

Phe Val Ile Gln Cys Glu Pro Leu Glu Ala Pro Glu Leu Gly Thr Met
            195                 200                 205

Asp Cys Thr His Pro Leu Gly Asn Phe Ser Phe Ser Gln Cys Ala
210                 215                 220

Phe Ser Cys Ser Glu Gly Thr Asn Leu Thr Gly Ile Glu Glu Thr Thr
225                 230                 235                 240

Cys Gly Pro Phe Gly Asn Trp Ser Ser Pro Glu Pro Thr Cys Gln Val
                245                 250                 255

Ile Gln Cys Glu Pro Leu Ser Ala Pro Asp Leu Gly Ile Met Asn Cys
                260                 265                 270

Ser His Pro Leu Ala Ser Phe Ser Phe Thr Ser Ala Cys Thr Phe Ile
            275                 280                 285

Cys Ser Glu Gly Thr Glu Leu Ile Gly Lys Lys Thr Ile Cys Glu
290                 295                 300

Ser Ser Gly Ile Trp Ser Asn Pro Ser Pro Ile Cys Gln Lys Leu Asp
305                 310                 315                 320

Lys Ser Phe Ser Met Ile Lys Glu Gly Asp Tyr Asn Pro Leu Phe Ile
                325                 330                 335

Pro Val Ala Val Met Val Thr Ala Phe Ser Gly Leu Ala Phe Ile Ile
            340                 345                 350

Trp Leu Ala Arg Arg Leu Lys Lys Gly Lys Lys Ser Lys Arg Ser Met
            355                 360                 365

Asn Asp Pro Tyr
370

<210> SEQ ID NO 13
<211> LENGTH: 1116
<212> TYPE: DNA
<213> ORGANISM: Artificial Sequence
<220> FEATURE:
<221> NAME/KEY: source
<223> OTHER INFORMATION: /note="Description of Artificial Sequence:
    Synthetic polynucleotide"

<400> SEQUENCE: 13
atgaaaagcg tgctggtggt ggctctcctt gtcattttcc aggtatgcct gtgtcaagat    60
gaggtcacgg acgattacat cggagacaac accacagtgg actacacttt gttcgagtct   120
ttgtgctcca agaaggacgt gcggaacttt aaagcctggt tcctccctat catgtactcc   180
atcatttgtt tcgtgggcct actgggcaat gggctggtcg tgttgaccta tatctatttc   240
aagaggctca agaccatgac cgataccctac ctgctcaacc tggcggtggc agacatcctc   300
ttcctcctga cccttccctt ctgggcctac agcgcggcca gtcctgggt cttcggtgtc   360 cacttttgca agctcatctt tgccatctac aagatgagct tcttcagtgg catgctccta   420
cttctttgca tcagcattga ccgctacgtg gccatcgtcc aggctgtctc agctcaccgc   480
caccgtgccc gcgtccttct catcagcaag ctgtcctgtg tgggcatctg gatactagcc   540

```
acagtgctct ccatcccaga gctcctgtac agtgacctcc agaggagcag cagtgagcaa         600
gcgatgcgat gctctctcat cacagagcat gtggaggcct ttatcaccat ccaggtggcc         660
cagatggtga tcggctttct ggtccccctg ctggccatga gcttctgtta ccttgtcatc         720
atccgcaccc tgctccaggc acgcaacttt gagcgcaaca aggccatcaa ggtgatcatc         780
gctgtggtcg tggtcttcat agtcttccag ctgccctaca atggggtggt cctggcccag         840
acggtggcca acttcaacat caccagtagc acctgtgagc tcagtaagca actcaacatc         900
gcctacgacg tcacctacag cctggcctgc gtccgctgct gcgtcaaccc tttcttgtac         960
gccttcatcg gcgtcaagtt ccgcaacgat ctcttcaagc tcttcaagga cctgggctgc        1020
ctcagccagg agcagctccg gcagtggtct tcctgtcggc acatccggcg ctcctccatg        1080
agtgtggagg ccgagaccac caccaccttc tcccca                                  1116
```

<210> SEQ ID NO 14
<211> LENGTH: 372
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 14

```
Met Lys Ser Val Leu Val Ala Leu Leu Val Ile Phe Gln Val Cys
1               5                   10                  15

Leu Cys Gln Asp Glu Val Thr Asp Tyr Ile Gly Asp Asn Thr Thr
            20                  25                  30

Val Asp Tyr Thr Leu Phe Glu Ser Leu Cys Ser Lys Lys Asp Val Arg
            35                  40                  45

Asn Phe Lys Ala Trp Phe Leu Pro Ile Met Tyr Ser Ile Ile Cys Phe
    50                  55                  60

Val Gly Leu Leu Gly Asn Gly Leu Val Val Leu Thr Tyr Ile Tyr Phe
65                  70                  75                  80

Lys Arg Leu Lys Thr Met Thr Asp Thr Tyr Leu Leu Asn Leu Ala Val
                85                  90                  95

Ala Asp Ile Leu Phe Leu Leu Thr Leu Pro Phe Trp Ala Tyr Ser Ala
            100                 105                 110

Ala Lys Ser Trp Val Phe Gly Val His Phe Cys Lys Leu Ile Phe Ala
            115                 120                 125

Ile Tyr Lys Met Ser Phe Phe Ser Gly Met Leu Leu Leu Leu Cys Ile
        130                 135                 140

Ser Ile Asp Arg Tyr Val Ala Ile Val Gln Ala Val Ser Ala His Arg
145                 150                 155                 160

His Arg Ala Arg Val Leu Leu Ile Ser Lys Leu Ser Cys Val Gly Ile
                165                 170                 175

Trp Ile Leu Ala Thr Val Leu Ser Ile Pro Glu Leu Leu Tyr Ser Asp
            180                 185                 190

Leu Gln Arg Ser Ser Ser Glu Gln Ala Met Arg Cys Ser Leu Ile Thr
        195                 200                 205

Glu His Val Glu Ala Phe Ile Thr Ile Gln Val Ala Gln Met Val Ile
    210                 215                 220

Gly Phe Leu Val Pro Leu Leu Ala Met Ser Phe Cys Tyr Leu Val Ile
225                 230                 235                 240

Ile Arg Thr Leu Leu Gln Ala Arg Asn Phe Glu Arg Asn Lys Ala Ile
                245                 250                 255
```

Lys Val Ile Ile Ala Val Val Val Phe Ile Val Phe Gln Leu Pro
              260                 265                 270

Tyr Asn Gly Val Val Leu Ala Gln Thr Val Ala Asn Phe Asn Ile Thr
          275                 280                 285

Ser Ser Thr Cys Glu Leu Ser Lys Gln Leu Asn Ile Ala Tyr Asp Val
    290                 295                 300

Thr Tyr Ser Leu Ala Cys Val Arg Cys Cys Val Asn Pro Phe Leu Tyr
305                 310                 315                 320

Ala Phe Ile Gly Val Lys Phe Arg Asn Asp Leu Phe Lys Leu Phe Lys
                325                 330                 335

Asp Leu Gly Cys Leu Ser Gln Glu Gln Leu Arg Gln Trp Ser Ser Cys
              340                 345                 350

Arg His Ile Arg Arg Ser Ser Met Ser Val Glu Ala Glu Thr Thr Thr
          355                 360                 365

Thr Phe Ser Pro
    370

<210> SEQ ID NO 15
<211> LENGTH: 1083
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 15
atggaagatt ttaacatgga gagtgacagc tttgaagatt tctggaaagg tgaagatctt      60
agtaattaca gttacagctc taccctgccc cctttctac tagatgccgc cccatgtgaa      120
ccagaatccc tggaaatcaa caagtatttt gtggtcatta tctatgccct ggtattcctg     180
ctgagcctgc tgggaaactc cctcgtgatg ctggtcatct tatacagcag gtcggccgc      240 tccgtcactg atgtctacct gctgaaccta gccttggccg acctactctt tgccctgacc     300
ttgcccatct gggccgcctc caaggtgaat ggctggattt ttggcacatt cctgtgcaag     360
gtggtctcac tcctgaagga agtcaacttc tatagtggca cctgctact ggcctgcatc      420 agtgtggacc gttacctggc cattgtccat gccacacgca cactgaccca gaagcgctac     480
ttggtcaaat tcatatgtct cagcatctgg ggtctgtcct tgctcctggc cctgcctgtc     540
ttacttttcc gaaggaccgt ctactcatcc aatgttagcc agcctgcta tgaggacatg      600 ggcaacaata cagcaaactg gcggatgctg ttacggatcc tgccccagtc ctttggcttc     660
atcgtgccac tgctgatcat gctgttctgc tacggattca ccctgcgtac gctgtttaag     720
gcccacatgg ggcagaagca ccgggccatg cgggtcatct ttgctgtcgt cctcatcttc     780
ctgctctgct ggctgcccta caacctggtc ctgctggcag acaccctcat gaggacccag     840
gtgatccagg agacctgtga gcgccgcaat acatcgacc gggctctgga tgccaccgag     900
attctgggca tccttcacag ctgcctcaac ccctcatct acgccttcat ggccagaag       960 tttcgccatg gactcctcaa gattctagct atacatggct tgatcagcaa ggactccctg    1020
cccaaagaca gcaggccttc ctttgttggc tcttcttcag ggcacacttc cactactctc    1080
taa                                                                 1083

<210> SEQ ID NO 16
<211> LENGTH: 360
<212> TYPE: PRT

<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 16

Met Glu Asp Phe Asn Met Glu Ser Asp Ser Phe Glu Asp Phe Trp Lys
1               5                   10                  15

Gly Glu Asp Leu Ser Asn Tyr Ser Tyr Ser Ser Thr Leu Pro Pro Phe
            20                  25                  30

Leu Leu Asp Ala Ala Pro Cys Glu Pro Glu Ser Leu Glu Ile Asn Lys
        35                  40                  45

Tyr Phe Val Val Ile Ile Tyr Ala Leu Val Phe Leu Leu Ser Leu Leu
50                  55                  60

Gly Asn Ser Leu Val Met Leu Val Ile Leu Tyr Ser Arg Val Gly Arg
65                  70                  75                  80

Ser Val Thr Asp Val Tyr Leu Leu Asn Leu Ala Leu Ala Asp Leu Leu
                85                  90                  95

Phe Ala Leu Thr Leu Pro Ile Trp Ala Ala Ser Lys Val Asn Gly Trp
            100                 105                 110

Ile Phe Gly Thr Phe Leu Cys Lys Val Val Ser Leu Leu Lys Glu Val
        115                 120                 125

Asn Phe Tyr Ser Gly Ile Leu Leu Leu Ala Cys Ile Ser Val Asp Arg
130                 135                 140

Tyr Leu Ala Ile Val His Ala Thr Arg Thr Leu Thr Gln Lys Arg Tyr
145                 150                 155                 160

Leu Val Lys Phe Ile Cys Leu Ser Ile Trp Gly Leu Ser Leu Leu Leu
                165                 170                 175

Ala Leu Pro Val Leu Leu Phe Arg Arg Thr Val Tyr Ser Ser Asn Val
            180                 185                 190

Ser Pro Ala Cys Tyr Glu Asp Met Gly Asn Asn Thr Ala Asn Trp Arg
        195                 200                 205

Met Leu Leu Arg Ile Leu Pro Gln Ser Phe Gly Phe Ile Val Pro Leu
210                 215                 220

Leu Ile Met Leu Phe Cys Tyr Gly Phe Thr Leu Arg Thr Leu Phe Lys
225                 230                 235                 240

Ala His Met Gly Gln Lys His Arg Ala Met Arg Val Ile Phe Ala Val
                245                 250                 255

Val Leu Ile Phe Leu Leu Cys Trp Leu Pro Tyr Asn Leu Val Leu Leu
            260                 265                 270

Ala Asp Thr Leu Met Arg Thr Gln Val Ile Gln Glu Thr Cys Glu Arg
        275                 280                 285

Arg Asn His Ile Asp Arg Ala Leu Asp Ala Thr Glu Ile Leu Gly Ile
290                 295                 300

Leu His Ser Cys Leu Asn Pro Leu Ile Tyr Ala Phe Ile Gly Gln Lys
305                 310                 315                 320

Phe Arg His Gly Leu Leu Lys Ile Leu Ala Ile His Gly Leu Ile Ser
                325                 330                 335

Lys Asp Ser Leu Pro Lys Asp Ser Arg Pro Ser Phe Val Gly Ser Ser
            340                 345                 350

Ser Gly His Thr Ser Thr Thr Leu
        355                 360

<210> SEQ ID NO 17

```
<211> LENGTH: 1178
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 17
gctccggtgc cgtcagtgg gcagagcgca catcgcccac agtccccgag aagttggggg      60
gaggggtcgg caattgaacc ggtgcctaga gaaggtggcg cggggtaaac tgggaaagtg     120
atgtcgtgta ctggctccgc cttttttccg agggtggggg agaaccgtat ataagtgcag     180
tagtcgccgt gaacgttctt tttcgcaacg ggtttgccgc cagaacacag gtaagtgccg     240
tgtgtggttc ccgcgggcct ggcctcttta cgggttatgg cccttgcgtg ccttgaatta     300
cttccacctg gctgcagtac gtgattcttg atcccgagct tcggttggaa gtgggtggg      360
agagttcgag gccttgcgct taaggagccc cttcgcctcg tgcttgagtt gaggcctggc     420
ctgggcgctg gggccgccgc gtgcgaatct ggtggcacct tcgcgcctgt ctcgctgctt     480
tcgataagtc tctagccatt taaaatttt gatgacctgc tgcgacgctt ttttctggc      540
aagatagtct tgtaaatgcg ggccaagatc tgcacactgg tatttcggtt tttggggccg     600
cgggcggcga cggggcccgt gcgtcccagc gcacatgttc ggcgaggcgg ggcctgcgag     660
cgcggccacc gagaatcgga cggggtagt ctcaagctgg ccggcctgct ctggtgcctg      720
gcctcgcgcc gccgtgtatc gccccgccct gggcggcaag gctggcccgg tcggcaccag     780
ttgcgtgagc ggaaagatgg ccgcttccg gccctgctgc agggagctca aaatggagga      840
cgcggcgctc gggagagcgg gcgggtgagt cacccacaca aggaaaagg gcctttccgt      900
cctcagccgt cgcttcatgt gactccacg agtaccgggc gccgtccagg cacctcgatt      960
agttctcgag ctttttggagt acgtcgtctt taggttgggg ggagggggttt tatgcgatgg   1020
agtttccca cactgagtgg gtggagactg aagttaggcc agcttggcac ttgatgtaat     1080
tctccttgga atttgccctt tttgagtttg gatcttggtt cattctcaag cctcagacag    1140
tggttcaaag ttttttcctt ccatttcagg tgtcgtga                            1178

<210> SEQ ID NO 18
<211> LENGTH: 5228
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 18
tctagagctg accaaaagag caccaaaggc gccctgacct tcagccccta cctgcgctcc      60
ggtgcccgtc agtgggcaga gcgcacatcg cccacagtcc ccgagaagtt ggggggaggg     120
gtcggcaatt gaaccggtgc ctagagaagg tggcgcgggg taaactggga aagtgatgtc     180
gtgtactggc tccgcctttt tcccgagggt ggggagaac cgtatataag tgcagtagtc      240
gccgtgaacg ttcttttcg caacgggttt gccgccagaa cacaggtaag tgccgtgtgt      300
ggttcccgcg ggcctggcct ctttacgggt tatggcccctt gcgtgccttg aattacttcc     360
acctggctgc agtacgtgat tcttgatccc gagcttcggg ttggaagtgg gtgggagagt     420
tcgaggcctt gcgcttaagg agccccttcg cctcgtgctt gagttgaggc ctggcctggg    480
cgctggggcc gccgcgtgcg aatctggtgg caccttcgcg cctgtctcgc tgctttcgat    540
```

```
aagtctctag ccatttaaaa tttttgatga cctgctgcga cgcttttttt ctggcaagat    600
agtcttgtaa atgcgggcca agatctgcac actggtattt cggttttttgg ggccgcgggc   660 ggcgacgggg cccgtgcgtc ccagcgcaca tgttcggcga ggcggggcct gcgagcgcgg    720
ccaccgagaa tcggacgggg gtagtctcaa gctggccggc ctgctctggt gcctggcctc    780
gcgccgccgt gtatcgcccc gccctgggcg gcaaggctgg cccggtcggc accagttgcg    840
tgagcggaaa gatggccgct tcccggccct gctgcaggga gctcaaaatg gaggacgcgg    900
cgctcgggag agcgggcggg tgagtcaccc acacaaagga aaagggcctt tccgtcctca    960
gccgtcgctt catgtgactc cacgagtac cgggcgccgt ccaggcacct cgattagttc     1020
tcgagctttt ggagtacgtc gtctttaggt tgggggggag ggttttatgc gatggagttt    1080
ccccacactg agtgggtgga gactgaagtt aggccagctt ggcacttgat gtaattctcc    1140
ttggaatttg cccttttttga gtttggatct tggttcattc tcaagcctca gacagtggtt   1200
caaagttttt ttcttccatt tcaggtgtcg tgataatacg actcactata gggagaccca    1260
agctggaatt cggcggccgc caccatgaaa agcgtgctgg tggtggctct ccttgtcatt    1320
ttccaggtat gcctgtgtca agatgaggtc acggacgatt acatcggaga caacaccaca   1380
gtggactaca ctttgttcga gtctttgtgc tccaagaagg acgtgcggaa ctttaaagcc    1440
tggttcctcc ctatcatgta ctccatcatt tgtttcgtgg gcctactggg caatgggctg    1500
gtcgtgttga cctatatcta tttcaagagg ctcaagacca tgaccgatac ctacctgctc    1560
aacctggcgg tggcagacat cctcttcctc ctgacccttc ccttctgggc ctacagcgcg    1620
gccaagtcct gggtcttcgg tgtccacttt tgcaagctca tcttttgccat ctacaagatg   1680 agcttcttca gtggcatgct cctacttctt tgcatcagca ttgaccgcta cgtggccatc    1740
gtccaggctg tctcagctca ccgccaccgt gcccgcgtcc ttctcatcag caagctgtcc    1800
tgtgtgggca tctggatact agccacagtg ctctccatcc cagagctcct gtacagtgac    1860
ctccagagga gcagcagtga gcaagcgatg cgatgctctc tcatcacaga gcatgtggag    1920
gcctttatca ccatccaggt ggcccagatg gtgatcggct ttctggtccc cctgctggcc    1980
atgagcttct gttaccttgt catcatccgc accctgctcc aggcacgcaa ctttgagcgc    2040
aacaaggcca tcaaggtgat catcgctgtg gtcgtggtct tcatagtctt ccagctgccc    2100
tacaatgggg tggtcctggc ccagacggtg gccaacttca acatcaccag tagcacctgt    2160
gagctcagta agcaactcaa catcgcctac gacgtcacct acagcctggc ctgcgtccgc    2220
tgctgcgtca accctttctt gtacgccttc atcggcgtca agttccgcaa cgatctcttc    2280
aagctcttca aggacctggg ctgcctcagc caggagcagc tccggcagtg gtcttcctgt    2340
cggcacatcc ggcgctcctc catgagtgtg gaggccgaga ccaccaccac cttctcccca    2400
taggcggccg cggtcatagc tgtttcctga acagatcccg ggtggcatcc ctgtgacccc    2460
tccccagtgc ctctcctggc cctggaagtt gccactccag tgccaccag ccttgtccta     2520 ataaaattaa gttgcatcat tttgtctgac taggtgtcct tctataatat tatggggtgg    2580
aggggggtgg tatggagcaa ggggcaagtt gggaagacaa cctgtagggc ctgcggggtc    2640
tattgggaac caagctggag tgcagtggca caatcttggc tcactgcaat ctccgcctcc    2700
tgggttcaag cgattctcct gcctcagcct cccgagttgt tgggattcca ggcatgcatg    2760
accaggctca gctaattttt gttttttttgg tagagacggg gtttcaccat attggccagg   2820
ctggtctcca actcctaatc tcaggtgatc tacccacctt ggcctcccaa attgctggga    2880
```

```
ttacaggcgt gaaccactgc tcccttccct gtccttctga ttttaaaata actataccag    2940
caggaggacg tccagacaca gcataggcta cctggccatg cccaaccggt gggacatttg    3000
agttgcttgc ttggcactgt cctctcatgc gttgggtcca ctcagtagat gcctgttgaa    3060
ttgggtacgc ggccagctta atgcataact tcgtataatg tatgctatac gaagttatgt    3120
taattaaggg tgcagcggcc tccgcgccgg ttttggcgc ctcccgcggg cgccccctc      3180
ctcacggcga cgctgccac gtcagacgaa gggcgcagga gcgttcctga tccttccgcc     3240
cggacgctca ggacagcggc ccgctgctca taagactcgg ccttagaacc ccagtatcag    3300
cagaaggaca ttttaggacg ggacttgggt gactctaggg cactggtttt ctttccagag    3360
agcggaacag gcgaggaaaa gtagtccctt ctcggcgatt ctgcggaggg atctccgtgg    3420
ggcggtgaac gccgatgatt atataaggac gcgccgggtg tggcacagct agttccgtcg    3480
cagccgggat ttgggtcgcg gttcttgttt gtggatcgct gtgatcgtca cttggtgagt    3540
tgcgggctgc tgggctggcc ggggcttttcg tggccgccgg gccgctcggt gggacggaag   3600
cgtgtggaga gaccgccaag ggctgtagtc tgggtccgcg agcaaggttg ccctgaactg    3660
ggggttgggg ggagcgcaca aaatggcggc tgttcccgag tcttgaatgg aagacgcttg    3720
taaggcgggc tgtgaggtcg ttgaaacaag gtgggggca tggtgggcgg caagaaccca     3780
aggtcttgag gccttcgcta atgcgggaaa gctcttattc gggtgagatg ggctggggca    3840
ccatctgggg accctgacgt gaagtttgtc actgactgga gaactcgggt ttgtcgtctg    3900
gttgcggggg cggcagttat gcggtgccgt tgggcagtgc accgtacct tgggagcgc     3960
gcgcctcgtc gtgtcgtgac gtcacccgtt ctgttggctt ataatgcagg gtggggccac   4020
ctgccggtag gtgtgcggta ggcttttctc cgtcgcagga cgcagggttc gggcctaggg   4080
taggctctcc tgaatcgaca ggcgccggac ctctggtgag gggagggata agtgaggcgt   4140
cagtttcttt ggtcggtttt atgtacctat cttcttaagt agctgaagct ccggttttga   4200
actatgcgct cggggttggc gagtgtgttt tgtgaagttt tttaggcacc ttttgaaatg   4260
taatcatttg ggtcaatatg taattttcag tgttagacta gtaaattgtc cgctaaattc   4320
tggccgttttt tggctttttt gttagacgaa gcttgggctg caggtcgact ctagtgtaac  4380
gccaccatga ccgagtacaa gcctaccgtg aggctggcca cccgggacga cgtgcccaga   4440
gccgtgagga cactggccgc cgccttcgcc gactaccccg ccacccggca caccgtggac   4500
cccgaccggc acatcgagcg ggtgaccgag ctgcaggaac tgttcctgac cagagtgggc   4560
ctggatatcg gcaaagtgtg ggtggccgac gacgagccg ccgtgccgt gtggaccacc    4620
cccgagtccg tggaggccgg agccgtgttt gccgagatcg gccccaggat ggccgagctg   4680
tccggcagca ggctggccgc ccagcagcag atggaaggcc tgctggcccc tcaccggccc   4740
aaagagcccg cctggttcct ggccaccgtg ggcgtgagcc ccgaccacca gggcaagggc   4800
ctgggcagcg ccgtggtgct gccaggcgtg aagccgccg agaggccgg agtgcccgcc    4860
ttcctggaaa ccagcgcccc caggaacctg cccttctacg agcggctggg ctttaccgtg   4920
accgccgacg tggaggtgcc agagggcccc aggacctggt gcatgacccg gaagccaggc   4980
gcctgagaaa agcttataac ttcgtataat gtatgctata cgaagttata acttgtttat   5040
tgcagcttat aatggttaca aataaagcaa tagcatcaca aatttcacaa ataaagcatt   5100
tttttcactg cattctagtt gtggtttgtc caaactcatc aatgtatctt atcatgtctg   5160
tgcggtgggc tctatggctt ctgaggcgga aagaaccagc tggggctcta gggggtatcc   5220
cctctaga                                                            5228
```

<210> SEQ ID NO 19
<211> LENGTH: 1211
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 19

```
ggcctccgcg ccgggttttg gcgcctcccg cgggcgcccc cctcctcacg gcgagcgctg    60
ccacgtcaga cgaagggcgc aggagcgttc ctgatccttc cgcccggacg ctcaggacag   120
cggcccgctg ctcataagac tcggccttag aaccccagta tcagcagaag gacattttag   180
gacgggactt gggtgactct agggcactgg ttttctttcc agagagcgga acaggcgagg   240
aaaagtagtc ccttctcggc gattctgcgg agggatctcc gtgggcggt gaacgccgat    300
gattatataa ggacgcgccg ggtgtggcac agctagttcc gtcgcagccg ggatttgggt   360
cgcggttctt gtttgtggat cgctgtgatc gtcacttggt gagttgcggg ctgctgggct   420
ggccggggct ttcgtggccg ccgggccgct cggtgggacg gaagcgtgtg agagaccgc    480
caagggctgt agtctgggtc cgcgagcaag gttgccctga actggggtt ggggggagcg    540
cacaaaatgg cggctgttcc cgagtcttga atggaagacg cttgtaaggc gggctgtgag   600
gtcgttgaaa caaggtgggg ggcatggtgg gcggcaagaa cccaaggtct tgaggccttc   660
gctaatgcgg gaaagctctt attcgggtga gatgggctgg ggcaccatct ggggaccctg   720
acgtgaagtt tgtcactgac tggagaactc gggtttgtcg tctggttgcg ggggcggcag   780
ttatgcggtg ccgttgggca gtgcacccgt acctttggga gcgcgcgcct cgtcgtgtcg   840
tgacgtcacc cgttctgttg gcttataatg cagggtgggg ccacctgccg gtaggtgtgc   900
ggtaggcttt tctccgtcgc aggacgcagg gttcgggcct agggtaggct ctcctgaatc   960
gacaggcgcc ggacctctgg tgaggggagg gataagtgag gcgtcagttt ctttggtcgg  1020
ttttatgtac ctatcttctt aagtagctga agctccggtt ttgaactatg cgctcggggt  1080
tggcgagtgt gttttgtgaa gtttttttagg cacctttga aatgtaatca tttgggtcaa  1140
tatgtaattt tcagtgttag actagtaaat tgtccgctaa attctggccg tttttggctt  1200
ttttgttaga c                                                      1211
```

<210> SEQ ID NO 20
<211> LENGTH: 500
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 20

```
gggtagggga ggcgcttttc ccaaggcagt ctggagcatg cgctttagca gccccgctgg    60
gcacttggcg ctacacaagt ggcctctggc ctcgcacaca ttccacatcc accggtaggc   120
gccaaccggc tccgttcttt ggtggcccct tcgcgccacc ttctaccccct cccctagtca   180
ggaagttccc ccccgccccg cagctcgcgt catgcaggac gtgacaaatg gaagtagcac   240
gtctcactag tctcgtgcaa atggacagca ccgctgagca atggaagcgg gtaggccctt   300
ggggcagcgg ccaatagcag ctttgctcct tcgctttctg ggctcagagg ctgggaaggg   360
```

```
gtgggtccgg gggcgggctc aggggcgggc tcaggggcgg ggcgggcgcc cgaaggtcct    420
ccggaggccc ggcattccgc acgcttcaaa agcgcacgtc tgccgcgctg ttctcttctt    480
cctcatctcc gggcctttcg                                                500

<210> SEQ ID NO 21
<211> LENGTH: 508
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 21
cgttacataa cttacggtaa atggcccgcc tggctgaccg cccaacgacc cccgcccatt     60
gacgtcaata atgacgtatg ttcccatagt aacgccaata gggactttcc attgacgtca    120
atgggtggag tatttacggt aaactgccca cttggcagta catcaagtgt atcatatgcc    180
aagtacgccc cctattgacg tcaatgacgg taaatggccc gcctggcatt atgcccagta    240
catgacctta tgggactttc ctacttggca gtacatctac gtattagtca tcgctattac    300
catgctgatg cggttttggc agtacatcaa tgggcgtgga tagcggtttg actcacgggg    360
atttccaagt ctccacccca ttgacgtcaa tgggagtttg ttttggcacc aaaatcaacg    420
ggactttcca aaatgtcgta caactccgcc ccattgacg caaatgggcg gtaggcgtgt    480
acggtgggag gtctatataa gcagagct                                       508

<210> SEQ ID NO 22
<211> LENGTH: 254
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 22

Met Trp Gln Leu Leu Leu Pro Thr Ala Leu Leu Leu Leu Val Ser Ala
1               5                   10                  15

Gly Met Arg Thr Glu Asp Leu Pro Lys Ala Val Val Phe Leu Glu Pro
                20                  25                  30

Gln Trp Tyr Arg Val Leu Glu Lys Asp Ser Val Thr Leu Lys Cys Gln
            35                  40                  45

Gly Ala Tyr Ser Pro Glu Asp Asn Ser Thr Gln Trp Phe His Asn Glu
        50                  55                  60

Ser Leu Ile Ser Ser Gln Ala Ser Ser Tyr Phe Ile Asp Ala Ala Thr
65                  70                  75                  80

Val Asp Asp Ser Gly Glu Tyr Arg Cys Gln Thr Asn Leu Ser Thr Leu
                85                  90                  95

Ser Asp Pro Val Gln Leu Glu Val His Ile Gly Trp Leu Leu Leu Gln
                100                 105                 110

Ala Pro Arg Trp Val Phe Lys Glu Glu Asp Pro Ile His Leu Arg Cys
            115                 120                 125

His Ser Trp Lys Asn Thr Ala Leu His Lys Val Thr Tyr Leu Gln Asn
        130                 135                 140

Gly Lys Gly Arg Lys Tyr Phe His His Asn Ser Asp Phe Tyr Ile Pro
145                 150                 155                 160

Lys Ala Thr Leu Lys Asp Ser Gly Ser Tyr Phe Cys Arg Gly Leu Val
```

```
                    165                 170                 175
Gly Ser Lys Asn Val Ser Ser Glu Thr Val Asn Ile Thr Ile Thr Gln
            180                 185                 190

Gly Leu Ala Val Ser Thr Ile Ser Ser Phe Phe Pro Pro Gly Tyr Gln
        195                 200                 205

Val Ser Phe Cys Leu Val Met Val Leu Leu Phe Ala Val Asp Thr Gly
    210                 215                 220

Leu Tyr Phe Ser Val Lys Thr Asn Ile Arg Ser Ser Thr Arg Asp Trp
225                 230                 235                 240

Lys Asp His Lys Phe Lys Trp Arg Lys Asp Pro Gln Asp Lys
                245                 250

<210> SEQ ID NO 23
<211> LENGTH: 765
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 23
atgtggcagc tgctgctgcc tacagctctc ctgctgctgg tgtccgccgg catgagaacc    60
gaggatctgc ctaaggccgt ggtgttcctg aaccccagt ggtacagagt gctgaaaag    120 gacagcgtga ccctgaagtg ccagggcgcc tacagccccg aggacaatag cacccagtgg   180
ttccacaacg agagcctgat cagcagccag gccagcagct acttcatcga cgccgccacc   240
gtggacgaca gcggcgagta tagatgccag accaacctga gcaccctgag cgaccccgtg   300
cagctggaag tgcacatcgg atggctgctg ctgcaggccc ccagatgggg gttcaaagaa   360
gaggacccca tccacctgag atgccactct tggaagaaca ccgccctgca caaagtgacc   420
tacctgcaga cggcaaggg cagaaagtac ttccaccaca acagcgactt ctacatcccc   480
aaggccaccc tgaaggactc cggctcctac ttctgcagag gcctcgtggg cagcaagaac   540
gtgtccagcg agacagtgaa catcaccatc acccagggcc tggccgtgtc taccatcagc   600 agcttttttcc cacccggcta ccaggtgtcc ttctgcctcg tgatggtgct gctgttcgcc   660
gtggacaccg gcctgtactt cagcgtgaaa acaaacatca gaagcagcac ccgggactgg   720
aaggaccaca gttcaagtg gcggaaggac ccccaggaca gtga               765

<210> SEQ ID NO 24
<211> LENGTH: 483
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 24
atgtaccgga tgcagctgct gagctgtatc gccctgtctc tggccctcgt gaccaacagc    60 gccccctacca gcagcagcac caagaaaacc cagctgcagc tggaacatct gctgctggac   120
ctgcagatga tcctgaacgg catcaacaac tacaagaacc caagctgac ccggatgctg   180 accttcaagt tctacatgcc caagaaggcc accgaactga acatctgca gtgcctggaa   240 gaggaactga gccctga aagaagtgctg aactgggcccc agagcaagaa cttccacctg   300
aggcccaggg acctgatcag caacatcaac gtgatcgtgc tggaactgaa aggcagcgag   360
```

```
acaaccttca tgtgcgagta cgccgacgag acagctacca tcgtggaatt tctgaaccgg    420
tggatcacct tctgccagag catcatcagc accctgaccg gctccgagaa ggacgagctg    480
tga                                                                  483
```

```
<210> SEQ ID NO 25
<211> LENGTH: 160
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 25

Met Tyr Arg Met Gln Leu Leu Ser Cys Ile Ala Leu Ser Leu Ala Leu
1               5                   10                  15

Val Thr Asn Ser Ala Pro Thr Ser Ser Thr Lys Lys Thr Gln Leu
            20                  25                  30

Gln Leu Glu His Leu Leu Leu Asp Leu Gln Met Ile Leu Asn Gly Ile
        35                  40                  45

Asn Asn Tyr Lys Asn Pro Lys Leu Thr Arg Met Leu Thr Phe Lys Phe
    50                  55                  60

Tyr Met Pro Lys Lys Ala Thr Glu Leu Lys His Leu Gln Cys Leu Glu
65                  70                  75                  80

Glu Glu Leu Lys Pro Leu Glu Glu Val Leu Asn Leu Ala Gln Ser Lys
                85                  90                  95

Asn Phe His Leu Arg Pro Arg Asp Leu Ile Ser Asn Ile Asn Val Ile
            100                 105                 110

Val Leu Glu Leu Lys Gly Ser Glu Thr Thr Phe Met Cys Glu Tyr Ala
        115                 120                 125

Asp Glu Thr Ala Thr Ile Val Glu Phe Leu Asn Arg Trp Ile Thr Phe
    130                 135                 140

Cys Gln Ser Ile Ile Ser Thr Leu Thr Gly Ser Glu Lys Asp Glu Leu
145                 150                 155                 160
```

```
<210> SEQ ID NO 26
<211> LENGTH: 60
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 26
cagtgcacca actacgccct gctgaagctg gccggcgacg tggagagcaa ccctggccct    60
```

```
<210> SEQ ID NO 27
<211> LENGTH: 54
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 27
gagggcagag gcagcctgct gacctgcggc gatgtggagg aaaacccagg ccca          54
```

```
<210> SEQ ID NO 28
<211> LENGTH: 19
```

```
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 28
taatacgact cactatagg                                                19

<210> SEQ ID NO 29
<211> LENGTH: 66
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 29
ggatctggag ctactaactt cagcctgctg aagcaggctg agacgtgga ggagaaccct    60 ggacct                                                              66

<210> SEQ ID NO 30
<211> LENGTH: 69
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 30
atggactgga tctggcggat tctgtttctc gtgggagctg ccacaggcgc tcattctgct    60
cagcctgcc                                                            69

<210> SEQ ID NO 31
<211> LENGTH: 1152
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 31
gatatccaga tgacccagac aacaagcagc ctgagcgcct ctctgggcga tagagtgaca    60
atcagctgca gagccagcca ggacatcagc aagtacctga actggtatca gcagaaaccc   120
gacggcaccg tgaagctgct gatctaccac acaagcagac tgcacagcgg cgtgccaagc   180
agattttctg gcagcggcag cggcaccgat tacagcctga ccatcagcaa cctggaacag   240
gaagatatcg ctacctactt ctgtcagcag ggcaacaccc tgccttacac ctttggcggc   300
ggaacaaagc tggaactgaa aagaggcggc ggaggaagcg gaggcggagg atctggggc    360 ggaggctctg gcgagggg atctgaagtg cagctgcagc agtctggacc tggactggtg    420
gctccttctc agtccctgtc tgtgacctgt acagtgtctg gcgtgtccct gcctgattac    480
ggcgtgtcct ggatcagaca gcctcccaga aaaggcctgg aatggctggg agtgatctgg    540
ggcagcgaga caacctacta caacagcgcc ctgaagtccc ggctgaccat catcaaggac    600
aacagcaaga gccaggtgtt cctgaagatg aacagcctgc agaccgacga caccgccatc    660
tactactgcg ccaagcacta ctactacggc ggcagctacg ccatggatta ttggggccag    720
```

| | |
|---|---|
| ggcaccaccg tgacagtgtc atctgcggcc gcgctgagca acagcatcat gtacttcagc | 780 |
| cacttcgtgc ctgtgttcct gcctgccaag cctacaacaa caccagcccc tagacctcca | 840 |
| accccctgccc ctacaattgc ctctcagcct ctgtctctga ggcccgaagc ttgtagacct | 900 |
| gctgctggcg gagctgtgca caccagagga ctggatttcg cctgcttttg ggtgctggtg | 960 |
| gtcgtgggcg gagtgctggc ttgttattct ctgctggtca ccgtggcctt catcatcttt | 1020 |
| tgggtccgac tgaagatcca ggtccgaaag gccgccatca ccagctacga gaagtctgat | 1080 |
| ggcgtgtaca ccggcctgag caccagaaac caggaaacct acgagacact gaagcacgag | 1140 |
| aagccccccc ag | 1152 |

<210> SEQ ID NO 32
<211> LENGTH: 592
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 32

| | |
|---|---|
| cgcccctctc ccccccccc ctctccctcc ccccccccta acgttactgg ccgaagccgc | 60 |
| ttggaataag gccggtgtgc gtttgtctat atgttatttt ccaccatatt gccgtctttt | 120 |
| ggcaatgtga gggcccggaa acctggccct gtcttcttga cgagcattcc taggggtctt | 180 |
| tcccctctcg ccaaaggaat gcaaggtctg ttgaatgtcg tgaaggaagc agttcctctg | 240 |
| gaagcttctt gaagacaaac aacgtctgta gcgacccttt gcaggcagcg gaaccccca | 300 |
| cctggcgaca ggtgcctctg cggccaaaag ccacgtgtat aagatacacc tgcaaaggcg | 360 |
| gcacaacccc agtgccacgt tgtgagttgg atagttgtgg aaagagtcaa atggctctcc | 420 |
| tcaagcgtat tcaacaaggg gctgaaggat gcccagaagg taccccattg tatgggatct | 480 |
| gatctggggc ctcggtgcac atgctttaca tgtgtttagt cgaggttaaa aaaacgtcta | 540 |
| ggccccccga accacgggga cgtggttttc ctttgaaaaa cacgataacc gc | 592 |

<210> SEQ ID NO 33
<211> LENGTH: 252
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 33

| | |
|---|---|
| acgagatttc gattccaccg ccgccttcta tgaaaggttg ggcttcggaa tcgtttttccg | 60 |
| ggacgccggc tggatgatcc tccagcgcgg ggatctcatg ctggagttct tcgcccaccc | 120 |
| caacttgttt attgcagctt ataatggtta caaataaagc aatagcatca caaatttcac | 180 |
| aaataaagca ttttttttcac tgcattctag ttgtggtttg tccaaactca tcaatgtatc | 240 |
| ttatcatgtc tg | 252 |

<210> SEQ ID NO 34
<211> LENGTH: 41
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 34

Leu Lys Ile Gln Val Arg Lys Ala Ala Ile Thr Ser Tyr Glu Lys Ser
1               5                   10                  15

Asp Gly Val Tyr Thr Gly Leu Ser Thr Arg Asn Gln Glu Thr Tyr Glu
            20                  25                  30

Thr Leu Lys His Glu Lys Pro Pro Gln
        35                  40

<210> SEQ ID NO 35
<211> LENGTH: 123
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 35
ctgaagatcc aggtccgaaa ggccgccatc accagctacg agaagtctga tggcgtgtac      60
accggcctga gcaccagaaa ccaggaaacc tacgagacac tgaagcacga agccccccc     120 cag                                                                  123

<210> SEQ ID NO 36
<211> LENGTH: 64
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 36

Leu Ser Asn Ser Ile Met Tyr Phe Ser His Phe Val Pro Val Phe Leu
1               5                   10                  15

Pro Ala Lys Pro Thr Thr Thr Pro Ala Pro Arg Pro Pro Thr Pro Ala
            20                  25                  30

Pro Thr Ile Ala Ser Gln Pro Leu Ser Leu Arg Pro Glu Ala Cys Arg
        35                  40                  45

Pro Ala Ala Gly Gly Ala Val His Thr Arg Gly Leu Asp Phe Ala Cys
    50                  55                  60

<210> SEQ ID NO 37
<211> LENGTH: 192
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 37
ctgagcaaca gcatcatgta cttcagccac ttcgtgcctg tgttcctgcc tgccaagcct      60
acaacaacac cagcccctag acctccaacc cctgccccta caattgcctc tcagcctctg     120
tctctgaggc ccgaagcttg tagacctgct gctggcggag ctgtgcacac cagaggactg     180
gatttcgcct gc                                                        192

<210> SEQ ID NO 38
<211> LENGTH: 28
<212> TYPE: PRT
<213> ORGANISM: Artificial Sequence

```
<220> FEATURE:
<221> NAME/KEY: source
<223> OTHER INFORMATION: /note="Description of Artificial Sequence:
      Synthetic peptide"

<400> SEQUENCE: 38

Phe Trp Val Leu Val Val Val Gly Gly Val Leu Ala Cys Tyr Ser Leu
1               5                   10                  15

Leu Val Thr Val Ala Phe Ile Ile Phe Trp Val Arg
            20                  25

<210> SEQ ID NO 39
<211> LENGTH: 84
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 39
ttttgggtgc tggtggtcgt gggcggagtg ctggcttgtt attctctgct ggtcaccgtg      60
gccttcatca tcttttgggt ccga                                            84

<210> SEQ ID NO 40
<211> LENGTH: 133
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 40

Leu Ser Asn Ser Ile Met Tyr Phe Ser His Phe Val Pro Val Phe Leu
1               5                   10                  15

Pro Ala Lys Pro Thr Thr Thr Pro Ala Pro Arg Pro Pro Thr Pro Ala
            20                  25                  30

Pro Thr Ile Ala Ser Gln Pro Leu Ser Leu Arg Pro Glu Ala Cys Arg
        35                  40                  45

Pro Ala Ala Gly Gly Ala Val His Thr Arg Gly Leu Asp Phe Ala Cys
    50                  55                  60

Phe Trp Val Leu Val Val Val Gly Gly Val Leu Ala Cys Tyr Ser Leu
65                  70                  75                  80

Leu Val Thr Val Ala Phe Ile Ile Phe Trp Val Arg Leu Lys Ile Gln
                85                  90                  95

Val Arg Lys Ala Ala Ile Thr Ser Tyr Glu Lys Ser Asp Gly Val Tyr
            100                 105                 110

Thr Gly Leu Ser Thr Arg Asn Gln Glu Thr Tyr Glu Thr Leu Lys His
        115                 120                 125

Glu Lys Pro Pro Gln
    130

<210> SEQ ID NO 41
<211> LENGTH: 399
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 41
```

```
ctgagcaaca gcatcatgta cttcagccac ttcgtgcctg tgttcctgcc tgccaagcct      60
acaacaacac cagcccctag acctccaacc cctgccccta caattgcctc tcagcctctg     120
tctctgaggc ccgaagcttg tagacctgct gctggcggag ctgtgcacac cagaggactg     180
gatttcgcct gcttttgggt gctggtggtc gtgggcggag tgctggcttg ttattctctg     240
ctggtcaccg tggccttcat catcttttgg gtccgactga agatccaggt ccgaaaggcc     300
gccatcacca gctacgagaa gtctgatggc gtgtacaccg gcctgagcac cagaaaccag     360
gaaacctacg agacactgaa gcacgagaag cccccccag                            399
```

<210> SEQ ID NO 42
<211> LENGTH: 252
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 42

```
Ala Gln Pro Ala Asp Ile Gln Met Thr Gln Thr Thr Ser Ser Leu Ser
1               5                   10                  15

Ala Ser Leu Gly Asp Arg Val Thr Ile Ser Cys Arg Ala Ser Gln Asp
                20                  25                  30

Ile Ser Lys Tyr Leu Asn Trp Tyr Gln Gln Lys Pro Asp Gly Thr Val
            35                  40                  45

Lys Leu Leu Ile Tyr His Thr Ser Arg Leu His Ser Gly Val Pro Ser
        50                  55                  60

Arg Phe Ser Gly Ser Gly Ser Gly Thr Asp Tyr Ser Leu Thr Ile Ser
65                  70                  75                  80

Asn Leu Glu Gln Glu Asp Ile Ala Thr Tyr Phe Cys Gln Gln Gly Asn
                85                  90                  95

Thr Leu Pro Tyr Thr Phe Gly Gly Gly Thr Lys Leu Glu Leu Lys Arg
            100                 105                 110

Gly Gly Gly Gly Ser Gly Gly Gly Ser Gly Gly Gly Gly Ser Gly
        115                 120                 125

Gly Gly Gly Ser Glu Val Gln Leu Gln Gln Ser Gly Pro Gly Leu Val
    130                 135                 140

Ala Pro Ser Gln Ser Leu Ser Val Thr Cys Thr Val Ser Gly Val Ser
145                 150                 155                 160

Leu Pro Asp Tyr Gly Val Ser Trp Ile Arg Gln Pro Pro Arg Lys Gly
                165                 170                 175

Leu Glu Trp Leu Gly Val Ile Trp Gly Ser Glu Thr Thr Tyr Tyr Asn
            180                 185                 190

Ser Ala Leu Lys Ser Arg Leu Thr Ile Ile Lys Asp Asn Ser Lys Ser
        195                 200                 205

Gln Val Phe Leu Lys Met Asn Ser Leu Gln Thr Asp Asp Thr Ala Ile
    210                 215                 220

Tyr Tyr Cys Ala Lys His Tyr Tyr Gly Gly Ser Tyr Ala Met Asp
225                 230                 235                 240

Tyr Trp Gly Gln Gly Thr Thr Val Thr Val Ser Ser
                245                 250
```

<210> SEQ ID NO 43
<211> LENGTH: 113
<212> TYPE: PRT

<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 43

```
Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Gln Arg Arg Lys Asn Pro Gln Glu Gly Leu Tyr Asn Glu Leu Gln
    50                  55                  60

Lys Asp Lys Met Ala Glu Ala Tyr Ser Glu Ile Gly Met Lys Gly Glu
65                  70                  75                  80

Arg Arg Arg Gly Lys Gly His Asp Gly Leu Tyr Gln Gly Leu Ser Thr
                85                  90                  95

Ala Thr Lys Asp Thr Tyr Asp Ala Leu His Met Gln Ala Leu Pro Pro
            100                 105                 110

Arg
```

<210> SEQ ID NO 44
<211> LENGTH: 1410
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 44

| atggactgga tctggcggat cctgtttctc gtgggagctg ccacaggcgc tcattctgct | 60 |
| cagcctgccg atatccagat gacccagaca acaagcagcc tgagcgcctc tctgggcgat | 120 |
| agagtgacaa tcagctgcag agccagccag gacatcagca gtacctgaa ctggtatcag | 180 |
| cagaaacccg acggcaccgt gaagctgctg atctaccaca caagcagact gcacagcggc | 240 |
| gtgccaagca gattttctgg cagcggcagc ggcaccgatt acagcctgac catcagcaac | 300 |
| ctggaacagg aagatatcgc tacctacttc tgtcagcaag caacaccct gccttacacc | 360 |
| tttggcggcg gaacaaagct ggaactgaaa agaggcggcg gaggaagcgg aggcggagga | 420 |
| tctggggggcg gaggctctgg cggaggggga tctgaagtgc agctgcagca gtctggacct | 480 |
| ggactggtgg ctccttctca gtccctgtct gtgacctgta cagtgtctgg cgtgtccctg | 540 |
| cctgattacg gcgtgtcctg gatcagacag cctcccagaa aaggcctgga atggctggga | 600 |
| gtgatctggg gcagcgagac aacctactac aacagcgccc tgaagtcccg gctgaccatc | 660 |
| atcaaggaca cagcaagag ccaggtgttc ctgaagatga cagcctgca gaccgacgac | 720 |
| accgccatct actactgcgc caagcactac tactacggcg gcagctacgc catggattat | 780 |
| tggggccagg gcaccaccgt gacagtgtca tctgctgctg ctctgttcgt gcctgtgttc | 840 |
| ctgcctgcca agcctacaac aacaccagcc cctagacctc aacccctgc ccctacaatt | 900 |
| gcctctcagc ctctgtctct gaggcccgaa gcttgtagac tgctgctgg cggagctgtg | 960 |
| cacaccagag actggatttc gcctgctttt gggtgctgg tggtcgtggg cggagtgctg | 1020 |
| gcttgttatt ctctgctggt caccgtggcc ttcatcatct tttgggtccg agtgaagttc | 1080 |

```
agcagatccg ccgatgcccc tgcttaccag cagggccaga atcagctgta caacgagctg    1140
aacctgggca gacgggaaga gtacgacgtg ctggataaga gaagaggcag agatcccgag    1200
atgggcggca agccccagag aagaaagaat ccccaggaag gcctgtataa cgaactgcag    1260
aaagacaaga tggccgaggc ctacagcgag atcggcatga agggcgagag aagaagaggc    1320
aagggccacg atggactgta ccagggactg agcacagcca ccaaggatac ctacgatgcc    1380
ctgcacatgc aggccctgcc tccaagataa                                    1410
```

<210> SEQ ID NO 45
<211> LENGTH: 153
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 45

```
Met Tyr Arg Met Gln Leu Leu Ser Cys Ile Ala Leu Ser Leu Ala Leu
1               5                   10                  15

Val Thr Asn Ser Ala Pro Thr Ser Ser Ser Thr Lys Lys Thr Gln Leu
            20                  25                  30

Gln Leu Glu His Leu Leu Leu Asp Leu Gln Met Ile Leu Asn Gly Ile
        35                  40                  45

Asn Asn Tyr Lys Asn Pro Lys Leu Thr Arg Met Leu Thr Phe Lys Phe
    50                  55                  60

Tyr Met Pro Lys Lys Ala Thr Glu Leu Lys His Leu Gln Cys Leu Glu
65                  70                  75                  80

Glu Glu Leu Lys Pro Leu Glu Glu Val Leu Asn Leu Ala Gln Ser Lys
                85                  90                  95

Asn Phe His Leu Arg Pro Arg Asp Leu Ile Ser Asn Ile Asn Val Ile
            100                 105                 110

Val Leu Glu Leu Lys Gly Ser Glu Thr Thr Phe Met Cys Glu Tyr Ala
        115                 120                 125

Asp Glu Thr Ala Thr Ile Val Glu Phe Leu Asn Arg Trp Ile Thr Phe
    130                 135                 140

Cys Gln Ser Ile Ile Ser Thr Leu Thr
145                 150
```

<210> SEQ ID NO 46
<211> LENGTH: 398
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 46

```
Met Asp Trp Ile Trp Arg Ile Leu Phe Leu Val Gly Ala Ala Thr Gly
1               5                   10                  15

Ala His Ser Ala Gln Pro Ala Asp Ile Gln Met Thr Gln Thr Thr Ser
            20                  25                  30

Ser Leu Ser Ala Ser Leu Gly Asp Arg Val Thr Ile Ser Cys Arg Ala
        35                  40                  45

Ser Gln Asp Ile Ser Lys Tyr Leu Asn Trp Tyr Gln Gln Lys Pro Asp
    50                  55                  60

Gly Thr Val Lys Leu Leu Ile Tyr His Thr Ser Arg Leu His Ser Gly
```

```
              65                  70                  75                  80
    Val Pro Ser Arg Phe Ser Gly Ser Gly Ser Gly Thr Asp Tyr Ser Leu
                        85                  90                  95

Thr Ile Ser Asn Leu Glu Gln Glu Asp Ile Ala Thr Tyr Phe Cys Gln
                    100                 105                 110

Gln Gly Asn Thr Leu Pro Tyr Thr Phe Gly Gly Gly Thr Lys Leu Glu
                115                 120                 125

Leu Lys Arg Gly Gly Gly Gly Ser Gly Gly Gly Gly Ser Gly Gly Gly
    130                 135                 140

Gly Ser Gly Gly Gly Gly Ser Glu Val Gln Leu Gln Gln Ser Gly Pro
    145                 150                 155                 160

Gly Leu Val Ala Pro Ser Gln Ser Leu Ser Val Thr Cys Thr Val Ser
                    165                 170                 175

Gly Val Ser Leu Pro Asp Tyr Gly Val Ser Trp Ile Arg Gln Pro Pro
                180                 185                 190

Arg Lys Gly Leu Glu Trp Leu Gly Val Ile Trp Gly Ser Glu Thr Thr
            195                 200                 205

Tyr Tyr Asn Ser Ala Leu Lys Ser Arg Leu Thr Ile Ile Lys Asp Asn
        210                 215                 220

Ser Lys Ser Gln Val Phe Leu Lys Met Asn Ser Leu Gln Thr Asp Asp
    225                 230                 235                 240

Thr Ala Ile Tyr Tyr Cys Ala Lys His Tyr Tyr Gly Gly Ser Tyr
                    245                 250                 255

Ala Met Asp Tyr Trp Gly Gln Gly Thr Thr Val Thr Val Ser Ser Ala
                260                 265                 270

Ala Ala Leu Phe Val Pro Val Phe Leu Pro Ala Lys Pro Thr Thr Thr
            275                 280                 285

Pro Ala Pro Arg Pro Pro Thr Pro Ala Pro Thr Ile Ala Ser Gln Pro
        290                 295                 300

Leu Ser Leu Arg Pro Glu Ala Cys Arg Pro Ala Ala Gly Gly Ala Val
    305                 310                 315                 320

His Thr Arg Gly Leu Asp Phe Ala Cys Phe Trp Val Leu Val Val Val
                    325                 330                 335

Gly Gly Val Leu Ala Cys Tyr Ser Leu Leu Val Thr Val Ala Phe Ile
                340                 345                 350

Ile Phe Trp Val Arg Leu Lys Ile Gln Val Arg Lys Ala Ala Ile Thr
            355                 360                 365

Ser Tyr Glu Lys Ser Asp Gly Val Tyr Thr Gly Leu Ser Thr Arg Asn
        370                 375                 380

Gln Glu Thr Tyr Glu Thr Leu Lys His Glu Lys Pro Pro Gln
    385                 390                 395

<210> SEQ ID NO 47
<211> LENGTH: 259
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 47

Ala Ala Thr Gly Ala His Ser Ala Gln Pro Ala Asp Ile Gln Met Thr
1               5                   10                  15

Gln Thr Thr Ser Ser Leu Ser Ala Ser Leu Gly Asp Arg Val Thr Ile
            20                  25                  30
```

Ser Cys Arg Ala Ser Gln Asp Ile Ser Lys Tyr Leu Asn Trp Tyr Gln
            35                  40                  45

Gln Lys Pro Asp Gly Thr Val Lys Leu Leu Ile Tyr His Thr Ser Arg
 50                  55                  60

Leu His Ser Gly Val Pro Ser Arg Phe Ser Gly Ser Gly Ser Gly Thr
65                  70                  75                  80

Asp Tyr Ser Leu Thr Ile Ser Asn Leu Glu Gln Glu Asp Ile Ala Thr
                85                  90                  95

Tyr Phe Cys Gln Gln Gly Asn Thr Leu Pro Tyr Thr Phe Gly Gly Gly
            100                 105                 110

Thr Lys Leu Glu Leu Lys Arg Gly Gly Gly Ser Gly Gly Gly Gly
            115                 120                 125

Ser Gly Gly Gly Ser Gly Gly Gly Gly Ser Glu Val Gln Leu Gln
            130                 135                 140

Gln Ser Gly Pro Gly Leu Val Ala Pro Ser Gln Ser Leu Ser Val Thr
145                 150                 155                 160

Cys Thr Val Ser Gly Val Ser Leu Pro Asp Tyr Gly Val Ser Trp Ile
                165                 170                 175

Arg Gln Pro Pro Arg Lys Gly Leu Glu Trp Leu Gly Val Ile Trp Gly
            180                 185                 190

Ser Glu Thr Thr Tyr Tyr Asn Ser Ala Leu Lys Ser Arg Leu Thr Ile
            195                 200                 205

Ile Lys Asp Asn Ser Lys Ser Gln Val Phe Leu Lys Met Asn Ser Leu
210                 215                 220

Gln Thr Asp Asp Thr Ala Ile Tyr Tyr Cys Ala Lys His Tyr Tyr Tyr
225                 230                 235                 240

Gly Gly Ser Tyr Ala Met Asp Tyr Trp Gly Gln Gly Thr Thr Val Thr
            245                 250                 255

Val Ser Ser

<210> SEQ ID NO 48
<211> LENGTH: 1197
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 48
atggactgga tctggcggat cctgtttctc gtgggagctg ccacaggcgc tcattctgct      60
cagcctgccg atatccagat gacccagaca caagcagcc tgagcgcctc tctgggcgat     120
agagtgacaa tcagctgcag agccagccag gacatcagca gtacctgaa ctggtatcag     180 cagaaacccg acggcaccgt gaagctgctg atctaccaca aagcagact gcacagcggc     240 gtgccaagca gattcctgg cagcggcagc ggcaccgatt acagcctgac catcagcaac     300
ctggaacagg aagatatcgc tacctacttc tgtcagcagg gcaacaccct gccttacacc     360
tttggcggcg gaacaaagct ggaactgaaa agaggcggcg gaggaagcgg aggcggagga     420 tctggggcg gaggctctgg cggaggggga tctgaagtgc agctgcagca gtctggacct     480
ggactggtgg ctccttctca gtccctgtct gtgacctgta cagtgtctgg cgtgtccctg     540
cctgattacg gcgtgtcctg gatcagacag cctcccagaa aaggcctgga atggctggga     600
gtgatctggg gcagcgagac aacctactac aacagcgccc tgaagtcccg gctgaccatc     660

-continued

```
atcaaggaca acagcaagag ccaggtgttc ctgaagatga acagcctgca gaccgacgac      720
accgccatct actactgcgc caagcactac tactacggcg gcagctacgc catggattat      780
tggggccagg gcaccaccgt gacagtgtca tctgctgctg ctctgttcgt gcctgtgttc      840
ctgcctgcca agcctacaac aacaccagcc cctagacctc caacccctgc ccctacaatt      900
gcctctcagc tctgtctct gaggcccgaa gcttgtagac ctgctgctgg cggagctgtg       960
cacaccagag gactggattt cgcctgcttt tgggtgctgg tggtcgtggg cggagtgctg     1020
gcttgttatt ctctgctggt caccgtggcc ttcatcatct tttgggtccg actgaagatc     1080
caggtccgaa aggccgccat caccagctac gagaagtctg atggcgtgta caccggcctg     1140
agcaccagaa accaggaaac ctacgagaca ctgaagcacg agaagccccc ccagtaa        1197
```

<210> SEQ ID NO 49
<211> LENGTH: 54
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 49

Lys Pro Thr Thr Thr Pro Ala Pro Arg Pro Pro Thr Pro Ala Pro Thr
1               5                   10                  15

Ile Ala Ser Gln Pro Leu Ser Leu Arg Pro Glu Ala Cys Arg Pro Ala
            20                  25                  30

Ala Gly Gly Ala Val His Thr Arg Gly Leu Asp Phe Ala Cys Phe Trp
        35                  40                  45

Val Leu Val Val Val Gly
    50

<210> SEQ ID NO 50
<211> LENGTH: 20
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 50

Gly Val Leu Ala Cys Tyr Ser Leu Leu Val Thr Val Ala Phe Ile Ile
1               5                   10                  15

Phe Trp Val Arg
            20

<210> SEQ ID NO 51
<211> LENGTH: 41
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 51

Arg Ser Lys Arg Ser Arg Leu Leu His Ser Asp Tyr Met Asn Met Thr
1               5                   10                  15

Pro Arg Arg Pro Gly Pro Thr Arg Lys His Tyr Gln Pro Tyr Ala Pro
            20                  25                  30

Pro Arg Asp Phe Ala Ala Tyr Arg Ser
        35                  40

<210> SEQ ID NO 52
<211> LENGTH: 42
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 52

```
Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

Pro Glu Glu Glu Gly Gly Cys Glu Leu
            35                  40
```

<210> SEQ ID NO 53
<211> LENGTH: 339
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 53

```
gtgaagttta gcagatctgc cgacgcccct gcctaccagc agggacagaa tcagctgtac      60
aacgagctga acctgggcag acgggaagag tacgacgtgc tggataagag aagaggcaga     120
gatcccgaga tgggcggcaa gccccagaga agaaagaatc cccaggaagg cctgtataac     180
gaactgcaga aagacaagat ggccgaggcc tacagcgaga tcggcatgaa gggcgagaga     240
agaagaggca agggccacga tggactgtac cagggactga gcacagccac caaggatacc     300
tacgatgccc tgcacatgca ggccctgcct ccaagataa                            339
```

<210> SEQ ID NO 54
<211> LENGTH: 339
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 54

```
gtgaagttca gcaggagcgc agacgccccc gcgtaccagc agggccagaa ccagctctat      60
aacgagctca atctaggacg aagagaggag tacgatgttt tggacaagag acgtggccgg     120
gaccctgaga tgggggggaaa gccgcagaga aggaagaacc ctcaggaagg cctgtacaat     180
gaactgcaga agataagat ggcggaggcc tacagtgaga ttgggatgaa aggcgagcgc     240
cggaggggca aggggcacga tggcctttac cagggtctca gtacagccac caaggacacc     300
tacgacgccc ttcacatgca ggccctgccc cctcgctaa                            339
```

<210> SEQ ID NO 55

<400> SEQUENCE: 55

000

<210> SEQ ID NO 56
<400> SEQUENCE: 56
000

<210> SEQ ID NO 57
<400> SEQUENCE: 57
000

<210> SEQ ID NO 58
<400> SEQUENCE: 58
000

<210> SEQ ID NO 59
<400> SEQUENCE: 59
000

<210> SEQ ID NO 60
<400> SEQUENCE: 60
000

<210> SEQ ID NO 61
<400> SEQUENCE: 61
000

<210> SEQ ID NO 62
<211> LENGTH: 813
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 62

```
atggactgga tctggcggat tctgtttctc gtgggagctg ccacaggcgc tcattctgct     60
cagcctgccg atatccagat gacccagaca acaagcagcc tgagcgcctc tctgggcgat   120
agagtgacaa tcagctgcag agccagccag gacatcagca agtacctgaa ctggtatcag   180
cagaaacccg acggcaccgt gaagctgctg atctaccaca caagcagact gcacagcggc   240
gtgccaagca gattttctgg cagcggcagc ggcaccgatt acagcctgac catcagcaac   300
ctggaacagg aagatatcgc tacctacttc tgtcagcagg gcaacaccct gccttacacc   360
tttggcggcg aacaaagct ggaactgaaa agaggcggcg aggaagcgg aggcggagga   420
tctgggggcg aggctctgg cggagggga tctgaagtgc agctgcagca gtctggacct   480
ggactggtgg ctccttctca gtccctgtct gtgacctgta cagtgtctgg cgtgtccctg   540
cctgattacg gcgtgtcctg gatcagacag cctcccagaa aaggcctgga atggctggga   600
gtgatctggg gcagcgagac aacctactac aacagcgccc tgaagtcccg gctgaccatc   660
atcaaggaca caagcaagag ccaggtgttc ctgaagatga acagcctgca gaccgacgac   720
accgccatct actactgcgc caagcactac tactacggcg gcagctacgc catggattat   780
```
tggggccagg gcaccaccgt gacagtgtca tct                                              813

<210> SEQ ID NO 63
<211> LENGTH: 271
<212> TYPE: PRT
<213> ORGANISM: Artificial Sequence
<220> FEATURE:
<221> NAME/KEY: source
<223> OTHER INFORMATION: /note="Description of Artificial Sequence:
    Synthetic polypeptide"

<400> SEQUENCE: 63

Met Asp Trp Ile Trp Arg Ile Leu Phe Leu Val Gly Ala Ala Thr Gly
1               5                   10                  15

Ala His Ser Ala Gln Pro Ala Asp Ile Gln Met Thr Gln Thr Thr Ser
            20                  25                  30

Ser Leu Ser Ala Ser Leu Gly Asp Arg Val Thr Ile Ser Cys Arg Ala
        35                  40                  45

Ser Gln Asp Ile Ser Lys Tyr Leu Asn Trp Tyr Gln Gln Lys Pro Asp
    50                  55                  60

Gly Thr Val Lys Leu Leu Ile Tyr His Thr Ser Arg Leu His Ser Gly
65                  70                  75                  80

Val Pro Ser Arg Phe Ser Gly Ser Gly Ser Gly Thr Asp Tyr Ser Leu
                85                  90                  95

Thr Ile Ser Asn Leu Glu Gln Glu Asp Ile Ala Thr Tyr Phe Cys Gln
            100                 105                 110

Gln Gly Asn Thr Leu Pro Tyr Thr Phe Gly Gly Gly Thr Lys Leu Glu
        115                 120                 125

Leu Lys Arg Gly Gly Gly Gly Ser Gly Gly Gly Gly Ser Gly Gly Gly
    130                 135                 140

Gly Ser Gly Gly Gly Gly Ser Glu Val Gln Leu Gln Gln Ser Gly Pro
145                 150                 155                 160

Gly Leu Val Ala Pro Ser Gln Ser Leu Ser Val Thr Cys Thr Val Ser
                165                 170                 175

Gly Val Ser Leu Pro Asp Tyr Gly Val Ser Trp Ile Arg Gln Pro Pro
            180                 185                 190

Arg Lys Gly Leu Glu Trp Leu Gly Val Ile Trp Gly Ser Glu Thr Thr
        195                 200                 205

Tyr Tyr Asn Ser Ala Leu Lys Ser Arg Leu Thr Ile Ile Lys Asp Asn
    210                 215                 220

Ser Lys Ser Gln Val Phe Leu Lys Met Asn Ser Leu Gln Thr Asp Asp
225                 230                 235                 240

Thr Ala Ile Tyr Tyr Cys Ala Lys His Tyr Tyr Gly Gly Ser Tyr
                245                 250                 255

Ala Met Asp Tyr Trp Gly Gln Gly Thr Thr Val Thr Val Ser Ser
            260                 265                 270

<210> SEQ ID NO 64
<211> LENGTH: 807
<212> TYPE: DNA
<213> ORGANISM: Artificial Sequence
<220> FEATURE:
<221> NAME/KEY: source
<223> OTHER INFORMATION: /note="Description of Artificial Sequence:
    Synthetic polynucleotide"

<400> SEQUENCE: 64
atggactgga tctggcgcat cctcttcctc gtcggcgctg ctaccggcgc tcattcggcc      60

```
cagccggcca tggcgcaagt aaaactccaa gaatctgggg cggagctggt gaaaccgggg    120
gcgtctgtga agatgagctg taaagcatca ggctacacct tcacctccta taatatgcac    180
tgggtgaaac aaacacccgg acagggcctc gaatggattg gtgccatcta tcctggaaat    240
ggtgatacct catataatca gaagtttaag ggcaaggcta cgcttactgc ggataaaagc    300
tcttccactg cttacatgca actgagcagt ctcacttcag aggactcagc cgattattat    360
tgtgcccgca gcaactacta tggtagttca tactggtttt tcgacgtttg ggggcaaggt    420
accaccgtca cggtttcttc tggtgggggc ggaagcgggg gtggaggatc tggggcggt     480 ggttcagaca ttgaactcac ccagagccct actattctga gcgcgtctcc aggtgaaaaa    540
gttacgatga cgtgcagagc atcaagtagt gtgaattata tggattggta tcaaaagaag    600
ccaggctcat ccccaaaacc gtggatctat gcaactagca acctcgcgtc aggggtgcca    660
gcaaggtttt ccggaagtgg ttctggcaca tcttatagtc tcaccatttc ccgagtggag    720
gctgaggatg cggccactta ttactgccag caatggtcat tcaatccccc aacatttggt    780
ggcggaacaa aactcgaaat taaacgg                                        807
```

<210> SEQ ID NO 65
<211> LENGTH: 269
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 65

```
Met Asp Trp Ile Trp Arg Ile Leu Phe Leu Val Gly Ala Ala Thr Gly
1               5                   10                  15

Ala His Ser Ala Gln Pro Ala Met Ala Gln Val Lys Leu Gln Glu Ser
            20                  25                  30

Gly Ala Glu Leu Val Lys Pro Gly Ala Ser Val Lys Met Ser Cys Lys
        35                  40                  45

Ala Ser Gly Tyr Thr Phe Thr Ser Tyr Asn Met His Trp Val Lys Gln
    50                  55                  60

Thr Pro Gly Gln Gly Leu Glu Trp Ile Gly Ala Ile Tyr Pro Gly Asn
65                  70                  75                  80

Gly Asp Thr Ser Tyr Asn Gln Lys Phe Lys Gly Lys Ala Thr Leu Thr
                85                  90                  95

Ala Asp Lys Ser Ser Ser Thr Ala Tyr Met Gln Leu Ser Ser Leu Thr
            100                 105                 110

Ser Glu Asp Ser Ala Asp Tyr Tyr Cys Ala Arg Ser Asn Tyr Tyr Gly
        115                 120                 125

Ser Ser Tyr Trp Phe Phe Asp Val Trp Gly Gln Gly Thr Thr Val Thr
    130                 135                 140

Val Ser Ser Gly Gly Gly Gly Ser Gly Gly Gly Gly Ser Gly Gly Gly
145                 150                 155                 160

Gly Ser Asp Ile Glu Leu Thr Gln Ser Pro Thr Ile Leu Ser Ala Ser
                165                 170                 175

Pro Gly Glu Lys Val Thr Met Thr Cys Arg Ala Ser Ser Ser Val Asn
            180                 185                 190

Tyr Met Asp Trp Tyr Gln Lys Lys Pro Gly Ser Ser Pro Lys Pro Trp
        195                 200                 205

Ile Tyr Ala Thr Ser Asn Leu Ala Ser Gly Val Pro Ala Arg Phe Ser
    210                 215                 220
```

Gly Ser Gly Ser Gly Thr Ser Tyr Ser Leu Thr Ile Ser Arg Val Glu
225                 230                 235                 240

Ala Glu Asp Ala Ala Thr Tyr Tyr Cys Gln Gln Trp Ser Phe Asn Pro
            245                 250                 255

Pro Thr Phe Gly Gly Gly Thr Lys Leu Glu Ile Lys Arg
        260                 265

<210> SEQ ID NO 66
<211> LENGTH: 795
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 66
atggactgga tctggcgcat cctcttcctc gtcggcgctg ctaccggcgc tcattcggcc       60
cagccggccg acattcaaat gactcagtcc ccttccagct tgtcagcctc agtagggggac     120 cgggtcacga tcacctgtcg agcgtctgag tcagtggata actacgggat ttctttcatg     180
aactggttcc agcagaagcc cggcaaagct cctaagctcc ttatatatgc agcctcaaat     240
caggggagcg gtgttcctag tcgcttcagt ggaagcggta gcggtacgga ctttacgttg     300
acgataagta gccttcagcc agatgacttt gccacttatt attgtcagca gtctaaggaa     360
gttccttgga cgtttggcca aggaacgaag gtcgaaatca aggggggagg gggctcagga     420
gggggcggca gtggtggtgg aggctctcaa gtccaactcg tacagtctgg cgcggaggtt     480
aaaaagccgg gaagctccgt gaaagtatcc tgtaaggcaa gcggatacac ctttaccgat     540
tataacatgc actgggttag gcaggcgccc ggccaaggtc tggaatggat cggttatatt     600
tatccataca cggtggtac cggctataat cagaagttta agagtaaggc tactattaca     660
gcggatgagt caaccaatac tgcatacatg gagctctcct cactcaggag cgaagatacc     720
gcagtgtatt actgtgcccg agggagacca gccatggact actggggtca gggtacccct     780
gtgacagtat ctagc                                                      795

<210> SEQ ID NO 67
<211> LENGTH: 265
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 67

Met Asp Trp Ile Trp Arg Ile Leu Phe Leu Val Gly Ala Ala Thr Gly
1               5                   10                  15

Ala His Ser Ala Gln Pro Ala Asp Ile Gln Met Thr Gln Ser Pro Ser
            20                  25                  30

Ser Leu Ser Ala Ser Val Gly Asp Arg Val Thr Ile Thr Cys Arg Ala
        35                  40                  45

Ser Glu Ser Val Asp Asn Tyr Gly Ile Ser Phe Met Asn Trp Phe Gln
    50                  55                  60

Gln Lys Pro Gly Lys Ala Pro Lys Leu Leu Ile Tyr Ala Ala Ser Asn
65                  70                  75                  80

Gln Gly Ser Gly Val Pro Ser Arg Phe Ser Gly Ser Gly Ser Gly Thr
                85                  90                  95

Asp Phe Thr Leu Thr Ile Ser Ser Leu Gln Pro Asp Phe Ala Thr
            100                 105                 110

Tyr Tyr Cys Gln Gln Ser Lys Glu Val Pro Trp Thr Phe Gly Gln Gly
        115                 120                 125

Thr Lys Val Glu Ile Lys Gly Gly Gly Ser Gly Gly Gly Gly Ser
    130                 135                 140

Gly Gly Gly Gly Ser Gln Val Gln Leu Val Gln Ser Gly Ala Glu Val
145                 150                 155                 160

Lys Lys Pro Gly Ser Ser Val Lys Val Ser Cys Lys Ala Ser Gly Tyr
                165                 170                 175

Thr Phe Thr Asp Tyr Asn Met His Trp Val Arg Gln Ala Pro Gly Gln
            180                 185                 190

Gly Leu Glu Trp Ile Gly Tyr Ile Tyr Pro Tyr Asn Gly Gly Thr Gly
        195                 200                 205

Tyr Asn Gln Lys Phe Lys Ser Lys Ala Thr Ile Thr Ala Asp Glu Ser
    210                 215                 220

Thr Asn Thr Ala Tyr Met Glu Leu Ser Ser Leu Arg Ser Glu Asp Thr
225                 230                 235                 240

Ala Val Tyr Tyr Cys Ala Arg Gly Arg Pro Ala Met Asp Tyr Trp Gly
                245                 250                 255

Gln Gly Thr Leu Val Thr Val Ser Ser
            260                 265

<210> SEQ ID NO 68
<211> LENGTH: 840
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 68
atggactgga tctggcgcat cctcttcctc gtcggcgctg ctaccggcgc tcattcggcc      60
cagccggccg atatcgagct cacccaatct ccaaaattca gtccacatc agtaggagac      120 agggtcagcg tcacctgcaa ggccagtcag aatgtggata ctaatgtagc gtggtatcaa     180
caaaaaccag gcaatctcc tgaaccactg cttttctcgg catcctaccg ttacactgga      240
gtccctgatc gcttcacagg cagtggatct gggacagatt tcactctcac catcagcaat     300
gtgcagtctg aagacttggc agagtatttc tgtcagcaat ataacagcta tcctctgacg     360
ttcggtggcg gcaccaagct ggaaatcaaa cgggctgccg cagaaggtgg aggcggttca     420
ggtggcggag gttccggcgg aggtggctct ggcggtggcg gatcggccat ggcccaggtg     480
aagctgcagc agtcaggagg gggcttggtg caacctggag ctccatgaa actctcctgt      540 gttgtctctg gattcacttt cagtaattac tggatgaact gggtccgcca gtctccagag     600 aagggcttg agtggattgc agaaattaga ttgaaatcca ataattttgg aagatattat      660
gcggagtctg tgaaagggag gttcaccatc tcaagagatg attccaaaag tagtgcctac     720
ctgcaaatga tcaacctaag agctgaagat actggcattt attactgtac cagttatggt     780
aactacgttg gcactatttt tgaccactgg ggccaaggga ccacggtcac cgtatcgagt     840

<210> SEQ ID NO 69
<211> LENGTH: 280
<212> TYPE: PRT
<213> ORGANISM: Artificial Sequence

```
<220> FEATURE:
<221> NAME/KEY: source
<223> OTHER INFORMATION: /note="Description of Artificial Sequence:
      Synthetic polypeptide"

<400> SEQUENCE: 69

Met Asp Trp Ile Trp Arg Ile Leu Phe Leu Val Gly Ala Ala Thr Gly
1               5                   10                  15

Ala His Ser Ala Gln Pro Ala Asp Ile Glu Leu Thr Gln Ser Pro Lys
            20                  25                  30

Phe Met Ser Thr Ser Val Gly Asp Arg Val Ser Val Thr Cys Lys Ala
        35                  40                  45

Ser Gln Asn Val Asp Thr Asn Val Ala Trp Tyr Gln Lys Pro Gly
50                  55                  60

Gln Ser Pro Glu Pro Leu Leu Phe Ser Ala Ser Tyr Arg Tyr Thr Gly
65                  70                  75                  80

Val Pro Asp Arg Phe Thr Gly Ser Gly Ser Gly Thr Asp Phe Thr Leu
                85                  90                  95

Thr Ile Ser Asn Val Gln Ser Glu Asp Leu Ala Glu Tyr Phe Cys Gln
            100                 105                 110

Gln Tyr Asn Ser Tyr Pro Leu Thr Phe Gly Gly Gly Thr Lys Leu Glu
        115                 120                 125

Ile Lys Arg Ala Ala Ala Glu Gly Gly Gly Ser Gly Gly Gly Gly
130                 135                 140

Ser Gly Gly Gly Gly Ser Gly Gly Gly Ser Ala Met Ala Gln Val
145                 150                 155                 160

Lys Leu Gln Gln Ser Gly Gly Gly Leu Val Gln Pro Gly Gly Ser Met
                165                 170                 175

Lys Leu Ser Cys Val Val Ser Gly Phe Thr Phe Ser Asn Tyr Trp Met
                180                 185                 190

Asn Trp Val Arg Gln Ser Pro Glu Lys Gly Leu Glu Trp Ile Ala Glu
            195                 200                 205

Ile Arg Leu Lys Ser Asn Asn Phe Gly Arg Tyr Tyr Ala Glu Ser Val
210                 215                 220

Lys Gly Arg Phe Thr Ile Ser Arg Asp Asp Ser Lys Ser Ser Ala Tyr
225                 230                 235                 240

Leu Gln Met Ile Asn Leu Arg Ala Glu Asp Thr Gly Ile Tyr Tyr Cys
                245                 250                 255

Thr Ser Tyr Gly Asn Tyr Val Gly His Tyr Phe Asp His Trp Gly Gln
            260                 265                 270

Gly Thr Thr Val Thr Val Ser Ser
            275                 280

<210> SEQ ID NO 70
<211> LENGTH: 807
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 70
atggactgga tctggcggat tctgtttctc gtgggagctg ccacaggcgc tcattctgct    60
cagcctgccg atattcttct tactcaatct cccgttattt tgtcagtatc cccaggtgag   120
cgagtcagct tctcttgtcg agcgtcacaa tccattggca caacataca ttggtaccaa   180
```

```
cagcgcacca acgggtctcc ccggctcttg attaagtacg catcagaaag tatttctggg    240
atacccagta ggttctcagg gagcgggagt ggcactgact ttaccctgtc cataaacagc    300
gttgagtctg aggacatcgc ggactactat tgtcagcaga acaacaattg gccgaccacg    360
tttggtgcgg gaacaaaact tgaactcaaa ggcggcggag gaagcggagg cggaggatct    420
gggggcggag gctctggcgg aggggggatct caggtgcagc tcaaacagtc aggacctggc    480
ctcgttcagc caagccaatc actgagtata acgtgcacgg tgagcggctt tagcctgaca    540
aactatggtg tccactgggt ccgccaatct cctggaaaag gcttggagtg gctcggtgtt    600
atctggtccg gtggtaacac agactacaac acgccattca ccagtcgcct tagtattaac    660
aaggacaact ccaagtctca ggttttcttt aaaatgaact ctctgcagtc taatgatacc    720
gcaatttact actgtgcgag ggcactcacg tactatgact atgagttcgc gtattggggc    780
caagggactc tcgttactgt ctcagcg                                        807
```

<210> SEQ ID NO 71
<211> LENGTH: 269
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 71

```
Met Asp Trp Ile Trp Arg Ile Leu Phe Leu Val Gly Ala Ala Thr Gly
1               5                   10                  15

Ala His Ser Ala Gln Pro Ala Asp Ile Leu Leu Thr Gln Ser Pro Val
            20                  25                  30

Ile Leu Ser Val Ser Pro Gly Glu Arg Val Ser Phe Ser Cys Arg Ala
        35                  40                  45

Ser Gln Ser Ile Gly Thr Asn Ile His Trp Tyr Gln Gln Arg Thr Asn
    50                  55                  60

Gly Ser Pro Arg Leu Leu Ile Lys Tyr Ala Ser Glu Ser Ile Ser Gly
65                  70                  75                  80

Ile Pro Ser Arg Phe Ser Gly Ser Gly Ser Gly Thr Asp Phe Thr Leu
                85                  90                  95

Ser Ile Asn Ser Val Glu Ser Glu Asp Ile Ala Asp Tyr Tyr Cys Gln
            100                 105                 110

Gln Asn Asn Asn Trp Pro Thr Thr Phe Gly Ala Gly Thr Lys Leu Glu
        115                 120                 125

Leu Lys Gly Gly Gly Gly Ser Gly Gly Gly Ser Gly Gly Gly
    130                 135                 140

Ser Gly Gly Gly Ser Gln Val Gln Leu Lys Gln Ser Gly Pro Gly
145                 150                 155                 160

Leu Val Gln Pro Ser Gln Ser Leu Ser Ile Thr Cys Thr Val Ser Gly
                165                 170                 175

Phe Ser Leu Thr Asn Tyr Gly Val His Trp Val Arg Gln Ser Pro Gly
            180                 185                 190

Lys Gly Leu Glu Trp Leu Gly Val Ile Trp Ser Gly Gly Asn Thr Asp
        195                 200                 205

Tyr Asn Thr Pro Phe Thr Ser Arg Leu Ser Ile Asn Lys Asp Asn Ser
    210                 215                 220

Lys Ser Gln Val Phe Phe Lys Met Asn Ser Leu Gln Ser Asn Asp Thr
225                 230                 235                 240
```

Ala Ile Tyr Tyr Cys Ala Arg Ala Leu Thr Tyr Tyr Asp Tyr Glu Phe
            245                 250                 255

Ala Tyr Trp Gly Gln Gly Thr Leu Val Thr Val Ser Ala
        260                 265

<210> SEQ ID NO 72
<211> LENGTH: 822
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 72
atggactgga tctggcggat tctgtttctc gtgggagctg ccacaggcgc tcattctgct      60
cagcctgccg atgttgtaat gacgcagtca ccctgtcac tcccggtcac acccggagaa     120
ccagcgtcaa ttagctgccg atctagccaa agtttgcttc attccaatgg ttacaattat    180
ctcgactggt acttgcagaa acccggccaa tcccctcagc tgctcatcta ccttgggtct    240
aatagggcat ctggggttcc gataggttc tctggctccg ggagcggcac cgactttacg     300
ttgaaaatct ctagggttga ggcggaagac gtaggcgttt actattgcat gcaggggacc    360
cactggccgc tgaccttcgg ccagggcacc aaggttgaaa taaaaggcgg cggaggaagc    420
ggaggcggag gatctggggg cggaggctct ggcggagggg gatctcaggt acagctccag    480
gaatcaggac ccggtttggt taagccctcc gggacccttt ccctcacgtg tgcagtctca    540
ggtgggtcaa ttagttcttc caattggtgg tcttgggtgc ggcaaccacc tggtaaaggt    600
ctcgagtgga tagggaaat ttatcatagt ggctccacca attataaccc ctcactcaag     660 tccaggtta cgatatctgt ggacaaaagt aaaaaccaat tctccctcaa acttagtagt    720
gtaacagcgg cagacaccgc ggtgtactac tgcgcacggt ggacaggccg aactgatgcc    780
tttgacattt ggggacaggg aactatggtg actgtgtcat cc                        822

<210> SEQ ID NO 73
<211> LENGTH: 274
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 73

Met Asp Trp Ile Trp Arg Ile Leu Phe Leu Val Gly Ala Ala Thr Gly
1               5                   10                  15

Ala His Ser Ala Gln Pro Ala Asp Val Val Met Thr Gln Ser Pro Leu
            20                  25                  30

Ser Leu Pro Val Thr Pro Gly Glu Pro Ala Ser Ile Ser Cys Arg Ser
        35                  40                  45

Ser Gln Ser Leu Leu His Ser Asn Gly Tyr Asn Tyr Leu Asp Trp Tyr
    50                  55                  60

Leu Gln Lys Pro Gly Gln Ser Pro Gln Leu Leu Ile Tyr Leu Gly Ser
65                  70                  75                  80

Asn Arg Ala Ser Gly Val Pro Asp Arg Phe Ser Gly Ser Gly Ser Gly
                85                  90                  95

Thr Asp Phe Thr Leu Lys Ile Ser Arg Val Glu Ala Glu Asp Val Gly
            100                 105                 110

Val Tyr Tyr Cys Met Gln Gly Thr His Trp Pro Leu Thr Phe Gly Gln
            115                 120                 125

Gly Thr Lys Val Glu Ile Lys Gly Gly Gly Ser Gly Gly Gly Gly
    130                 135                 140

Ser Gly Gly Gly Ser Gly Gly Gly Gly Ser Gln Val Gln Leu Gln
145                 150                 155                 160

Glu Ser Gly Pro Gly Leu Val Lys Pro Ser Gly Thr Leu Ser Leu Thr
                165                 170                 175

Cys Ala Val Ser Gly Gly Ser Ile Ser Ser Asn Trp Trp Ser Trp
            180                 185                 190

Val Arg Gln Pro Pro Gly Lys Gly Leu Glu Trp Ile Gly Glu Ile Tyr
    195                 200                 205

His Ser Gly Ser Thr Asn Tyr Asn Pro Ser Leu Lys Ser Arg Val Thr
    210                 215                 220

Ile Ser Val Asp Lys Ser Lys Asn Gln Phe Ser Leu Lys Leu Ser Ser
225                 230                 235                 240

Val Thr Ala Ala Asp Thr Ala Val Tyr Tyr Cys Ala Arg Trp Thr Gly
            245                 250                 255

Arg Thr Asp Ala Phe Asp Ile Trp Gly Gln Gly Thr Met Val Thr Val
            260                 265                 270

Ser Ser

<210> SEQ ID NO 74
<211> LENGTH: 822
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 74
atggactgga tctggcggat tctgtttctc gtgggagctg ccacaggcgc tcattctgct      60
cagcctgccg atatccaaat gactcaatct cctagttcac tgtcagcctc tgttggtgat     120
cgcgtgacca ttacctgcca agctagccag gatattagca actacttgaa ctggtatcag     180
cagaagcctg gcaaagcccc aaagctgttg atctacgatg taagtaactt ggaaactggc     240
gtcccaagcc gcttctctgg atctggttca ggcaccgact tcactttcac tatcagcagc     300
ctgcagcctg aagatatcgc aacctactat tgccagcagg ttgctaatgt tcctctgact     360
ttcggccaag caccaaggt ggagatcaag gcggcggag gaagcggagg cggaggatct      420
gggggcggag gctctggcgg aggggatct gaagttcagc ttgtagaatc tggaggtgga      480
ttggttcaac tggtggctc tcttcgcctg agttgtgcag cctctggttt tactttctct      540
agttactgga tgcattgggt tcgtcaggct cctgggaaag gcctggaatg ggtttcagct     600
attagttgga gtggagatag tacttactac gcagacagtg tgaaaggtcg cttcaccatc     660
agccgtgata attctaagaa cactttgtac ctgcaaatga actccttgcg cgcagaagac     720
acggctgtgt actattgtgc ccgtgatcgc tctgcgactt ggtattatct ggggcttggt     780
ttcgatgtat ggggacaagg taccctggta acggtttcta gc                       822

<210> SEQ ID NO 75
<211> LENGTH: 274
<212> TYPE: PRT
<213> ORGANISM: Artificial Sequence
<220> FEATURE:
<221> NAME/KEY: source
<223> OTHER INFORMATION: /note="Description of Artificial Sequence:
Synthetic polypeptide"

<400> SEQUENCE: 75

Met Asp Trp Ile Trp Arg Ile Leu Phe Leu Val Gly Ala Ala Thr Gly
1               5                   10                  15

Ala His Ser Ala Gln Pro Ala Asp Ile Gln Met Thr Gln Ser Pro Ser
            20                  25                  30

Ser Leu Ser Ala Ser Val Gly Asp Arg Val Thr Ile Thr Cys Gln Ala
        35                  40                  45

Ser Gln Asp Ile Ser Asn Tyr Leu Asn Trp Tyr Gln Gln Lys Pro Gly
    50                  55                  60

Lys Ala Pro Lys Leu Leu Ile Tyr Asp Val Ser Asn Leu Glu Thr Gly
65                  70                  75                  80

Val Pro Ser Arg Phe Ser Gly Ser Gly Ser Gly Thr Asp Phe Thr Phe
                85                  90                  95

Thr Ile Ser Ser Leu Gln Pro Glu Asp Ile Ala Thr Tyr Tyr Cys Gln
            100                 105                 110

Gln Val Ala Asn Val Pro Leu Thr Phe Gly Gln Gly Thr Lys Val Glu
        115                 120                 125

Ile Lys Gly Gly Gly Gly Ser Gly Gly Gly Ser Gly Gly Gly Gly
    130                 135                 140

Ser Gly Gly Gly Gly Ser Glu Val Gln Leu Val Glu Ser Gly Gly Gly
145                 150                 155                 160

Leu Val Gln Pro Gly Gly Ser Leu Arg Leu Ser Cys Ala Ala Ser Gly
                165                 170                 175

Phe Thr Phe Ser Ser Tyr Trp Met His Trp Val Arg Gln Ala Pro Gly
            180                 185                 190

Lys Gly Leu Glu Trp Val Ser Ala Ile Ser Trp Ser Gly Asp Ser Thr
        195                 200                 205

Tyr Tyr Ala Asp Ser Val Lys Gly Arg Phe Thr Ile Ser Arg Asp Asn
    210                 215                 220

Ser Lys Asn Thr Leu Tyr Leu Gln Met Asn Ser Leu Arg Ala Glu Asp
225                 230                 235                 240

Thr Ala Val Tyr Tyr Cys Ala Arg Asp Arg Ser Ala Thr Trp Tyr Tyr
                245                 250                 255

Leu Gly Leu Gly Phe Asp Val Trp Gly Gln Gly Thr Leu Val Thr Val
            260                 265                 270

Ser Ser

<210> SEQ ID NO 76
<211> LENGTH: 825
<212> TYPE: DNA
<213> ORGANISM: Artificial Sequence
<220> FEATURE:
<221> NAME/KEY: source
<223> OTHER INFORMATION: /note="Description of Artificial Sequence:
Synthetic polynucleotide"

<400> SEQUENCE: 76
atggactgga tctggcggat tctgtttctc gtgggagctg ccacaggcgc tcattctgct     60
cagcctgccg acatccagat gacccagagc cccagcagcc tgagcgccag cgtgggcgac    120
agagtgacca tcacctgcag agccagccag gacgtgaaca ccgccgtggc ctggtaccag    180
cagaagcccg gcaaggcccc caagctgctg atctacagcg ccagcttcct gtacagcggc    240
gtgcccagca gattcagcgg cagcagaagc ggcaccgact tcaccctgac catcagcagc    300

```
ctgcagcccg aggacttcgc cacctactac tgccagcagc actacaccac cccccccacc    360
ttcggccagg gcaccaaggt ggagatcaag tcctcagggg gcgggggaag tggtgggggc    420
ggcagcggcg gagggggctc aggaggaggc ggatcaggcg gatcagaggt gcagctggtg    480
gagagcggcg gcggcctggt gcagcccggc ggcagcctga gactgagctg cgccgccagc    540
ggcttcaaca tcaaggacac ctacatccac tgggtgagac aggcccccgg caagggcctg    600
gagtgggtgg ccagaatcta ccccaccaac ggctacacca gatacgccga cagcgtgaag    660
ggcagattca ccatcagcgc cgacaccagc aagaacaccg cctacctgca gatgaacagc    720
ctgagagccg aggacaccgc cgtgtactac tgcagcagat ggggcggcga cggcttctac    780
gccatggact actggggcca gggcaccctg gtgaccgtga gcagc                   825
```

```
<210> SEQ ID NO 77
<211> LENGTH: 275
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 77

Met Asp Trp Ile Trp Arg Ile Leu Phe Leu Val Gly Ala Ala Thr Gly
1               5                   10                  15

Ala His Ser Ala Gln Pro Ala Asp Ile Gln Met Thr Gln Ser Pro Ser
                20                  25                  30

Ser Leu Ser Ala Ser Val Gly Asp Arg Val Thr Ile Thr Cys Arg Ala
            35                  40                  45

Ser Gln Asp Val Asn Thr Ala Val Ala Trp Tyr Gln Gln Lys Pro Gly
        50                  55                  60

Lys Ala Pro Lys Leu Leu Ile Tyr Ser Ala Ser Phe Leu Tyr Ser Gly
65                  70                  75                  80

Val Pro Ser Arg Phe Ser Gly Ser Arg Ser Gly Thr Asp Phe Thr Leu
                85                  90                  95

Thr Ile Ser Ser Leu Gln Pro Glu Asp Phe Ala Thr Tyr Tyr Cys Gln
                100                 105                 110

Gln His Tyr Thr Thr Pro Pro Thr Phe Gly Gln Gly Thr Lys Val Glu
            115                 120                 125

Ile Lys Ser Ser Gly Gly Gly Ser Gly Gly Gly Ser Gly Gly
        130                 135                 140

Gly Gly Ser Gly Gly Gly Ser Gly Gly Ser Glu Val Gln Leu Val
145                 150                 155                 160

Glu Ser Gly Gly Gly Leu Val Gln Pro Gly Gly Ser Leu Arg Leu Ser
                165                 170                 175

Cys Ala Ala Ser Gly Phe Asn Ile Lys Asp Thr Tyr Ile His Trp Val
                180                 185                 190

Arg Gln Ala Pro Gly Lys Gly Leu Glu Trp Val Ala Arg Ile Tyr Pro
            195                 200                 205

Thr Asn Gly Tyr Thr Arg Tyr Ala Asp Ser Val Lys Gly Arg Phe Thr
        210                 215                 220

Ile Ser Ala Asp Thr Ser Lys Asn Thr Ala Tyr Leu Gln Met Asn Ser
225                 230                 235                 240

Leu Arg Ala Glu Asp Thr Ala Val Tyr Tyr Cys Ser Arg Trp Gly Gly
                245                 250                 255
```

Asp Gly Phe Tyr Ala Met Asp Tyr Trp Gly Gln Gly Thr Leu Val Thr
            260                 265                 270

Val Ser Ser
    275

<210> SEQ ID NO 78
<211> LENGTH: 798
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 78

| | |
|---|---|
| atggactgga tctggcggat tctgtttctc gtgggagctg ccacaggcgc tcattctgct | 60 |
| cagcctgcca gcatcgtgat gacccagact cctaagttcc tgctggtgtc tgccggcgac | 120 |
| agagtgacca tcacctgtaa agccagccag agcgtgtcca acgacgtggc ctggtatcag | 180 |
| cagaagcctg gacagagccc caagctgctg atctacagcg ccagcaacag atacaccggc | 240 |
| gtgcccgata gattcaccgg ctctggctac ggcaccgact tcacctttac catcagcacc | 300 |
| gtgcaggccg aggatctggc cgtgtacttc tgccagcaag actacagctc tctcggcgga | 360 |
| ggcaccaagc tggaaatcaa aggcggcgga ggaagcggag cggaggatc tggggcggga | 420 |
| ggctctggcg gaggggatc tcaggtgcaa gtgaaagagt ctggccctgg actggtggcc | 480 |
| ccaagccagt ctctgagcat cacatgtacc gtgtccggct cagcctgac caactatggc | 540 |
| gtgcactggg tccgacagcc tccaggcaaa ggactggaat ggctgggagt gatttgggct | 600 |
| ggcggcagca ccaactacaa cagcgccctg atgagccggc tgagcatctc caaggacaac | 660 |
| agcaagagcc aggtgttcct gaagatgaac agcctgcaga ccgacgacac cgccatgtac | 720 |
| tactgtgcta gcagaggcgg caactacggc tacgccctgg attattgggg ccagggcaca | 780 |
| agcgtgaccg tgtcatct | 798 |

<210> SEQ ID NO 79
<211> LENGTH: 798
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 79

| | |
|---|---|
| atggactgga tctggcggat tctgtttctc gtgggagctg ccacaggcgc tcattctgct | 60 |
| cagcctgccc aggtgcaagt gaaagagtct ggccctggac tggtggcccc aagccagtct | 120 |
| ctgagcatca catgtaccgt gtccggcttc agcctgacca actatggcgt gcactgggtc | 180 |
| cgacagcctc caggcaaagg actggaatgg ctgggagtga tttgggctgg cggcagcacc | 240 |
| aactacaaca gcgccctgat gagccggctg agcatctcca aggacaacag caagagccag | 300 |
| gtgttcctga agatgaacag cctgcagacc gacgacaccg ccatgtacta ctgtgctagc | 360 |
| agaggcggca actacggcta cgccctggat tattggggcc agggcacaag cgtgaccgtg | 420 |
| tcatctggcg gcggaggaag cggaggcgga ggatctgggg cggaggctc tggcggaggg | 480 |
| ggatctagca tcgtgatgac ccagactcct aagttcctgc tggtgtctgc cggcgacaga | 540 |
| gtgaccatca cctgtaaagc cagccagagc gtgtccaacg acgtggcctg gtatcagcag | 600 |
| aagcctggac agagccccaa gctgctgatc tacagcgcca gcaacagata caccggcgtg | 660 |

```
cccgatagat tcaccggctc tggctacggc accgacttca cctttaccat cagcaccgtg    720
caggccgagg atctggccgt gtacttctgc cagcaagact acagctctct cggcggaggc    780
accaagctgg aaatcaaa                                                   798
```

<210> SEQ ID NO 80
<211> LENGTH: 266
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 80

```
Met Asp Trp Ile Trp Arg Ile Leu Phe Leu Val Gly Ala Ala Thr Gly
1               5                   10                  15

Ala His Ser Ala Gln Pro Ala Ser Ile Val Met Thr Gln Thr Pro Lys
            20                  25                  30

Phe Leu Leu Val Ser Ala Gly Asp Arg Val Thr Ile Thr Cys Lys Ala
        35                  40                  45

Ser Gln Ser Val Ser Asn Asp Val Ala Trp Tyr Gln Gln Lys Pro Gly
    50                  55                  60

Gln Ser Pro Lys Leu Leu Ile Tyr Ser Ala Ser Asn Arg Tyr Thr Gly
65                  70                  75                  80

Val Pro Asp Arg Phe Thr Gly Ser Gly Tyr Gly Thr Asp Phe Thr Phe
                85                  90                  95

Thr Ile Ser Thr Val Gln Ala Glu Asp Leu Ala Val Tyr Phe Cys Gln
            100                 105                 110

Gln Asp Tyr Ser Ser Leu Gly Gly Gly Thr Lys Leu Glu Ile Lys Gly
        115                 120                 125

Gly Gly Gly Ser Gly Gly Gly Gly Ser Gly Gly Gly Gly Ser Gly Gly
    130                 135                 140

Gly Gly Ser Gln Val Gln Val Lys Glu Ser Gly Pro Gly Leu Val Ala
145                 150                 155                 160

Pro Ser Gln Ser Leu Ser Ile Thr Cys Thr Val Ser Gly Phe Ser Leu
                165                 170                 175

Thr Asn Tyr Gly Val His Trp Val Arg Gln Pro Pro Gly Lys Gly Leu
            180                 185                 190

Glu Trp Leu Gly Val Ile Trp Ala Gly Gly Ser Thr Asn Tyr Asn Ser
        195                 200                 205

Ala Leu Met Ser Arg Leu Ser Ile Ser Lys Asp Asn Ser Lys Ser Gln
    210                 215                 220

Val Phe Leu Lys Met Asn Ser Leu Gln Thr Asp Asp Thr Ala Met Tyr
225                 230                 235                 240

Tyr Cys Ala Ser Arg Gly Gly Asn Tyr Gly Tyr Ala Leu Asp Tyr Trp
                245                 250                 255

Gly Gln Gly Thr Ser Val Thr Val Ser Ser
            260                 265
```

<210> SEQ ID NO 81
<211> LENGTH: 266
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 81

Met Asp Trp Ile Trp Arg Ile Leu Phe Leu Val Gly Ala Ala Thr Gly
1               5                   10                  15

Ala His Ser Ala Gln Pro Ala Gln Val Gln Val Lys Glu Ser Gly Pro
            20                  25                  30

Gly Leu Val Ala Pro Ser Gln Ser Leu Ser Ile Thr Cys Thr Val Ser
        35                  40                  45

Gly Phe Ser Leu Thr Asn Tyr Gly Val His Trp Val Arg Gln Pro Pro
    50                  55                  60

Gly Lys Gly Leu Glu Trp Leu Gly Val Ile Trp Ala Gly Gly Ser Thr
65                  70                  75                  80

Asn Tyr Asn Ser Ala Leu Met Ser Arg Leu Ser Ile Ser Lys Asp Asn
                85                  90                  95

Ser Lys Ser Gln Val Phe Leu Lys Met Asn Ser Leu Gln Thr Asp Asp
            100                 105                 110

Thr Ala Met Tyr Tyr Cys Ala Ser Arg Gly Gly Asn Tyr Gly Tyr Ala
        115                 120                 125

Leu Asp Tyr Trp Gly Gln Gly Thr Ser Val Thr Val Ser Ser Gly Gly
    130                 135                 140

Gly Gly Ser Gly Gly Gly Ser Gly Gly Gly Ser Gly Gly Gly
145                 150                 155                 160

Gly Ser Ser Ile Val Met Thr Gln Thr Pro Lys Phe Leu Leu Val Ser
                165                 170                 175

Ala Gly Asp Arg Val Thr Ile Thr Cys Lys Ala Ser Gln Ser Val Ser
            180                 185                 190

Asn Asp Val Ala Trp Tyr Gln Gln Lys Pro Gly Gln Ser Pro Lys Leu
        195                 200                 205

Leu Ile Tyr Ser Ala Ser Asn Arg Tyr Thr Gly Val Pro Asp Arg Phe
    210                 215                 220

Thr Gly Ser Gly Tyr Gly Thr Asp Phe Thr Phe Thr Ile Ser Thr Val
225                 230                 235                 240

Gln Ala Glu Asp Leu Ala Val Tyr Phe Cys Gln Gln Asp Tyr Ser Ser
                245                 250                 255

Leu Gly Gly Gly Thr Lys Leu Glu Ile Lys
            260                 265

<210> SEQ ID NO 82
<211> LENGTH: 61
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 82

Leu Ser Asn Ser Ile Met Tyr Phe Ser His Phe Val Pro Val Phe Leu
1               5                   10                  15

Pro Ala Lys Pro Thr Thr Thr Pro Ala Pro Arg Pro Pro Thr Pro Ala
            20                  25                  30

Pro Thr Ile Ala Ser Gln Pro Leu Ser Leu Arg Pro Glu Ala Cys Arg
        35                  40                  45

Pro Ala Ala Gly Gly Ala Val His Thr Arg Gly Leu Asp
    50                  55                  60

<210> SEQ ID NO 83
<211> LENGTH: 183
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 83

```
ctgagcaaca gcatcatgta cttcagccac ttcgtgcctg tgttcctgcc tgccaagcct      60
acaacaacac cagcccctag acctccaacc cctgccccta caattgcctc tcagcctctg     120
tctctgaggc ccgaagcttg tagacctgct gctggcggag ctgtgcacac cagaggactg     180
gat                                                                   183
```

<210> SEQ ID NO 84
<211> LENGTH: 135
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 84

```
Pro Lys Leu Cys Tyr Leu Leu Asp Gly Ile Leu Phe Ile Tyr Gly Val
1               5                   10                  15
Ile Leu Thr Ala Leu Phe Leu Arg Val Lys Phe Ser Arg Ser Ala Asp
            20                  25                  30
Ala Pro Ala Tyr Gln Gln Gly Gln Asn Gln Leu Tyr Asn Glu Leu Asn
        35                  40                  45
Leu Gly Arg Arg Glu Glu Tyr Asp Val Leu Asp Lys Arg Arg Gly Arg
    50                  55                  60
Asp Pro Glu Met Gly Gly Lys Pro Arg Arg Lys Asn Pro Gln Glu Gly
65                  70                  75                  80
Leu Tyr Asn Glu Leu Gln Lys Asp Lys Met Ala Glu Ala Tyr Ser Glu
                85                  90                  95
Ile Gly Met Lys Gly Glu Arg Arg Arg Gly Lys Gly His Asp Gly Leu
            100                 105                 110
Tyr Gln Gly Leu Ser Thr Ala Thr Lys Asp Thr Tyr Asp Ala Leu His
        115                 120                 125
Met Gln Ala Leu Pro Pro Arg
    130                 135
```

<210> SEQ ID NO 85
<211> LENGTH: 822
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 85

```
atggactgga tctggcggat tctgtttctc gtgggagctg ccacaggcgc tcattctgct      60
cagcctgccc tgcccgtcct gacacagtcc gcaagtgtga gtggatcacc tggacaatca     120
attactatca gttgcacagg cacttcctca gacgtaggga gtatgattac gtgtcatgg      180
tatcaacagc atccaggcaa agctcctcag ctcatgattt atgatgtgtc aacagaccg     240
tccggagtat ctaatcgctt cagtggatct aaatccggta atactgcctc cctcaccata     300
```

```
tcagggctcc aggccgaaga tgaagcagac tactattgca gtagttacac tggttcaagt    360
acgctttacg tttttggcac ggggaccaag gtaacggtcc tgggccaacc caaaggcgga    420
ggagggtccg gtggcggtgg cagtggtgga gggggatcag aggtgcaatt ggttgagagc    480
ggtggtgggc tggttaaacc tggcgggtcc ctccgcttgt cttgtgccgc aagcgggttt    540
acctttagta atgcgtggat gagctgggtg cgacaagcac ccggaaaggg cctggagtgg    600
gtcggtagga ttaaaagcaa aacagatggt ggaacaaccg attatgcggc cccagtcaag    660
ggaaggttca ctatttcaag agacgattcc aagaacactc tttacctcca aatgaatagt    720
ttgaaaacag aggatacagc agtgtactat tgcacaacgg actacgactt ttggagcgga    780
tattactact gggggcaagg taccctggtc acagtttcat ca                       822
```

<210> SEQ ID NO 86
<211> LENGTH: 274
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 86

```
Met Asp Trp Ile Trp Arg Ile Leu Phe Leu Val Gly Ala Ala Thr Gly
1               5                   10                  15

Ala His Ser Ala Gln Pro Ala Leu Pro Val Leu Thr Gln Ser Ala Ser
            20                  25                  30

Val Ser Gly Ser Pro Gly Gln Ser Ile Thr Ile Ser Cys Thr Gly Thr
        35                  40                  45

Ser Ser Asp Val Gly Arg Tyr Asp Tyr Val Ser Trp Tyr Gln Gln His
    50                  55                  60

Pro Gly Lys Ala Pro Gln Leu Met Ile Tyr Asp Val Ser Asn Arg Pro
65                  70                  75                  80

Ser Gly Val Ser Asn Arg Phe Ser Gly Ser Lys Ser Gly Asn Thr Ala
                85                  90                  95

Ser Leu Thr Ile Ser Gly Leu Gln Ala Glu Asp Glu Ala Asp Tyr Tyr
            100                 105                 110

Cys Ser Ser Tyr Thr Gly Ser Ser Thr Leu Tyr Val Phe Gly Thr Gly
        115                 120                 125

Thr Lys Val Thr Val Leu Gly Gln Pro Lys Gly Gly Gly Ser Gly
    130                 135                 140

Gly Gly Gly Ser Gly Gly Gly Ser Glu Val Gln Leu Val Glu Ser
145                 150                 155                 160

Gly Gly Gly Leu Val Lys Pro Gly Gly Ser Leu Arg Leu Ser Cys Ala
                165                 170                 175

Ala Ser Gly Phe Thr Phe Ser Asn Ala Trp Met Ser Trp Val Arg Gln
            180                 185                 190

Ala Pro Gly Lys Gly Leu Glu Trp Val Gly Arg Ile Lys Ser Lys Thr
        195                 200                 205

Asp Gly Gly Thr Thr Asp Tyr Ala Ala Pro Val Lys Gly Arg Phe Thr
    210                 215                 220

Ile Ser Arg Asp Asp Ser Lys Asn Thr Leu Tyr Leu Gln Met Asn Ser
225                 230                 235                 240

Leu Lys Thr Glu Asp Thr Ala Val Tyr Tyr Cys Thr Thr Asp Tyr Asp
                245                 250                 255
```

```
Phe Trp Ser Gly Tyr Tyr Tyr Trp Gly Gln Gly Thr Leu Val Thr Val
        260                 265                 270
Ser Ser
```

<210> SEQ ID NO 87
<211> LENGTH: 807
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 87

```
atggactgga tctggcggat tctgtttctc gtgggagctg ccacaggcgc tcattctgct      60
cagcctgcca acatccagat gacccagtct ccatcttctg tgtctgcatc tgtaggagac     120
agagtcacca tcacttgtcg ggcgagtcag gatattagcc gctggttagc ctggtatcag     180
cagaaaccag ggaaagcccc taaactcctg atctatgctg catccagttt gcaaagtggg     240
gtcccatcga ggttcagcgg cagtggatct gggacagatt tcgctctcac tatcagcagc     300
ctgcagcctg aagattttgc aacttactat tgtcaacagg ctgacagtcg tttctcgatc     360
accttcggcc aagggacacg actggagatt aaaggcggcg aggaagcgg aggcggagga      420
tctgggggcg aggctctgg cggagggga tctgaggtgc agctggtgca gtctggggga      480
ggcttggtac agcctggggg gtccctgaga ctctcctgtg cagcctctgg attcaccttc     540
agtagctata gcatgaactg ggtccgccag gctccaggga aggggctgga gtgggtttca     600
tacattagta gtagtagtag taccatacag tacgcagact ctgtgaaggg ccgattcacc     660
atctccagag acaatgccaa gaactcactg tatctgcaaa tgaacagcct gagagacgag     720
gacacggctg tgtattactg tgcgagaggg gactactact acggtatgga cgtctggggc     780
caagggacca cggtcaccgt gagctca                                         807
```

<210> SEQ ID NO 88
<211> LENGTH: 269
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 88

```
Met Asp Trp Ile Trp Arg Ile Leu Phe Leu Val Gly Ala Ala Thr Gly
1               5                   10                  15
Ala His Ser Ala Gln Pro Ala Asn Ile Gln Met Thr Gln Ser Pro Ser
            20                  25                  30
Ser Val Ser Ala Ser Val Gly Asp Arg Val Thr Ile Thr Cys Arg Ala
        35                  40                  45
Ser Gln Asp Ile Ser Arg Trp Leu Ala Trp Tyr Gln Gln Lys Pro Gly
    50                  55                  60
Lys Ala Pro Lys Leu Leu Ile Tyr Ala Ala Ser Ser Leu Gln Ser Gly
65                  70                  75                  80
Val Pro Ser Arg Phe Ser Gly Ser Gly Ser Gly Thr Asp Phe Ala Leu
                85                  90                  95
Thr Ile Ser Ser Leu Gln Pro Glu Asp Phe Ala Thr Tyr Tyr Cys Gln
            100                 105                 110
Gln Ala Asp Ser Arg Phe Ser Ile Thr Phe Gly Gln Gly Thr Arg Leu
```

```
                115                 120                 125
Glu Ile Lys Gly Gly Gly Ser Gly Gly Gly Ser Gly Gly Gly
    130                 135                 140

Gly Ser Gly Gly Gly Ser Glu Val Gln Leu Val Gln Ser Gly Gly
145                 150                 155                 160

Gly Leu Val Gln Pro Gly Gly Ser Leu Arg Leu Ser Cys Ala Ala Ser
                165                 170                 175

Gly Phe Thr Phe Ser Ser Tyr Ser Met Asn Trp Val Arg Gln Ala Pro
            180                 185                 190

Gly Lys Gly Leu Glu Trp Val Ser Tyr Ile Ser Ser Ser Ser Thr
        195                 200                 205

Ile Gln Tyr Ala Asp Ser Val Lys Gly Arg Phe Thr Ile Ser Arg Asp
    210                 215                 220

Asn Ala Lys Asn Ser Leu Tyr Leu Gln Met Asn Ser Leu Arg Asp Glu
225                 230                 235                 240

Asp Thr Ala Val Tyr Tyr Cys Ala Arg Gly Asp Tyr Tyr Gly Met
                245                 250                 255

Asp Val Trp Gly Gln Gly Thr Thr Val Thr Val Ser Ser
        260                 265
```

<210> SEQ ID NO 89
<211> LENGTH: 807
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 89

```
atggactgga tctggcggat tctgtttctc gtgggagctg ccacaggcgc tcattctgct     60
cagcctgccg aagttcagct tgtagaatct ggaggtggat tggttcaacc tggtggctct    120
cttcgcctga gttgtgcagc tctggttttt actttcaata gttacgctat gcattgggtt    180
cgtcaggctc ctgggaaagg cctggaatgg gtttcagcta ttagtggtaa tggaggtagt    240
actcgttacg cagacagtgt gaaaggtcgc ttcaccatca gccgtgataa ttctaagaac    300
actttgtacc tgcaaatgaa ctccttgcgc gcagaagaca cggctgtgta ctattgtgcc    360
cgtgatcgct ttcggaaggt tcatggtttc gatgtatggg acaaggtac cctggtaacg    420
gtttctagcg gaggtggtgg gagtggtgga ggcggctcgg gtggaggtgg ttcaggagga    480
ggcggagata tccaaatgac tcaatctcct agttcactgt cagcctctgt tggtgatcgc    540
gtgaccatta cctgccaagc tagccaggat attagcaact acttgaactg gtatcagcag    600
aagcctggca agcccccaaa gctgttgatc tacgatgcaa gtaacttgga aactggcgtc    660
ccaagccgct ctctggatc tggttcaggc accgacttca ctttcactat cagcagcctg    720
cagcctgaag atatcgcaac ctactattgc cagcaggatg ctacttttcc tttgactttc    780
ggccaaggca ccaaggtgga gatcaag                                        807
```

<210> SEQ ID NO 90
<211> LENGTH: 269
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 90

```
Met Asp Trp Ile Trp Arg Ile Leu Phe Leu Val Gly Ala Ala Thr Gly
1               5                   10                  15

Ala His Ser Ala Gln Pro Ala Glu Val Gln Leu Val Glu Ser Gly Gly
            20                  25                  30

Gly Leu Val Gln Pro Gly Gly Ser Leu Arg Leu Ser Cys Ala Ala Ser
        35                  40                  45

Gly Phe Thr Phe Asn Ser Tyr Ala Met His Trp Val Arg Gln Ala Pro
    50                  55                  60

Gly Lys Gly Leu Glu Trp Val Ser Ala Ile Ser Gly Asn Gly Ser
65                  70                  75                  80

Thr Arg Tyr Ala Asp Ser Val Lys Gly Arg Phe Thr Ile Ser Arg Asp
                85                  90                  95

Asn Ser Lys Asn Thr Leu Tyr Leu Gln Met Asn Ser Leu Arg Ala Glu
            100                 105                 110

Asp Thr Ala Val Tyr Tyr Cys Ala Arg Asp Arg Phe Arg Lys Val His
        115                 120                 125

Gly Phe Asp Val Trp Gly Gln Gly Thr Leu Val Thr Val Ser Ser Gly
    130                 135                 140

Gly Gly Gly Ser Gly Gly Gly Gly Ser Gly Gly Gly Gly Ser Gly Gly
145                 150                 155                 160

Gly Gly Asp Ile Gln Met Thr Gln Ser Pro Ser Ser Leu Ser Ala Ser
                165                 170                 175

Val Gly Asp Arg Val Thr Ile Thr Cys Gln Ala Ser Gln Asp Ile Ser
            180                 185                 190

Asn Tyr Leu Asn Trp Tyr Gln Gln Lys Pro Gly Lys Ala Pro Lys Leu
        195                 200                 205

Leu Ile Tyr Asp Ala Ser Asn Leu Glu Thr Gly Val Pro Ser Arg Phe
    210                 215                 220

Ser Gly Ser Gly Ser Gly Thr Asp Phe Thr Phe Thr Ile Ser Ser Leu
225                 230                 235                 240

Gln Pro Glu Asp Ile Ala Thr Tyr Tyr Cys Gln Gln Asp Ala Thr Phe
                245                 250                 255

Pro Leu Thr Phe Gly Gln Gly Thr Lys Val Glu Ile Lys
            260                 265
```

<210> SEQ ID NO 91

<400> SEQUENCE: 91

000

<210> SEQ ID NO 92

<400> SEQUENCE: 92

000

<210> SEQ ID NO 93
<211> LENGTH: 840
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 93

| | |
|---|---|
| atggactgga tctggcggat tctgtttctc gtgggagctg ccacaggcgc tcattctgct | 60 |
| cagcctgccg acatcgtgat gacacagagc ccttctagcc tggccgtgtc cgtgggagag | 120 |
| aaagtgacca tgagctgcaa gagcagccag agcctgctgt actcccggaa ccagaagaac | 180 |
| tacctggcct ggttccagca gaagcccggc cagtctccta agctgctgat cttctgggcc | 240 |
| agcaccagag aaagcggcgt gcccgataga ttcaccggca gcggctttgg caccgacttc | 300 |
| aacctgacaa tcagcagcgt gcaggccgag gacctggctg tgtacgattg ccagcagtac | 360 |
| ttcagctacc ctctgacctt tggagccggc accaagctgg aactgagagg cggcggagga | 420 |
| agcggaggcg gaggatctgg gggcggaggc tctggcggag ggggatctca ggttcagctg | 480 |
| cagcagtctg gacctgagct ggttaagcct ggcgcctccg tgaagatgag ctgcaagacc | 540 |
| agccggtaca ccttcaccga gtacaccatc cactgggtcc gacagagcca cggcaagagc | 600 |
| ctggaatgga tcggcggcat caaccccaac aacggcatcc ccaactacaa ccagaagttc | 660 |
| aagggcagag ccacactgac cgtgggcaag tctagcagca ccgcctacat ggaactgcgg | 720 |
| agcctgacaa gcgaggacag cgccgtgtac ttctgcgcca agaagaat cgcctacggc | 780 |
| tacgatgagg gccacgccat ggattattgg ggccagggaa caagcgtgac cgtgtctagt | 840 |

<210> SEQ ID NO 94
<211> LENGTH: 840
<212> TYPE: DNA
<213> ORGANISM: Artificial Sequence
<220> FEATURE:
<221> NAME/KEY: source
<223> OTHER INFORMATION: /note="Description of Artificial Sequence:
    Synthetic polynucleotide"

<400> SEQUENCE: 94

| | |
|---|---|
| atggactgga tctggcggat tctgtttctc gtgggagctg ccacaggcgc tcattctgct | 60 |
| cagcctgccc aggttcagct gcagcagtct ggacctgagc tggttaagcc tggcgcctcc | 120 |
| gtgaagatga gctgcaagac cagccggtac accttcaccg agtacaccat ccactgggtc | 180 |
| cgacagagcc acggcaagag cctggaatgg atcggcggca tcaaccccaa caacggcatc | 240 |
| cccaactaca accagaagtt caagggcaga gccacactga ccgtgggcaa gtctagcagc | 300 |
| accgcctaca tggaactgcg gagcctgaca agcgaggaca gcgccgtgta cttctgcgcc | 360 |
| agaagaagaa tcgcctacgg ctacgatgag gccacgcca tggattattg gggcagggaa | 420 |
| acaagcgtga ccgtgtctag tggcggcgga ggaagcggag cggaggatc tggggcgga | 480 |
| ggctctggcg gagggggatc tgacatcgtg atgacacaga gccccttctag cctgccgtg | 540 |
| tccgtgggag agaaagtgac catgagctgc aagagcagcc agagcctgct gtactcccgg | 600 |
| aaccagaaga actacctggc ctggttccag cagaagcccg ccagtctcc taagctgctg | 660 |
| atcttctggg ccagcaccag agaaagcggc gtgcccgata gattcaccgg cagcggcttt | 720 |
| ggcaccgact caacctgac aatcagcagc gtgcaggccg aggacctggc tgtgtacgat | 780 |
| tgccagcagt acttcagcta ccctctgacc tttggagccg gcaccaagct ggaactgaga | 840 |

<210> SEQ ID NO 95
<211> LENGTH: 280
<212> TYPE: PRT
<213> ORGANISM: Artificial Sequence
<220> FEATURE:
<221> NAME/KEY: source
<223> OTHER INFORMATION: /note="Description of Artificial Sequence:
    Synthetic polypeptide"

<400> SEQUENCE: 95

Met Asp Trp Ile Trp Arg Ile Leu Phe Leu Val Gly Ala Ala Thr Gly
1               5                   10                  15

Ala His Ser Ala Gln Pro Ala Asp Ile Val Met Thr Gln Ser Pro Ser
            20                  25                  30

Ser Leu Ala Val Ser Val Gly Glu Lys Val Thr Met Ser Cys Lys Ser
        35                  40                  45

Ser Gln Ser Leu Leu Tyr Ser Arg Asn Gln Lys Asn Tyr Leu Ala Trp
    50                  55                  60

Phe Gln Gln Lys Pro Gly Gln Ser Pro Lys Leu Leu Ile Phe Trp Ala
65                  70                  75                  80

Ser Thr Arg Glu Ser Gly Val Pro Asp Arg Phe Thr Gly Ser Gly Phe
            85                  90                  95

Gly Thr Asp Phe Asn Leu Thr Ile Ser Ser Val Gln Ala Glu Asp Leu
        100                 105                 110

Ala Val Tyr Asp Cys Gln Gln Tyr Phe Ser Tyr Pro Leu Thr Phe Gly
    115                 120                 125

Ala Gly Thr Lys Leu Glu Leu Arg Gly Gly Gly Gly Ser Gly Gly Gly
130                 135                 140

Gly Ser Gly Gly Gly Ser Gly Gly Gly Ser Gln Val Gln Leu
145                 150                 155                 160

Gln Gln Ser Gly Pro Glu Leu Val Lys Pro Gly Ala Ser Val Lys Met
                165                 170                 175

Ser Cys Lys Thr Ser Arg Tyr Thr Phe Thr Glu Tyr Thr Ile His Trp
            180                 185                 190

Val Arg Gln Ser His Gly Lys Ser Leu Glu Trp Ile Gly Gly Ile Asn
        195                 200                 205

Pro Asn Asn Gly Ile Pro Asn Tyr Asn Gln Lys Phe Lys Gly Arg Ala
    210                 215                 220

Thr Leu Thr Val Gly Lys Ser Ser Thr Ala Tyr Met Glu Leu Arg
225                 230                 235                 240

Ser Leu Thr Ser Glu Asp Ser Ala Val Tyr Phe Cys Ala Arg Arg Arg
                245                 250                 255

Ile Ala Tyr Gly Tyr Asp Glu Gly His Ala Met Asp Tyr Trp Gly Gln
            260                 265                 270

Gly Thr Ser Val Thr Val Ser Ser
        275                 280

<210> SEQ ID NO 96
<211> LENGTH: 280
<212> TYPE: PRT
<213> ORGANISM: Artificial Sequence
<220> FEATURE:
<221> NAME/KEY: source
<223> OTHER INFORMATION: /note="Description of Artificial Sequence:
    Synthetic polypeptide"

<400> SEQUENCE: 96

Met Asp Trp Ile Trp Arg Ile Leu Phe Leu Val Gly Ala Ala Thr Gly
1               5                   10                  15

Ala His Ser Ala Gln Pro Ala Gln Val Gln Leu Gln Gln Ser Gly Pro
            20                  25                  30

Glu Leu Val Lys Pro Gly Ala Ser Val Lys Met Ser Cys Lys Thr Ser
        35                  40                  45

Arg Tyr Thr Phe Thr Glu Tyr Thr Ile His Trp Val Arg Gln Ser His
    50                  55                  60

Gly Lys Ser Leu Glu Trp Ile Gly Gly Ile Asn Pro Asn Asn Gly Ile
65                  70                  75                  80

Pro Asn Tyr Asn Gln Lys Phe Lys Gly Arg Ala Thr Leu Thr Val Gly
                85                  90                  95

Lys Ser Ser Ser Thr Ala Tyr Met Glu Leu Arg Ser Leu Thr Ser Glu
            100                 105                 110

Asp Ser Ala Val Tyr Phe Cys Ala Arg Arg Ile Ala Tyr Gly Tyr
        115                 120                 125

Asp Glu Gly His Ala Met Asp Tyr Trp Gly Gln Gly Thr Ser Val Thr
    130                 135                 140

Val Ser Gly Gly Gly Gly Ser Gly Gly Gly Ser Gly Gly Gly
145                 150                 155                 160

Gly Ser Gly Gly Gly Gly Ser Asp Ile Val Met Thr Gln Ser Pro Ser
            165                 170                 175

Ser Leu Ala Val Ser Val Gly Glu Lys Val Thr Met Ser Cys Lys Ser
            180                 185                 190

Ser Gln Ser Leu Leu Tyr Ser Arg Asn Gln Lys Asn Tyr Leu Ala Trp
        195                 200                 205

Phe Gln Gln Lys Pro Gly Gln Ser Pro Lys Leu Leu Ile Phe Trp Ala
    210                 215                 220

Ser Thr Arg Glu Ser Gly Val Pro Asp Arg Phe Thr Gly Ser Gly Phe
225                 230                 235                 240

Gly Thr Asp Phe Asn Leu Thr Ile Ser Ser Val Gln Ala Glu Asp Leu
            245                 250                 255

Ala Val Tyr Asp Cys Gln Gln Tyr Phe Ser Tyr Pro Leu Thr Phe Gly
        260                 265                 270

Ala Gly Thr Lys Leu Glu Leu Arg
        275                 280

<210> SEQ ID NO 97

<400> SEQUENCE: 97

000

<210> SEQ ID NO 98

<400> SEQUENCE: 98

000

<210> SEQ ID NO 99

<400> SEQUENCE: 99

000

<210> SEQ ID NO 100

<400> SEQUENCE: 100

000

<210> SEQ ID NO 101

<400> SEQUENCE: 101

000

<210> SEQ ID NO 102

```
<400> SEQUENCE: 102
000

<210> SEQ ID NO 103
<400> SEQUENCE: 103
000

<210> SEQ ID NO 104
<400> SEQUENCE: 104
000

<210> SEQ ID NO 105
<400> SEQUENCE: 105
000

<210> SEQ ID NO 106
<400> SEQUENCE: 106
000

<210> SEQ ID NO 107
<400> SEQUENCE: 107
000

<210> SEQ ID NO 108
<400> SEQUENCE: 108
000

<210> SEQ ID NO 109
<400> SEQUENCE: 109
000

<210> SEQ ID NO 110
<400> SEQUENCE: 110
000

<210> SEQ ID NO 111
<400> SEQUENCE: 111
000

<210> SEQ ID NO 112
<400> SEQUENCE: 112
000

<210> SEQ ID NO 113
<211> LENGTH: 489
<212> TYPE: DNA
```

<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 113

```
atgcgcatca gcaagcccca cctgcgcagc atcagcatcc agtgctacct gtgcctgctg      60
ctgaacagcc acttcctgac cgaggccggc atccacgtgt tcatcctggg ctgcttcagc     120
gccggcctgc ccaagaccga ggccaactgg gtgaacgtga tcagcgacct gaagaagatc     180
gaggacctga tccagagcat gcacatcgac gccaccctgt acaccgagag cgacgtgcac     240
cccagctgca aggtgaccgc catgaagtgc ttcctgctgg agctgcaggt gatcagcctg     300
gagagcggcg acgccagcat ccacgacacc gtggagaacc tgatcatcct ggccaacaac     360
agcctgagca gcaacggcaa cgtgaccgag agcggctgca aggagtgcga ggagctggag     420
gagaagaaca tcaaggagtt cctgcagagc ttcgtgcaca tcgtgcagat gttcatcaac     480
accagctaa                                                             489
```

<210> SEQ ID NO 114
<211> LENGTH: 162
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 114

```
Met Arg Ile Ser Lys Pro His Leu Arg Ser Ile Ser Ile Gln Cys Tyr
1               5                   10                  15

Leu Cys Leu Leu Leu Asn Ser His Phe Leu Thr Glu Ala Gly Ile His
                20                  25                  30

Val Phe Ile Leu Gly Cys Phe Ser Ala Gly Leu Pro Lys Thr Glu Ala
            35                  40                  45

Asn Trp Val Asn Val Ile Ser Asp Leu Lys Lys Ile Glu Asp Leu Ile
50                  55                  60

Gln Ser Met His Ile Asp Ala Thr Leu Tyr Thr Glu Ser Asp Val His
65                  70                  75                  80

Pro Ser Cys Lys Val Thr Ala Met Lys Cys Phe Leu Leu Glu Leu Gln
                85                  90                  95

Val Ile Ser Leu Glu Ser Gly Asp Ala Ser Ile His Asp Thr Val Glu
            100                 105                 110

Asn Leu Ile Ile Leu Ala Asn Asn Ser Leu Ser Ser Asn Gly Asn Val
        115                 120                 125

Thr Glu Ser Gly Cys Lys Glu Cys Glu Glu Leu Glu Glu Lys Asn Ile
    130                 135                 140

Lys Glu Phe Leu Gln Ser Phe Val His Ile Val Gln Met Phe Ile Asn
145                 150                 155                 160

Thr Ser
```

<210> SEQ ID NO 115
<211> LENGTH: 4
<212> TYPE: PRT
<213> ORGANISM: Unknown
<220> FEATURE:
<221> NAME/KEY: source
<223> OTHER INFORMATION: /note="Description of Unknown:
      KDEL peptide"

<400> SEQUENCE: 115

Lys Asp Glu Leu
1

COMBINED INVASION AND CYTOTOXICITY ASSAY USING CHEMOKINE SECRETING TARGET CELLS

RELATED APPLICATION

This application claims priority to U.S. Provisional Application No. 62/713,287, filed on Aug. 1, 2018. The entire content of the provisional application is incorporated herein by reference for all purposes.

SEQUENCE LISTING

The instant application contains a Sequence Listing which has been submitted electronically in ASCII format and is hereby incorporated by reference in its entirety. Said ASCII copy, created on Aug. 1, 2019, is named 104066-1148834-11110WO_SL.txt and is 132,201 bytes in size.

BACKGROUND

Cancer immunotherapies based on adoptively transferred tumor-specific cytotoxic lymphocytes hold promise for the treatment of patients with tumor malignancies. Despite this early success in certain cancers, the treatment of tumors remains a challenge, mostly due to the immunosuppressive nature of the tumor microenvironment. In addition to modified T-cells, immunotherapies based on NK cells are being explored. NK-92 is a cytolytic cancer cell line which was discovered in the blood of a subject suffering from a non-Hodgkin's lymphoma and then immortalized ex vivo. NK-92 cells are derived from NK cells, but lack the major inhibitory receptors that are displayed by normal NK cells, while retaining the majority of the activating receptors. NK-92 cells do not, however, attack normal cells nor do they elicit an unacceptable immune rejection response in humans.

A common driver of lymph node metastasis is the hypoxia-driven upregulation of CCR7, a chemokine receptor primarily found in naïve T-cells and dendritic cells. Upregulation of the CCR7 receptor on blood NK cells has previously been demonstrated to improve the homing of NK cells to lymph nodes, allowing them to follow the same path to the lymph node compartments that are common pathways of metastatic spread, but has not yet been demonstrated in a clinically relevant cell line.

BRIEF SUMMARY

Provided herein are methods for detecting migration and cytotoxicity of effector cells. The compositions and methods described herein provide the unexpected advantage of combining an effector cell that expresses a homing receptor with a target cell that expresses the cognate ligand (i.e., that binds to the receptor) in a single assay which measures both migration and cytotoxicity of effector cells. Another advantage of the methods described herein is the maintenance of a ligand gradient by the constant secretion of ligand from the target cells, so that the gradient does not degrade with time. These advantages represent a superior way to test the efficacy of cellular immunotherapeutics in a more clinically relevant scenario.

In one aspect, the method comprises:
providing a device comprising two or more chambers, wherein at least a first chamber is separated by a membrane from a second chamber, the membrane comprising pores having a diameter that permits an effector cell to pass through the membrane;
adding an effector cell to the first chamber, wherein the effector cell is modified to express a homing receptor;
adding a target cell to the second chamber, wherein the target cell is modified to express a ligand that binds to the homing receptor;
allowing the effector cell to migrate from the first chamber to the second chamber; and
measuring the number of target cells killed by the effector cells.

In some embodiments, the first chamber is located above the second chamber. In some embodiments, the membrane comprises an extra-cellular matrix component or analog that inhibits spontaneous migration of the effector cell.

In some embodiments, the effector cell is an NK-92 cell or a modified NK-92 cell described herein. In some embodiments, the effector cell is stained with a vital dye.

In some embodiments, the effector cell expresses a homing receptor, a cytokine receptor, or a chemokine receptor. In some embodiments, the homing receptor is one that is expressed in a tumor microenvironment. In some embodiments, the homing receptor is expressed by leukocytes, T or B lymphocytes, macrophages, natural killer cells, or dendritic cells. In some embodiments, the homing receptor is a chemokine receptor selected from CCR7 (SEQ ID NO: 14), CXCR2 (SEQ ID NO: 16), or the receptor for CXCL14 (SEQ ID NO: 10). In some embodiments, the homing receptor is CD62L (SEQ ID NO: 12). In some embodiments, the effector cell is a modified NK-92 cell.

In some embodiments, the target cell expresses a ligand that binds to a homing receptor (the cognate receptor-ligand pair). In some embodiments, the ligand is one that is expressed in a tumor microenvironment. In some embodiments, the ligand is expressed by tumor cells, lymphocytes, macrophages, natural killer cells, endothelial cells, or dendritic cells. In some embodiments, the ligand is a cytokine or chemokine. In some embodiments, the target cell expresses a chemokine that binds to the receptor. In some embodiments, the chemokine is CCL19 (SEQ ID NO: 2), CCL21 (SEQ ID NO: 4), interleukin 8 (IL8 or CXCL8 (SEQ ID NO: 6)), C-X-C motif chemokine ligand 1 (CXCL1 (SEQ ID NO: 8)), or C-X-C Motif Chemokine Ligand 14 (CXCL14 (SEQ ID NO: 10)). In some embodiments, the ligand binds CD62L (SEQ ID NO: 12).

In some embodiments, the effector cell further expresses a antigen binding protein or chimeric antigen receptor (CAR) that specifically binds a target antigen, such as a tumor associated antigen. In some embodiments, the tumor associated antigen is CD19, CD20, GD2, HER-2, CD30, EGFR, FAP, CD33, CD123, PD-L1, IGF1R, CSPG4, or B7-H4. In some embodiments, the effector cell expresses a CAR that specifically binds CD19 (SEQ ID NOs: 46, 47, and 63), CD20 (SEQ ID NO: 65), GD2 (SEQ ID NOs: 80 and 81), HER-2 (SEQ ID NO: 77), CD30 (SEQ ID NO: 75), EGFR (SEQ ID NO: 71), FAP (SEQ ID NOs: 95 and 96), CD33 (SEQ ID NO: 67), CD123 (SEQ ID NO: 86), PD-L1 (SEQ ID NO: 88), IGF1R (SEQ ID NO: 73), CSPG4 (SEQ ID NO: 69), or B7-H4 (SEQ ID NO: 90). In some embodiments, the CAR specifically binds: i) CD19 and comprises an amino acid sequence selected from SEQ ID NOs: 46, 47, or 63; ii) CD20 and comprises an amino acid sequence of SEQ ID NO: 65; iii) GD2 and comprises an amino acid sequence selected from SEQ ID NOs: 80 or 81; iv) HER-2 and comprises an amino acid sequence of SEQ ID NO: 77; v) CD30 and comprises an amino acid sequence of SEQ ID NO: 75; vi) EGFR and comprises an amino acid sequence of SEQ ID NO: 71; vii) FAP and comprises an amino acid sequence selected from SEQ ID NOs: 95 or 96; viii) CD33 and comprises an amino acid sequence of SEQ ID NO: 67; ix) CD 123 and comprises an amino acid sequence of SEQ ID NO: 86; x) PD-L1 and comprises an amino acid sequence of SEQ ID NO: 88); xi) IGF1R and comprises an amino acid sequence of SEQ ID NO: 73; xii) CSPG4 and comprises an amino acid sequence of SEQ ID NO: 69; or xiii) B7-H4 and comprises an amino acid sequence of SEQ ID NO: 90.

In some embodiments, the target cell is a K562 cell or a HL-60 cell, or a modified K562 or HL-60 cell that expresses a ligand to the homing receptor, such as a cytokine or chemokine.

In some embodiments, the effector cell comprises a nucleic acid encoding a homing receptor operably linked to a promoter. In some embodiments, the effector cell comprises a nucleic acid encoding a CC chemokine receptor (CCR) or a CXC chemokine receptor (CXCR), such as CCR7 (SEQ ID NO: 13), CXCR2 (SEQ ID NO: 15), or the receptor for CXCL14 (SEQ ID NO: 9).

In some embodiments, the target cell comprises a nucleic acid encoding a ligand operably linked to a promoter. In some embodiments, the target cell comprises a nucleic acid encoding a chemokine operably linked to a promoter. In some embodiments, the target cell comprises a nucleic acid encoding the chemokine CCL19 (SEQ ID NO: 1), interleukin 8 (IL8 or CXCL8 (SEQ ID NO: 5)), C-X-C motif chemokine ligand 1 (CXCL1 (SEQ ID NO: 7)), or C-X-C Motif Chemokine Ligand 14 (CXCL14 (SEQ ID NO: 9)).

In another aspect, the modified effector cells express at least one cytokine. In some embodiments, the at least one cytokine is IL-2, IL-12, IL-15, IL-18, IL-21 or a variant thereof. In some embodiments, the at least one cytokine is IL-2, IL-15 or a combination thereof. In some embodiments, the IL-2 is expressed with a signal sequence that directs the IL-2 to the endoplasmic reticulum (referred to as "erIL-2" (SEQ ID NO: 25)). Directing the IL-2 to the endoplasmic reticulum permits expression of IL-2 at levels sufficient for autocrine activation and without releasing substantial amounts of IL-2 extracellularly. In some embodiments, the effector cells comprise a nucleic acid encoding a cytokine described herein. In some embodiments, the nucleic acid encodes a cytokine such as IL-2, IL-12, IL-15, IL-18, IL-21 or a variant thereof. In some embodiments, the nucleic acid encodes a cytokine such as erIL-2 (SEQ ID NO: 24) or erIL-15 (SEQ ID NO: 108).

In another aspect, the modified effector cells comprise a nucleic acid encoding an Fc receptor. In some embodiments, the Fc receptor is an Fc-gamma receptor (FCγR). In some embodiments, the Fc-gamma receptor is FCγRIII-A (also called CD16), which is a low affinity Fc receptor that binds to IgG antibodies and activates ADCC. In some embodiments, the CD16 receptor comprises a phenylalanine (F) to valine (V) substitution at amino acid position 158 (F158V) of the mature form of the polypeptide (corresponding to position 176 of the full length form of the polypeptide comprising the signal sequence). In one embodiment, the Fc receptor comprises the nucleic acid sequence of SEQ ID NO: 23 or the amino acid sequence of SEQ ID NO: 22.

In another aspect, the modified effector cells comprise a nucleic acid encoding an antigen binding protein ("ABP"). In some embodiments, the antigen binding protein specifically binds a tumor associated antigen. In some embodiments, the ABP comprises a fragment of an antibody, such as an scFv. In some embodiments, the antigen binding protein comprises or is part of a chimeric antigen receptor (CAR). In some embodiments, the nucleic acid encodes an ABP or CAR that specifically binds CD19 (SEQ ID NOS: 46, 47, and 63), CD20 (SEQ ID NO: 65), GD2 (SEQ ID NOs: 80 and 81), HER-2 (SEQ ID NO: 77), CD30 (SEQ ID NO: 75), EGFR (SEQ ID NO: 71), FAP (SEQ ID NOs: 95 and 96), CD33 (SEQ ID NO: 67), CD123 (SEQ ID NO: 86), PD-L1 (SEQ ID NO: 88), IGF1R (SEQ ID NO: 73), CSPG4 (SEQ ID NO: 69), or B7-H4 (SEQ ID NO: 90).

In another aspect, the modified effector cells express a cytokine or chemokine receptor, an ABP or CAR, an Fc receptor, and/or a cytokine. Thus, in some embodiments, the modified effector cells (e.g., NK-92 cells) express a chemokine receptor, a CAR, CD16, and erIL-2 (SEQ ID NO: 25). In some embodiments, the modified effector cells express CCR7 (SEQ ID NO: 14), a CAR that specifically binds CD19 (CD19-CAR (SEQ ID NOS: 46, 47, or 63), CD16 (SEQ ID NO: 22), and erIL-2 (SEQ ID NO: 25).

In some embodiments, the modified effector cells comprise one or more, or a plurality, of nucleic acid molecules encoding a cytokine or chemokine receptor, an ABP or CAR, an Fc receptor, and/or a cytokine. Thus, in some embodiments, the modified effector cells comprise nucleic acid molecules encoding a chemokine receptor, a CAR, CD16 (SEQ ID NO: 59), and erIL-2 (SEQ ID NO: 24). In some embodiments, the modified effector cells comprise nucleic acid molecules encoding CCR7 (SEQ ID NO: 13), a CAR that specifically binds CD19 (CD19-CAR (SEQ ID NO: 31 or 62)), CD16 (SEQ ID NOs: 23 or 59), and erIL-2 (SEQ ID NO: 24). In one embodiment, the nucleic acid molecule is RNA. In one embodiment, the nucleic acid molecule is DNA.

In some embodiments, the CAR comprises an intracellular signaling domain from the Fc epsilon receptor gamma (FcεRIγ (SEQ ID NO: 34)). In one embodiment, the CAR is transiently expressed by the effector cell. In one embodiment, the CAR is stably expressed by the effector cell.

In another aspect, an effector cell or cell line expressing a chimeric antigen receptor (CAR) on the surface of the effector cell is described, wherein said CAR comprises a cytoplasmic domain of FcεRIγ (SEQ ID NO: 34). In one embodiment, the cytoplasmic domain of FcεRIγ comprises an amino acid sequence having at least 95% sequence identity to SEQ ID NO: 34. In some embodiments, the cytoplasmic domain of FcεRIγ comprises or consists of the amino acid sequence of SEQ ID NO: 34.

In some embodiments, the cytoplasmic domain of FcεRIγ is encoded by a nucleic acid having at least 95% sequence identity to SEQ ID NO: 35.

In some embodiments, the CAR comprises a hinge region from CD8 (SEQ ID NO: 49). In some embodiments, the CAR comprises a transmembrane domain from CD28 (SEQ ID NO: 51).

In some embodiments, the effector cell or cell line is genetically modified with a nucleic acid construct that comprises SEQ ID NO: 35 (FcεRIγ), SEQ ID NO: 37 (CD8 hinge region), and/or SEQ ID NO: 51 (CD28 transmembrane domain). In some embodiments, the nucleic acid construct further comprises a promoter that promotes transcription of the nucleic acid sequences. In some embodiments, the promoter is an inducible promoter. In some embodiments, the nucleic acid construct is a multi-cistronic vector comprising one or more Internal Ribosome Entry Site (IRES (SEQ ID NO: 32)) to allow for initiation of translation from an internal region of an mRNA transcribed from the nucleic acid sequences. In some embodiments, the nucleic acid construct comprises a sequence that encodes a 2A peptide, such as a T2A (SEQ ID NO: 27), P2A (SEQ ID NO: 29), E2A (SEQ ID NO: 26), or F2A peptide, in order to produce equimolar levels of polypeptides encoded by the same mRNA. In some embodiments, the nucleic acid construct further comprises a nucleic acid sequence that encodes an antigen binding protein (ABP). In some embodiments, the ABP is an scFv or a codon optimized scFv. In some embodiments, the ABP specifically binds an antigen expressed by a tumor cell. In some embodiments, the ABP is part of a chimeric antigen receptor (CAR). In some embodiments, the construct comprises a nuclei acid that encodes a cytokine, such a IL-2. In one embodiment, the cytokine is targeted to the endoplasmic reticulum. In some embodiments, the construct comprises the vector shown in FIG. 5. In some embodiments, the NK-92 cell or cell line is genetically modified to express CD16 on the cell surface. In one embodiment, the NK-92 cell or cell line is genetically modified to express a high affinity CD16 (F158V) on the cell surface (SEQ ID NO: 23).

In one embodiment, the effector cell expresses an ABP or CAR that targets or specifically binds a tumor-associated antigen. In one embodiment, the tumor-associated antigen is selected from the group consisting of CD19, CD20, GD2, HER-2, CD30, EGFR, FAP, CD33, CD123, PD-L1, IGF1R, CSPG4, or B7-H4. In one embodiment, the tumor-associated antigen is CD19. In another embodiment, the tumor-associated antigen is CD33.

In one aspect, the present disclosure provides an effector cell line that is transformed by a nucleic acid encoding a chimeric antigen receptor (CAR) with a cytoplasmic domain of FcεRIγ (SEQ ID NO: 34), wherein the CAR is expressed on the surface of the NK-92 cell. In one embodiment, the nucleic acid is RNA. In one embodiment, the nucleic acid is DNA.

In some embodiments, the NK-92 cell is further modified to express at least one cytokine or variant thereof. In one embodiment, the at least one cytokine is transiently expressed by the NK-92 cell. In one embodiment, the at least one cytokine is stably expressed by the NK-92 cell. In some embodiments, the cytokine is IL-2, IL-15, or an IL-15 agonist, such as Altor-803.

In another aspect, the target cells comprise a nucleic acid encoding a chemokine that is expressed in lymph nodes. In some embodiments, the nucleic acid encoding the chemokine is expressed by an inducible promoter. In some embodiments, the target cells comprise a nucleic acid encoding the chemokine C-C motif ligand 21 (CCL21 (SEQ ID NO: 3)), a nucleic acid encoding the chemokine C-C motif ligand 19 (CCL19 (SEQ ID NO: 1)), or a combination thereof.

In some embodiments, the modified effector cells comprise an expression vector comprising one or more, or a plurality, of the nucleic acid molecules described herein. In some embodiments, the nucleic acid molecule is operably linked to a promoter that is capable of initiating transcription of the nucleic acid molecule. In some embodiments, each nucleic acid molecule of the plurality of nucleic acid molecules is operably linked to a separate, distinct and/or different promoter. In some embodiments, one or more of the nucleic acid molecules are operably linked to the same promoter. In one embodiment, the nucleic acid molecules encoding the cytokine or chemokine receptor, the CAR, the Fc receptor and the cytokine are operably linked to the same promoter or a single promoter. In some embodiments the promoter is an inducible promoter.

In some embodiments, the effector cells express the proteins encoded by the nucleic acid molecules described herein on the cell surface. For example, in some embodiments, the modified NK-92 cells express the cytokine/chemokine receptor, the ABP or CAR, and the Fc receptor (e.g., CD16 or high affinity CD16 (SEQ ID NO: 22)) on the cell surface.

Also provided are compositions and kits comprising the modified effector and target cells described herein. Also provided are methods of making the modified cells.

The details of one or more embodiments are set forth in the accompanying drawings and the description below. Other features, objects, and advantages will be apparent from the description and drawings, and from the claims.

DEFINITIONS

Figure 1:
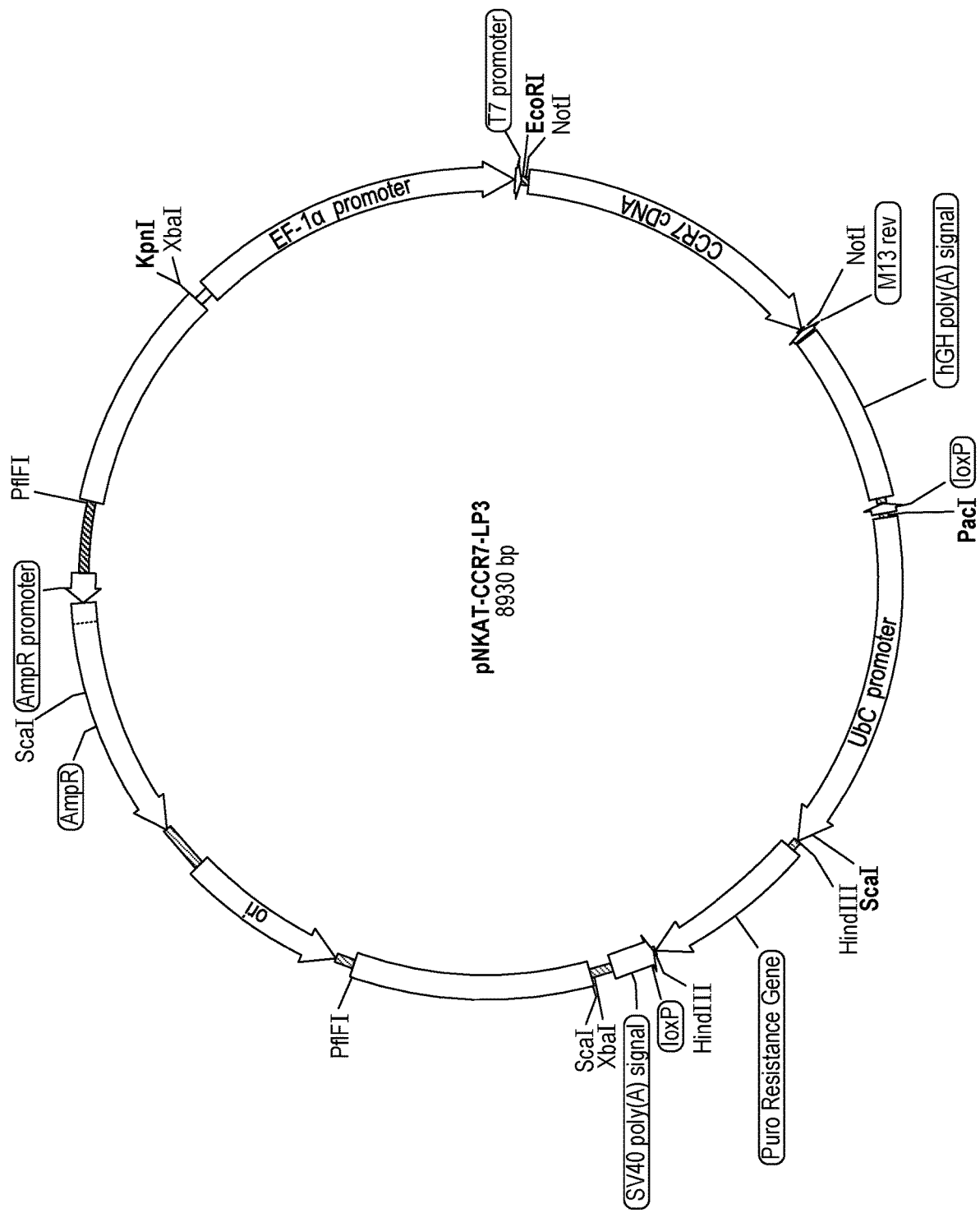
FIG. 1 is a schematic showing plasmid pNKAT-CCR7-LP3 containing the CCR7 receptor.

Unless defined otherwise, all technical and scientific terms used herein have the same meaning as commonly understood by one of ordinary skill in the art in the field of immunology and immunotherapy. All references to a sequence identifier are understood to refer to exemplary sequences, and are not intended to exclude other sequences associated with a gene or protein molecule disclosed herein.

In this specification and in the claims that follow, reference will be made to a number of terms that shall be defined to have the following meanings:

The terminology used herein is for the purpose of describing particular embodiments only and is not intended to be limiting of the invention. As used herein, the singular forms "a", "an" and "the" are intended to include the plural forms as well, unless the context clearly indicates otherwise.

All numerical designations, e.g., pH, temperature, time, concentration, amounts, and molecular weight, including ranges, include variations normally encountered by one of ordinary skill in the art. Therefore, numerical values can include variations of (+) or (−) increments of 0.1 or 1.0, where appropriate, depending on the relevant significant digit. It is to be understood, although not always explicitly stated, that all numerical designations may be preceded by the term "about." The term "about" as used herein may also mean that the value can vary by ±1%, 2%, 3%, 4%, 5%, 6%, 7%, 8%, 9%, or 10%.

It is also to be understood, although not always explicitly stated, that the reagents described herein are merely exemplary and that equivalents of such are known in the art.

"Optional" or "optionally" means that the subsequently described event or circumstance can or cannot occur, and that the description includes instances where the event or circumstance occurs and instances where it does not.

The term "comprising" is intended to mean that the compositions and methods include the recited elements, but not excluding others. "Consisting essentially of," when used to define compositions and methods, shall mean excluding other elements of any essential significance to the combination. For example, a composition consisting essentially of the elements as defined herein would not exclude other elements that do not materially affect the basic and novel characteristic(s) of the claimed invention. "Consisting of" shall mean excluding more than trace amount of other ingredients and substantial method steps recited. Embodiments defined by each of these transition terms are within the scope of this disclosure.

As used herein, "immunotherapy" refers to the use of NK-92 cells, modified or unmodified, naturally occurring or modified NK cell or T-cell, whether alone or in combination, and which are capable of inducing cytotoxicity when contacting a target cell.

As used herein, "natural killer (NK) cells" are cells of the immune system that kill target cells in the absence of a specific antigenic stimulus, and without restriction according to major histocompatibility complex (MHC) class. NK cells are characterized by the presence of CD56 and the absence of CD3 surface markers.

The term "endogenous NK cells" is used to refer to NK cells derived from a donor (or the patient), as distinguished from the NK-92 cell line. Endogenous NK cells are generally heterogeneous populations of cells within which NK cells have been enriched. Endogenous NK cells may be intended for autologous or allogeneic treatment of a patient.

The term "NK-92" refers to natural killer cells derived from the highly potent unique cell line described in Gong et al. (1994), rights to which are owned by NantK west (hereafter, "NK-92™ cells"). The immortal NK cell line was originally obtained from a patient having non-Hodgkin's lymphoma. Unless indicated otherwise, the term "NK-92™" is intended to refer to the original NK-92 cell lines as well as NK-92 cell lines that have been modified (e.g., by introduction of exogenous genes). NK-92™ cells and exemplary and non-limiting modifications thereof are described in U.S. Pat. Nos. 7,618,817; 8,034,332; 8,313,943; 9,181,322; 9,150,636; and published U.S. application Ser. No. 10/008,955, all of which are incorporated herein by reference in their entireties, and include wild type NK-92™, NK-92™_CD16, NK-92™-CD16-y, NK-92™-CD16-ζ NK-92™-CD16 (F176V), NK-92™MI, and NK-92™CI. NK-92 cells are known to persons of ordinary skill in the art, to whom such cells are readily available from NantKwest, Inc.

The term "aNK" refers to unmodified natural killer cells derived from the highly potent unique cell line described in Gong et al. (1994), rights to which are owned by NantKwest (hereafter, "aNK™ cells"). The term "haNK" refers to natural killer cells derived from the highly potent unique cell line described in Gong et al. (1994), rights to which are owned by NantK west, modified to express CD16 on the cell surface (hereafter, "CD16+NK-92™ cells" or "haNK® cells"). In some embodiments, the CD16+NK-92™ cells comprise a high affinity CD16 receptor on the cell surface. The term "taNK" refers to natural killer cells derived from the highly potent unique cell line described in Gong et al. (1994), rights to which are owned by NantKwest, modified to express a chimeric antigen receptor (hereafter, "CAR-modified NK-92™ cells" or "taNK® cells"). The term "t-haNK" refers to natural killer cells derived from the highly potent unique cell line described in Gong et al. (1994), rights to which are owned by NantkWest, modified to express CD 16 on the cell surface and to express a chimeric antigen receptor (hereafter, "CAR-modified CD16+NK-92™ cells" or "t-haNK™ cells"). In some embodiments, the t-haNK™ cells express a high affinity CD16 receptor on the cell surface.

The term "homing receptor" refers to a receptor that is involved in migration of a cell, such as an immune system cell or NK-92 cell, toward a specific target, such as tumor target tissue. The term is used interchangeably with "migratory receptor."

The term "chemokine targeted t-haNK" refers to a t-haNK™ cell that is modified to express a chemokine receptor on the cell surface.

The term "Mi-aNK" refers to an aNK cell line transfected with a nucleic acid construct encoding a migratory receptor operably linked to a promoter. The term "Mi-T-haNK" refers to an aNK cell line transfected with a nucleic acid construct that encodes a migratory receptor, CD16, ER-IL2 and a CAR, each operably linked to the same or different promoters.

As used herein, the terms "cytotoxic" and "cytolytic," when used to describe the activity of effector cells such as NK-92 cells, are intended to be synonymous. In general, cytotoxic activity relates to killing of target cells by any of a variety of biological, biochemical, or biophysical mechanisms. Cytolysis refers more specifically to activity in which the effector lyses the plasma membrane of the target cell, thereby destroying its physical integrity. This results in the killing of the target cell. Without wishing to be bound by theory, it is believed that the cytotoxic effect of NK-92 cells is due to cytolysis.

The term "kill" with respect to a cell/cell population is directed to include any type of manipulation that will lead to the death of that cell/cell population.

The term "extracellular matrix analog" refers to a biocompatible material or hydrogel comprising one or more components of naturally occurring extracellular matrix (ECM). In some embodiments, the ECM analog is Corning® Matrigel® Matrix, which comprises solubilized basement membrane extracted from the Engelbreth-Holm-Swarm (EHS) mouse sarcoma, and includes ECM proteins such as laminin (a major component), collagen IV, heparin sulfate proteoglycans, entactin/nidogen, and a number of growth factors.

The term "Fc receptor" refers to a protein found on the surface of certain cells (e.g., natural killer cells) that contribute to the protective functions of the immune cells by binding to part of an antibody known as the Fc region. Binding of the Fc region of an antibody to the Fc receptor (FcR) of a cell stimulates phagocytic or cytotoxic activity of a cell via antibody-mediated phagocytosis or antibody-dependent cell-mediated cytotoxicity (ADCC). FcRs are classified based on the type of antibody they recognize. For example, Fc-gamma receptors (FCγR) bind to the IgG class of antibodies. FCγRIII-A (also called CD16) is a low affinity Fc receptor that binds to IgG antibodies and activates ADCC. FCγRIII-A are typically found on NK cells. NK-92 cells do not express FCγRIII-A. Fc-epsilon receptors (FcεR) bind to the Fc region of IgE antibodies.

The term "chimeric antigen receptor" (CAR), as used herein, refers to an extracellular antigen-binding domain that is fused to an intracellular signaling domain. CARS can be expressed in T cells or NK cells to increase cytotoxicity. In general, the extracellular antigen-binding domain is a scFv that is specific for an antigen found on a cell of interest. A CAR-expressing NK-92 cell is targeted to cells expressing certain antigens on the cell surface, based on the specificity of the scFv domain. The scFv domain can be engineered to recognize any antigen, including tumor-specific antigens. For example, CD19CAR recognizes CD19, a cell surface marker expressed by some cancers.

The term "tumor-specific antigen" as used herein refers to antigens that are present on a cancer or neoplastic cell but not detectable on a normal cell derived from the same tissue or lineage as the cancer cell. Tumor-specific antigens, as used herein, also refers to tumor-associated antigens, that is, antigens that are expressed at a higher level on a cancer cell as compared to a normal cell derived from the same tissue or lineage as the cancer cell.

The terms "polynucleotide", "nucleic acid" and "oligonucleotide" are used interchangeably and refer to a polymeric form of nucleotides of any length, either deoxyribonucleotides or ribonucleotides or analogs thereof. Polynucleotides can have any three-dimensional structure and may perform any function, known or unknown. The following are non-limiting examples of polynucleotides: a gene or gene fragment (for example, a probe, primer, EST or SAGE tag), exons, introns, messenger RNA (mRNA), transfer RNA, ribosomal RNA, ribozymes, cDNA, recombinant polynucleotides, branched polynucleotides, plasmids, vectors, isolated DNA of any sequence, isolated RNA of any sequence, nucleic acid probes and primers. A polynucleotide can comprise modified nucleotides, such as methylated nucleotides and nucleotide analogs. If present, modifications to the nucleotide structure can be imparted before or after assembly of the polynucleotide. The sequence of nucleotides can be interrupted by non-nucleotide components. A polynucleotide can be further modified after polymerization, such as by conjugation with a labeling component. The term also refers to both double- and single-stranded molecules. Unless otherwise specified or required, any embodiment of this invention that is a polynucleotide encompasses both the double-stranded form and each of two complementary single-stranded forms known or predicted to make up the double-stranded form.

A polynucleotide is composed of a specific sequence of four nucleotide bases: adenine (A); cytosine (C); guanine (G); thymine (T); and uracil (U) for thymine when the polynucleotide is RNA. Thus, the term "polynucleotide sequence" is the alphabetical representation of a polynucleotide molecule.

"Homology" or "identity" or "similarity" refers to sequence similarity between two peptides or between two nucleic acid molecules. Sequence similarity can be determined by comparing a position in each sequence which may be aligned for purposes of comparison. When a position in the compared sequence is occupied by the same base or amino acid, then the molecules are homologous at that position. The percent of sequence similarity between sequences is a function of the number of matching or homologous positions shared by the sequences over a given comparison window. A sequence can be at least 60%, 70%, 80%, 85%, 90%, 91%, 92%, 93%, 94%, 95%, 96%, 97%, 98% or 99% identical to a sequence described herein.

The terms identical or percent identity, in the context of two or more nucleic acids or polypeptide sequences, refer to two or more sequences or subsequences that are the same or have a specified percentage of amino acid residues or nucleotides that are the same (i.e., at least about 60%, 65%, 70%, 75%, 80%, 85%, 90%, 91%, 92%, 93%, 94%, 95%, 96%, 97%, 98%, 99%, or higher identity over a specified region, when compared and aligned for maximum correspondence over a comparison window or designated region) as measured using a BLAST or BLAST 2.0 sequence comparison algorithms with default parameters described below, or by manual alignment and visual inspection (see, e.g., NCBI web site or the like). Such sequences are then said to be substantially identical. This definition also refers to, or may be applied to, the compliment of a test sequence. The definition also includes sequences that have deletions and/or additions, as well as those that have substitutions. As described below, the preferred algorithms can account for gaps and the like. In some embodiments, identity exists over a region that is at least about 25 amino acids or nucleotides in length, or over a region that is 50-100 amino acids or nucleotides in length.

For sequence comparison, typically one sequence acts as a reference sequence, to which test sequences are compared. When using a sequence comparison algorithm, test and reference sequences are entered into a computer; subsequence coordinates are designated, if necessary; and sequence algorithm program parameters are designated. Preferably, default program parameters can be used, or alternative parameters can be designated. The sequence comparison algorithm then calculates the percent sequence identities for the test sequences relative to the reference sequence, based on the program parameters.

A comparison window, as used herein, includes reference to a segment of any one of the number of contiguous positions selected from the group consisting of from 20 to 600, usually about 50 to about 200, more usually about 100 to about 150, in which a sequence may be compared to a reference sequence of the same number of contiguous positions after the two sequences are optimally aligned. Methods of alignment of sequences for comparison are well-known in the art. Optimal alignment of sequences for comparison can be conducted, e.g., by the local homology algorithm of Smith & Waterman, Adv. Appl. Math. 2:482 (1981); by the homology alignment algorithm of Needleman & Wunsch, J. Mol. Biol. 48:443 (1970); by the search for similarity method of Pearson & Lipman, Proc. Nat'l. Acad. Sci. USA 85:2444 (1988); by computerized implementations of these algorithms (GAP, BESTFIT, FASTA, and TFASTA in the Wisconsin Genetics Software Package, Genetics Computer Group, 575 Science Dr., Madison, WI); or by manual alignment and visual inspection (see, e.g., Current Protocols in Molecular Biology (Ausubel et al., eds. 1995 supplement)).

A preferred example of an algorithm that is suitable for determining percent sequence identity and sequence similarity are the BLAST and BLAST 2.0 algorithms, which are described in Altschul et al., Nuc. Acids Res. 25:3389-3402 (1977), and Altschul et al., J. Mol. Biol. 215:403-410 (1990), respectively. BLAST and BLAST 2.0 are used, with the parameters described herein, to determine percent sequence identity for nucleic acids or proteins. Software for performing BLAST analyses is publicly available through the National Center for Biotechnology Information, as known in the art. This algorithm involves first identifying high scoring sequence pairs (HSPs) by identifying short words of a selected length (W) in the query sequence, which either match or satisfy some positive-valued threshold score T when aligned with a word of the same length in a database sequence. Tis referred to as the neighborhood word score threshold (Altschul et al., supra). These initial neighborhood word hits act as seeds for initiating searches to find longer HSPs containing them. The word hits are extended in both directions along each sequence for as far as the cumulative alignment score can be increased. Cumulative scores are calculated for nucleotide sequences using the parameters M (reward score for a pair of matching residues; always >0) and N (penalty score for mismatching residues; always <0). For amino acid sequences, a scoring matrix is used to calculate the cumulative score. Extension of the word hits in each direction are halted when: the cumulative alignment score falls off by the quantity X from its maximum achieved value; the cumulative score goes to zero or below, due to the accumulation of one or more negative-scoring residue alignments; or the end of either sequence is reached. The BLAST algorithm parameters W, T, and X determine the sensitivity and speed of the alignment. The Expectation value (E) represents the number of different alignments with scores equivalent to or better than what is expected to occur in a database search by chance. The BLASTN program (for nucleotide sequences) uses as defaults a wordlength (W) of 11, an expectation (E) of 10, M=5, N=−4 and a comparison of both strands. For amino acid sequences, the BLASTP program uses as defaults a wordlength of 3, expectation (E) of 10, and the BLOSUM62 scoring matrix (see Henikoff & Henikoff, Proc. Natl. Acad. Sci. USA 89:10915 (1989)), alignments (B) of 50, expectation (E) of 10, M=5, N=−4.

The term transformation as used herein refers to a process by which an exogenous or heterologous nucleic acid molecule (e.g., a vector or recombinant nucleic acid molecule) is introduced into a recipient cell. The exogenous or heterologous nucleic acid molecule may or may not be integrated into (i.e., covalently linked to) chromosomal DNA making up the genome of the host cell. For example, the exogenous or heterologous polynucleotide may be maintained on an episomal element, such as a plasmid. Alternatively or additionally, the exogenous or heterologous polynucleotide may become integrated into a chromosome so that it is inherited by daughter cells through chromosomal replication. Methods for transformation include, but are not limited to, calcium phosphate precipitation; fusion of recipient cells with bacterial protoplasts containing the recombinant nucleic acid; treatment of the recipient cells with liposomes containing the recombinant nucleic acid; DEAE dextran; fusion using polyethylene glycol (PEG); electroporation; magnetoporation; biolistic delivery; retroviral infection; lipofection; and micro-injection of DNA directly into cells.

The term transformed, as used in reference to cells, refers to cells that have undergone transformation as described herein such that the cells carry exogenous or heterologous genetic material (e.g., a recombinant nucleic acid). The term transformed can also or alternatively be used to refer to cells, types of cells, tissues, organisms, etc. that contain exogenous or heterologous genetic material.

The term introduce, as used herein with reference to introduction of a nucleic acid into a cell or organism, is intended to have its broadest meaning and to encompass introduction, for example by transformation methods (e.g., calcium-chloride-mediated transformation, electroporation, particle bombardment), and also introduction by other methods including transduction, conjugation, and mating. Optionally, a construct is utilized to introduce a nucleic acid into a cell or organism.

The terms modified and recombinant when used with reference to a cell, nucleic acid, polypeptide, vector, or the like indicates that the cell, nucleic acid, polypeptide, vector or the like has been modified by or is the result of laboratory methods and is non-naturally occurring. Thus, for example, modified cells include cells produced by or modified by laboratory methods, e.g., transformation methods for introducing nucleic acids into the cell. Modified cells can include nucleic acid sequences not found within the native (non-recombinant) form of the cells or can include nucleic acid sequences that have been altered, e.g., linked to a non-native promoter.

As used herein, the term exogenous refers to a substance, such as a nucleic acid (e.g., nucleic acids including regulatory sequences and/or genes) or polypeptide, that is artificially introduced into a cell or organism and/or does not naturally occur in the cell in which it is present. In other words, the substance, such as nucleic acid or polypeptide, originates from outside a cell or organism into which it is introduced. An exogenous nucleic acid can have a nucleotide sequence that is identical to that of a nucleic acid naturally present in the cell. For example, an NK-92 cell can be engineered to include a nucleic acid having a NK-92 sequence, e.g., heparanase. Optionally, an endogenous NK-92 heparanase sequence is operably linked to a gene with which the regulatory sequence is not involved under natural conditions. Although the NK-92 heparanase sequence may naturally occur in the host cell, the introduced nucleic acid is exogenous according to the present disclosure. An exogenous nucleic acid can have a nucleotide sequence that is different from that of any nucleic acid that is naturally present in the cell. For example, the exogenous nucleic acid can be a heterologous nucleic acid, i.e., a nucleic acid from a different species or organism. Thus, an exogenous nucleic acid can have a nucleic acid sequence that is identical to that of a nucleic acid that is naturally found in a source organism but that is different from the cell into which the exogenous nucleic acid is introduced. As used herein, the term endogenous, refers to a nucleic acid sequence that is native to a cell. As used herein, the term heterologous refers to a nucleic acid sequence that is not native to a cell, i.e., is from a different organism than the cell. The terms exogenous and endogenous or heterologous are not mutually exclusive. Thus, a nucleic acid sequence can be exogenous and endogenous, meaning the nucleic acid sequence can be introduced into a cell but have a sequence that is the same as or similar to the sequence of a nucleic acid naturally present in the cell. Similarly, a nucleic acid sequence can be exogenous and heterologous meaning the nucleic acid sequence can be introduced into a cell but have a sequence that is not native to the cell, e.g., a sequence from a different organism.

As described herein, a control or standard control refers to a sample, measurement, or value that serves as a reference, usually a known reference, for comparison to a test sample, measurement, or value. For example, a test cell, e.g., a cell transformed with nucleic acid sequences encoding genes for an Fc Receptor can be compared to a known normal (wild-type) cell (e.g., a standard control cell). A standard control can also represent an average measurement or value gathered from a population of cells (e.g., standard control cells) that do not express the Fc Receptor or that do not have or have minimal levels of Fc Receptor activity. One of skill will recognize that standard controls can be designed for assessment of any number of parameters (e.g., RNA levels, polypeptide levels, specific cell types, and the like).

The term "express" refers to the production of a gene product (e.g., a protein). The term "transient" when referring to expression means a polynucleotide is not incorporated into the genome of the cell. The term "stable" when referring to expression means a polynucleotide is incorporated into the genome of the cell, or a positive selection marker (i.e., an exogenous gene expressed by the cell that confers a benefit under certain growth conditions) is utilized to maintain expression of the transgene.

The term "cytokine" or "cytokines" refers to the general class of biological molecules which affect cells of the immune system. Exemplary cytokines include but are not limited to interferons and interleukins (IL)-in particular IL-2, IL-12, IL-15, IL-18 and IL-21. In preferred embodiments, the cytokine is IL-2.

As used herein, the term "vector" refers to a non-chromosomal nucleic acid comprising an intact replicon such that the vector may be replicated when placed within a permissive cell, for example by a process of transformation. A vector may replicate in one cell type, such as bacteria, but have limited or no ability to replicate in another cell, such as mammalian cells. Vectors may be viral or non-viral. Exemplary non-viral vectors for delivering nucleic acid include naked DNA; DNA complexed with cationic lipids, alone or in combination with cationic polymers; anionic and cationic liposomes; DNA-protein complexes and particles comprising DNA condensed with cationic polymers such as heterogeneous polylysine, defined-length oligopeptides, and polyethylene imine, in some cases contained in liposomes; and the use of ternary complexes comprising a virus and polylysine-DNA. In one embodiment, the vector is a viral vector, e.g. adenovirus. Viral vectors are well known in the art.

As used herein, the term "targeted," when referring to protein expression, is intended to include, but is not limited to, directing proteins or polypeptides to appropriate destinations in the cell or outside of it. The targeting is typically achieved through signal peptides or targeting peptides, which are a stretch of amino acid residues in a polypeptide chain. These signal peptides can be located anywhere within a polypeptide sequence, but are often located on the N-terminus. Polypeptides can also be engineered to have a signal peptide on the C-terminus. Signal peptides can direct a polypeptide for extracellular section, location to plasma membrane, golgi, endosomes, endoplasmic reticulum, and other cellular compartments. For example, polypeptides with a particular amino acid sequence on their C-terminus (e.g., KDEL (SEQ ID NO: 115)) are retained in the ER lumen or transported back the ER lumen.

As used herein, the term "target," when referring to targeting of a tumor, refers to the ability of NK-92 cells to recognize and kill a tumor cell (i.e., target cell). The term "targeted" in this context refers, for example, to the ability of a CAR expressed by the NK-92 cell to recognize and bind to a cell surface antigen expressed by the tumor.

As used herein, the term "transfect" refers to the insertion of nucleic acid into a cell. Transfection may be performed using any means that allows the nucleic acid to enter the cell. DNA and/or mRNA may be transfected into a cell. Preferably, a transfected cell expresses the gene product (i.e., protein) encoded by the nucleic acid.

Titles or subtitles may be used in the specification for the convenience of a reader, which are not intended to influence the scope of the present invention. Additionally, some terms used in this specification are more specifically defined below.

DETAILED DESCRIPTION

Provided herein are compositions and methods for measuring the migratory or invasive potential of effector cells in the same assay as such cells are measured for cytotoxic capabilities following migration/invasion. In some embodiments, a modified target cell line (such as cancer cell line) is engineered to express a chemokine which it does not normally express, in order to establish a chemokine gradient in the assay which an effector cell with an appropriate receptor may recognize and use to migrate towards these target cells. Upon encountering the target cell, such a cell may be killed by the effector cell, and the number of such target cells which have been killed, or the difference in expected number of target cells by the end of the test, can be measured to provide a useful output in the form of a number expressing the relative number of targets killed in comparison to an appropriate control.

With the increasing attention being given to the possibilities of cellular immunotherapy, a robust assay for determining the capability of such therapeutic effector cells to both reach and then kill their targets (usually cancer cells in the patient) is of clear utility in improving the efficiency and ultimate success of such therapies. While hematological malignancies have demonstrated the high potential value of cellular immunotherapies, cellular immunotherapy has shown far less effectiveness in treating solid tumors. One theory for the decreased effectiveness in treating solid tumors is that the thick layer of extra-cellular matrix (ECM) provides a barrier to entry for effector cells to reach their targets. One way to measure the invasive potential of cells, and thus their ability to penetrate the ECM to reach their targets, is a Boyden Chamber Assay. In brief, this consists of two chambers separated by a membrane with pores having a diameter sufficient to allow effector cells to migrate between the two chambers. In some embodiments, the membrane comprises a layer of ECM components or an ECM analog (such as Matrigel) acting as an additional barrier to movement of effector cells. The effector cells are typically placed in the upper chamber, above the membrane and ECM analog, and the bottom well is filled with media containing a chemokine of interest, which acts as a chemoacttractant for effector cells that express the cognate chemokine receptor. The chambers are then left in a tissue culture incubator for some amount of time (for example 1 to 24 hours), and the upper chambers are then removed and the effector cells which have actively migrated through the ECM and the pores of the membrane now in the bottom well are counted. One of the disadvantages in the conventional approach is that only a single dose of chemokine is added to the bottom well at the beginning of the test, resulting in only a transient gradient in the Boyden Chamber.

Another common assay in the characterization of cellular immunotherapeutic agents is the cytotoxicity assay. While there are several variants of this assay, all involve co-incubating effector cells directly with target cells, waiting some amount of time, and then counting the number of target cells which have been killed. Usually, the effector to target ratio is varied to generate a range of values for the killing of the cells. If both migration/invasive capability and cytotoxic capability are being measured for the same effector cell line, this is usually done by means of two separate assays in isolation, and neither effect is dependent on the other, unlike in actual clinical applications.

Described herein is a method for combining these two assays, with an improvement in the behavior of the invasion assay due to maintenance of a constantly restored gradient, and a meaningful output summarizing the capability of an effector cell line to both invade through ECM based upon a chemokine gradient and then kill its target.

First, a target cell line which is susceptible to killing by the effector cell is selected, either due to natural recognition of target antigens or though CAR mediated or ADCC mediated killing of the target cells. This target cell is then engineered to constitutively express a chemokine of interest. For example, in the proof of concept embodiment described below, the target cell line is K562 (naturally susceptible to NK-mediated killing) and the chemokine of interest is CCL19 (the ligand for the CCR7 receptor). In order to produce a K562 cell line that expresses CCL19 constitutively, K562 cells are electroporated with a linearized plasmid (pNKAT-CONST-CCL19-LB) containing CCL19 cDNA driven by the EF1a promoter and a blasticidin selection cassette. The cells are then selected by exposure to Blasticidin, and the resulting polyclonal population is then subcloned by limited dilution cloning to get single-cell clonal populations of CCL 19 secreting K562 cells (here referred to as K-19 cells). Secretion of CCL19 was confirmed by ELISA.

Once an appropriate chemokine secreting cell line has been made, these target cells are added to the lower chamber of a Boyden Chamber assay to induce invasion, alongside appropriate controls (unmodified cells, no cells). A positive control may also consist of effector cells added directly into the lower chamber with the target cells to measure maximal killing with no required invasion. In some embodiments, the effector cells are stained with a vital dye, such as carboxyfluorescein succinimidyl ester (CFSE) or other long-term stain to differentiate them from target cells, and then placed in the upper chamber of the Boyden Chamber assay above the membrane and ECM analog. The combined assay components are then placed in a tissue culture incubator for an appropriate amount of time (overnight is typical, though with appropriate considerations longer assays of two or three days can also work).

After the incubation period, the chambers are removed from the incubator and the upper wells removed. Effector cells which have been drawn to the gradient will have migrated into the lower well, and target cells which are susceptible to killing by the effectors will show some level of induced lysis. In some embodiments, the number of dead cells can be measured on a flow cytometer by staining the cells with Propidium iodide (PI) or another live/dead cell staining dye to evaluate cell viability. The number of effector cells which have invaded the lower chamber can be counted by gating on the effector stain (for example, CFSE), and the degree of target elimination measured by comparing the number of target cells (non CFSE stained, in this example) which are positive for PI to the number which maintain membrane integrity to exclude PI. Note that in longer assays not all dead cells will be detectable by flow cytometry, as those killed early in the assay may no longer maintain the integrity to be identified as cells. The measure of effectiveness will relate to the difference in total target cell number compared to a control consisting of target cells by themselves and allowed to multiply without effector mediated killing.

The assay described herein provide a methodology for robustly examining the ability of prospective cellular immunotherapeutic agents to both reach their targets and eliminate them—an important diagnostic in measuring the clinical effectiveness of these therapeutic agents.

Also described herein are engineered cells using the cytotoxic activated Natural Killer cell line (NK-92 or aNK) as the basis to improve homing (migration) towards a target of interest. In some embodiments, the NK-92 cells are engineered to express a chemokine receptor (e.g., CCR7) known to direct lymphocytes to lymph nodes when expressed.

As described herein, modified effector cells have been generated with stable long-term expression of the CCR7 lymph node homing receptor driven by the Elongation Factor 1a (EF1a) promoter after electroporation with a linearized gene construct containing a CCR7 expression cassette along with a removable selection cassette comprising a selectable marker. After one week of Puromycin selection, followed by serial dilution cloning, monoclonal cell lines were established retaining a high level of CCR7 expression. These CCR7 overexpressing NK cells have functional responses to lymph node associated chemokines CCL21 and CCL19 in migration/invasion assays.

The NK-92 cell line is a human, IL-2-dependent NK cell line that was established from the peripheral blood mononuclear cells (PBMCs) of a 50-year-old male diagnosed with non-Hodgkin lymphoma (Gong, et al., Leukemia. 8:652-8 (1994)). NK-92 cells are characterized by the expression of $CD56^{bright}$ and CD2, in the absence of CD3, CD8, and CD16. A $CD56^{bright}/CD16^{neg/low}$ phenotype is typical for a minor subset of NK cells in peripheral blood, which have immunomodulatory functions as cytokine producers. Unlike normal NK cells, NK-92 lacks expression of most killer cell inhibitor receptors (KIRs) (Maki, et al., J Hematother Stem Cell Res. 10:369-83 (2001)). Only KIR2DL4, a KIR receptor with activating function and inhibitory potential that is expressed by all NK cells, was detected on the surface of NK-92. KIR2DL4 is considered to mediate inhibitory effects through binding to the HLA allele G (Suck, Cancer Immunol. Immunother. 65 (4): 485-92 (2015)). The predominant pathway of cytotoxic killing of NK-92 cells is through the perforin/esterase pathway; NK-92 expresses high levels of perforin and granzyme B (Maki, et al., J Hematother Stem Cell Res. 10:369-83 (2001)).

NK-92 cells have a very broad cytotoxic range and are active against cell lines derived from hematologic malignancies and solid tumors (Klingemann, Blood, 87 (11):

4913-4 (1996); Swift, Haematologica. 97 (7): 1020-8 (2012); Yan, et al., Clin Cancer Res. 4:2859-68 (1998)). Safety assessments in severe combined immunodeficiency (SCID) mice showed no NK-92 treatment-related effects, such as acute toxicity or long-term carcinogenicity (Tam, et al., J Hematother. 8:281-90 (1999), Yan, et al., Clin Cancer Res. 4:2859-68 (1998)). Administration of NK-92 cells to mice challenged with human leukemia cells or mouse models of human melanoma resulted in improved survival and suppression of tumor growth, including complete remissions in some mouse tumors (Tam, et al., J Hematother. 8:281-90 (1999), Yan, et al., Clin Cancer Res. 4:2859-68 (1998)). Phase I clinical trials have confirmed its safety profile. Characterization of the NK-92 cell line is disclosed in WO 1998/49268 and U.S. Patent Application Publication No. 2002-0068044, which are incorporated by reference herein in their entireties.

Optionally, the modified effector cells may also express the Fc receptor CD16. As used herein, the term "Fc receptor" refers to a protein found on the surface of certain cells (e.g., natural killer cells) that contribute to the protective functions of the immune cells by binding to part of an antibody known as the Fc region. Binding of the Fc region of an antibody to the Fc receptor (FcR) of a cell stimulates phagocytic or cytotoxic activity of a cell via antibody-mediated phagocytosis or antibody-dependent cell-mediated cytotoxicity (ADCC). FcRs are classified by the type of antibody they recognize. For example, Fc-gamma receptors (FCγR) bind to the IgG class of antibodies. FCγRIII-A (also called CD16) is a low affinity Fc receptor that binds to IgG antibodies and activates ADCC. FCγRIII-A are typically found on NK cells. A representative amino acid sequence encoding CD16 is shown in SEQ ID NO: 22. A representative polynucleotide sequence encoding CD16 is shown in SEQ ID NO: 23. The complete sequences of CD 16 can be found in the SwissProt database as entry P08637.

In some embodiments, the CD16 receptor comprises a phenylalanine (F) to valine (V) substitution at amino acid position 158 (F158V) in the IgG binding domain of the mature CD16 receptor (corresponding to Val at position 176 of the full length protein), which effects the antibody-dependent cell cytotoxic (ADCC) function of NK cells. The CD16 158V variant binds with higher affinity to human IgG1 and IgG3 than the 158F variant.

Optionally, the modified effector cells comprise a nucleic acid sequence with 70%, 80%, 90%, or 95% identity to SEQ ID NO: 23. Optionally, the modified effector cells comprise a nucleic acid sequence with 90%, 91%, 92%, 93%, 94%, 95%, 96%, 97%, 98% or 99% identity to SEQ ID NO: 23. Optionally, the modified effector cells comprise a polypeptide with 70%, 80%, 90%, or 95% identity to SEQ ID NO: 22 (having valine at position 176 of the full length polypeptide). Optionally, the modified effector cells comprise a polypeptide with 90%, 91%, 92%, 93%, 94%, 95%, 96%, 97%, 98% or 99% identity to SEQ ID NO: 22.

The cytotoxicity of NK-92 cells is dependent on the presence of cytokines (e.g., interleukin-2 (IL-2)). Thus, optionally, modified NK-92 cells are further modified to express at least one cytokine. Optionally, the at least one cytokine is IL-2, IL-12, IL-15, IL-18, IL-21 or a variant thereof. Optionally, the at least one cytokine is IL-2, IL-15 or a combination thereof. Optionally, the IL-2 or IL-15 are expressed with a signal sequence that directs the IL-2 or IL-15 to the endoplasmic reticulum (erIL-2 or erIL-15). Directing the IL-2 to the endoplasmic reticulum permits expression of IL-2 at levels sufficient for autocrine activation and without releasing substantial amounts of IL-2 extracellularly. See Konstantinidis et al "Targeting IL-2 to the endoplasmic reticulum confines autocrine growth stimulation to NK-92 cells" Exp Hematol. 2005 February; 33 (2): 159-64. A representative nucleic acid encoding IL-2 is shown in SEQ ID NO: 24 and a representative polypeptide of IL-2 is shown in SEQ ID NO: 25.

Optionally, the modified effector cells comprise a nucleic acid sequence with 70%, 80%, 90%, or 95% identity to SEQ ID NO: 24. Optionally, the modified NK-92 cells comprise a nucleic acid sequence with 90%, 91%, 92%, 93%, 94%, 95%, 96%, 97%, 98% or 99% identity to SEQ ID NO: 24. Optionally, the modified NK-92 cells comprise a polypeptide with 70%, 80%, 90%, or 95% identity to SEQ ID NO: 25. Optionally, the modified NK-92 cells comprise a polypeptide with 90%, 91%, 92%, 93%, 94%, 95%, 96%, 97%, 98% or 99% identity to SEQ ID NO: 25. The provided modified NK-92 cells advantageously are capable of being maintained in the absence of IL-2 without secreting IL-2 in an amount to cause a clinical adverse effect.

Chimeric Antigen Receptors

In some embodiments, the modified effector cells are further engineered to express a chimeric antigen receptor (CAR) on the cell surface. Optionally, the CAR is specific for a tumor-specific antigen. Tumor-specific antigens are described, by way of non-limiting example, in US 2013/0189268; WO 1999024566 A1; U.S. Pat. No. 7,098,008; and WO 2000020460 A1, each of which is incorporated herein by reference in its entirety. Tumor-specific antigens include, without limitation, CD19, CD20, GD2, HER-2, CD30, EGFR, FAP, CD33, CD123, PD-L1, IGF1R, CSPG4, or B7-H4. CARs can be engineered as described, for example, in Patent Publication Nos. WO 2014039523; US20140242701; US20140274909; US 20130280285; and WO 2014099671, each of which is incorporated herein by reference in its entirety. Optionally, the CAR is a CD19 CAR, a CD33 CAR or CSPG-4 CAR.

Homing Receptors

Provided herein are modified effector cells expressing a homing receptor (also referred to as a migratory receptor). In some embodiments, the homing receptor is a cytokine receptor or chemokine receptor. In some embodiments, the chemokine receptor is C-C chemokine receptor type 7 (CCR7), CXCR2, or a receptor for CXCL14. In some embodiments, the modified effector cells comprise a nucleic acid encoding a homing, cytokine or chemokine receptor. In some embodiments, the nucleic acid encoding the homing, cytokine or chemokine receptor is operably linked to a promoter. In some embodiments, the nucleic acid encodes C-C chemokine receptor type 7 (CCR7), CXCR2, or a receptor for CXCL14, and is operably linked to a promoter. In some embodiments, the nucleic acid encoding CCR7 has at least 90%, 91%, 92%, 93%, 94%, 95%, 96%, 97%, 98% or 99% identity to SEQ ID NO: 13. In some embodiments, the nucleic acid encoding CXCR2 has at least 90%, 91%, 92%, 93%, 94%, 95%, 96%, 97%, 98% or 99% identity to SEQ ID NO: 15. In some embodiments, the nucleic acid encoding the receptor for CXCL14 has at least 90%, 91%, 92%, 93%, 94%, 95%, 96%, 97%, 98% or 99% identity to SEQ ID NO: 9. Optionally, the homing, cytokine or chemokine receptor is expressed on the cell surface of the modified NK-92 cells.

In some embodiments, the modified target cell expresses a ligand that binds to its cognate receptor expressed by the effector cell. In some embodiments, the ligand is a cytokine or chemokine that binds to a receptor expressed by the effector cell. In some embodiments, the ligand is expressed in the tumor microenvironment, or is expressed by cells that direct homing to lymph nodes. In some embodiments, the target cell comprises a nucleic acid encoding C-C motif ligand 21 (CCL21) operably linked to a promoter. Optionally, the nucleic acid encoding CCL21 has at least 90%, 91%, 92%, 93%, 94%, 95%, 96%, 97%, 98% or 99% identity to SEQ ID NO: 3. Optionally, the modified target cell comprises a nucleic acid encoding C-C motif ligand 19 (CCL19) operably linked to a promoter. Optionally, the nucleic acid encoding CCL 19 has at least 90%, 91%, 92%, 93%, 94%, 95%, 96%, 97%, 98% or 99% identity to SEQ ID NO: 1. Optionally, the modified target cells comprise a nucleic acid encoding CCL19 and CCL21. Optionally, the nucleic acid encoding CCL21 is linked to the nucleic acid encoding CCL19 by a 2A peptide linker. Optionally, the 2A peptide linker comprises SEQ ID NO: 26 or 27.

Expression Vectors

Provided herein are expression vectors comprising one or more nucleic acid sequences operably linked to a promoter. The nucleic acid sequences encoding the different elements of the vector can each be operably linked to the same or different promoters. In some embodiments, the expression vector comprises a nucleic acid encoding a homing receptor, a cytokine receptor or chemokine receptor. In one embodiment, the nucleic acid encodes the chemokine receptor CCR7, CXCR2 or the receptor for CXCL14. In some embodiments, the expression vector comprises a nucleic acid encoding a cytokine or chemokine. In one embodiment, the nucleic acid encodes the chemokine CCL19, CCL21, IL-8, or CXCL14. Optionally, the nucleic acid encoding CCL21 and CCL 19 are linked by a 2A peptide linker. Exemplary promoters include, but are not limited to, the CMV promoter, ubiquitin promoter, PGK promoter, and EF1 also promoter. Optionally, provided herein are expression vectors comprising a nucleic acid sequence of SEQ ID NO: 13 or a nucleic acid with 90%, 91%, 92%, 93%, 94%, 95%, 96%, 97%, 98% or 99% identity to SEQ ID NO: 13. Optionally, the nucleic acid is operably linked to a promoter. Optionally, the promoter is selected from the group consisting of SEQ ID NOs: 17, 19, 20 or 21 or a promoter having 90%, 91%, 92%, 93%, 94%, 95%, 96%, 97%, 98% or 99% identity to SEQ ID NOs: 17, 19, 20 or 21. Also provided are expression vectors comprising a nucleic acid sequence of SEQ ID NO: 3 or a nucleic acid with 90%, 91%, 92%, 93%, 94%, 95%, 96%, 97%, 98% or 99% identity to SEQ ID NO: 3. (CCL21) Optionally, the nucleic acid is operably linked to a promoter.

In some embodiments, the provided expression vector comprises SEQ ID NO: 13 or a nucleic acid with 90%, 91%, 92%, 93%, 94%, 95%, 96%, 97%, 98% or 99% identity to SEQ ID NO: 13; SEQ ID NOs: 31 or 62 (CD19 CAR or CD19 scFv) or a nucleic acid with 90%, 91%, 92%, 93%, 94%, 95%, 96%, 97%, 98% or 99% identity to SEQ ID NOs: 31 or 62; SEQ ID NO: 59 (CD16 158V), or a nucleic acid with 90%, 91%, 92%, 93%, 94%, 95%, 96%, 97%, 98% or 99% identity to SEQ ID NO: 59; and/or SEQ ID NO: 24 (erIL-2), or a nucleic acid with 90%, 91%, 92%, 93%, 94%, 95%, 96%, 97%, 98% or 99% identity to SEQ ID NO: 24. In some embodiments, the provided expression vector comprises SEQ ID NO: 15 (CXCR2) or a nucleic acid with 90%, 91%, 92%, 93%, 94%, 95%, 96%, 97%, 98% or 99% identity to SEQ ID NO: 15; SEQ ID NOs: 31 or 62 (CD19 CAR or CD19 scFv) or a nucleic acid with 90%, 91%, 92%, 93%, 94%, 95%, 96%, 97%, 98% or 99% identity to SEQ ID NOs: 31 or 62; and SEQ ID NO: 59 (CD16 158V), and/or a nucleic acid with 90%, 91%, 92%, 93%, 94%, 95%, 96%, 97%, 98% or 99% identity to SEQ ID NO: 59; and/or SEQ ID NO: 24 (erIL-2), or a nucleic acid with 90%, 91%, 92%, 93%, 94%, 95%, 96%, 97%, 98% or 99% identity to SEQ ID NO: 24. Suitable expression vectors are known in the art and can be used. Optionally, the expression vector is a plasmid.

Methods of Making Modified NK-92 Cells

Provided herein are methods of making modified effector cells and target cells described herein. The methods include transforming effector or target cells with an expression vector comprising a nucleic acid described herein operably linked to a promoter.

As used herein, the terms promoter, promoter element, and regulatory sequence refer to a polynucleotide that regulates expression of a selected polynucleotide sequence operably linked to the promoter, and that effects expression of the selected polynucleotide sequence in cells. In some embodiments, a promoter element is or comprises untranslated regions (UTR) in a position 5' of coding sequences. 5' UTRs form part of the mRNA transcript and so are an integral part of protein expression in eukaryotic organisms. Following transcription 5'UTRs can regulate protein expression at both the transcription and translation levels. Promoters controlling transcription from vectors in mammalian host cells may be obtained from various sources, for example, the genomes of viruses such as polyoma, Simian Virus 40 (SV40), adenovirus, retroviruses, hepatitis B virus and cytomegalovirus (e.g., SEQ ID NO: 21), or from heterologous mammalian promoters, e.g. beta actin promoter, Eukaryotic translation elongation factor 1 alpha 1 (EF1α) promoter (e.g., SEQ ID NO: 17), phosphoglycerate kinase (PGK) promoter (e.g., SEQ ID NO: 20) and ubiquitin promoter (e.g., SEQ ID NO: 19). Provided herein are promoters having 90%, 91%, 92%, 93%, 94%, 95%, 96%, 97%, 98% or 99% identity to SEQ ID NOs: 17, 19, 20 or 21.

The phrase selectable marker, as used herein, refers either to a nucleotide sequence, e.g., a gene, that encodes a product (polypeptide) that allows for selection, or to the gene product (e.g., polypeptide) itself. The term selectable marker is used herein as it is generally understood in the art and refers to a marker whose presence within a cell or organism confers a significant growth or survival advantage or disadvantage on the cell or organism under certain defined culture conditions (selective conditions). The phrase selection agent, as used herein refers to an agent that introduces a selective pressure on a cell or populations of cells either in favor of or against the cell or population of cells that bear a selectable marker. For example, the selection agent is an antibiotic and the selectable marker is an antibiotic resistance gene. Examples of suitable selectable markers for mammalian cells are dihydrofolate reductase (DHFR), thymidine kinase, neomycin, neomycin analog G418, hydromycin, and puromycin.

Nucleic acid, as used herein, refers to deoxyribonucleotides or ribonucleotides and polymers and complements thereof. The term includes deoxyribonucleotides or ribonucleotides in either single- or double-stranded form. The term encompasses nucleic acids containing known nucleotide analogs or modified backbone residues or linkages, which are synthetic, naturally occurring, and non-naturally occurring, which have similar binding properties as the reference nucleic acid, and which are metabolized in a manner similar to the reference nucleotides. Examples of such analogs include, without limitation, phosphorothioates, phosphoramidates, methyl phosphonates, chiral-methyl phosphonates, 2-O-methyl ribonucleotides, peptide-nucleic acids (PNAs). Unless otherwise indicated, conservatively modified variants of nucleic acid sequences (e.g., degenerate codon substitutions) and complementary sequences can be used in place of a particular nucleic acid sequence recited herein. Specifically, degenerate codon substitutions may be achieved by generating sequences in which the third position of one or more selected (or all) codons is substituted with mixed-base and/or deoxyinosine residues (Batzer et al., Nucleic Acid Res. 19:5081 (1991); Ohtsuka et al., J. Biol. Chem. 260:2605-2608 (1985); Rossolini et al., Mol. Cell. Probes 8:91-98 (1994)). The term nucleic acid is used interchangeably with gene, cDNA, mRNA, oligonucleotide, and polynucleotide.

A nucleic acid is operably linked when it is placed into a functional relationship with another nucleic acid sequence. For example, DNA that encodes a presequence or secretory leader is operably linked to DNA that encodes a polypeptide if it is expressed as a preprotein that participates in the secretion of the polypeptide; a promoter or enhancer is operably linked to a coding sequence if it affects the transcription of the sequence; or a ribosome binding site is operably linked to a coding sequence if it is positioned so as to facilitate translation. Generally, operably linked means that the DNA sequences being linked are near each other, and, in the case of a secretory leader, contiguous and in reading phase. However, enhancers do not have to be contiguous. For example, a nucleic acid sequence that is operably linked to a second nucleic acid sequence is covalently linked, either directly or indirectly, to such second sequence, although any effective three-dimensional association is acceptable. A single nucleic acid sequence can be operably linked to multiple other sequences. For example, a single promoter can direct transcription of multiple RNA species. Linking can be accomplished by ligation at convenient restriction sites. If such sites do not exist, the synthetic oligonucleotide adaptors or linkers are used in accordance with conventional practice.

Kits

Provided herein are kits comprising the modified effector and target cells described herein. In some embodiments, the kit comprises modified effector cells that express a homing receptor, a cytokine receptor or a chemokine receptor. In some embodiments, the kit comprises modified effector cells that also express a CAR described herein. In some embodiments, the kit comprises modified effector cells comprising one or more nucleic acid sequences encoding i) a homing, cytokine or chemokine receptor, ii) an ABP or CAR that specifically binds to a target antigen, iii) an Fc Receptor such as CD16 or CD16-158V, and/or iv) a cytokine such as erIL-2, operably linked to a promoter. In some embodiments, kit comprises a modified effecctor cell comprising a nucleic acid encoding C-C chemokine receptor type 7 (CCR7), CXCR2, or the receptor for CXCL14 operably linked to a promoter. Optionally, the nucleic acid encoding CCR7 has at least 90%, 91%, 92%, 93%, 94%, 95%, 96%, 97%, 98% or 99% identity to SEQ ID NO: 13. Optionally, the chemokine receptor is expressed on the cell surface of the modified effector cells.

In some embodiments, the kit comprises modified target cells that express a ligand (for example, a cytokine or chemokine that binds to its cognate receptor) expressed by the effector cells. In some embodiments, the modified target cell comprises a nucleic acid encoding C-C motif ligand 21 (CCL21) operably linked to a promoter. Optionally, the nucleic acid encoding CCL21 has at least 90%, 91%, 92%, 93%, 94%, 95%, 96%, 97%, 98% or 99% identity to SEQ ID NO: 3. In some embodiments, the modified target cell comprises a nucleic acid encoding C-C motif ligand 19 (CCL19) operably linked to a promoter. Optionally, the nucleic acid encoding CCL19 has at least 90%, 91%, 92%, 93%, 94%, 95%, 96%, 97%, 98% or 99% identity to SEQ ID NO: 1. Optionally, the promoter drives expression of both CCL21 and CCL19. Optionally, the nucleic acid encoding CCL19 and CCL21 are linked by a 2A peptide linker, for example, SEQ ID NO: 26 or 27. In some embodiments, the kit includes instructions for using the kit components in the methods described herein. The instructions may further contain information regarding how to prepare (e.g., dilute or reconstitute, in the case of freeze-dried protein) the modified effector and target cells (e.g., thawing and/or culturing).

In some embodiments, the kit comprises one or more transwells. In some embodiments, the transwell comprises a porous membrane between the wells. In some embodiments, the membrane comprises an extracellular matrix component or analog that inhibits migration of the effector cell.

Disclosed are materials, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed while, specific references to each various individual and collective combinations and permutations of these compounds may not be explicitly disclosed, each is specifically contemplated and described herein. For example, if a method is disclosed and discussed and a number of modifications that can be made to a number of molecules including the method are discussed, each and every combination and permutation of the method and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed compositions. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

Publications cited herein and the material for which they are cited are hereby specifically incorporated by reference in their entireties.

The examples below are intended to further illustrate certain aspects of the methods and compositions described herein, and are not intended to limit the scope of the claims.

EXAMPLES

Example 1. Modified NK Cell Line Expressing CCR7

Modified NK-92 cells were made by electroporation with a linearized pNKAT-CCR7-LP3 plasmid (FIG. 1) using a NEON™ transfection system. After 1 week of puromycin selection, the resulting polyclonal population was tested for CCR7 expression, and monoclonal cell lines were derived by serial dilution in growth media supplemented with 5% human serum and IL-2. The modified NK-92 cells contained the EF1α promoter, CCR7 Gene with Poly-A tail, and the LoxP flanked puromycin resistance gene driven by the ubiquitin promoter (SEQ ID NO: 19).

Figure 2:
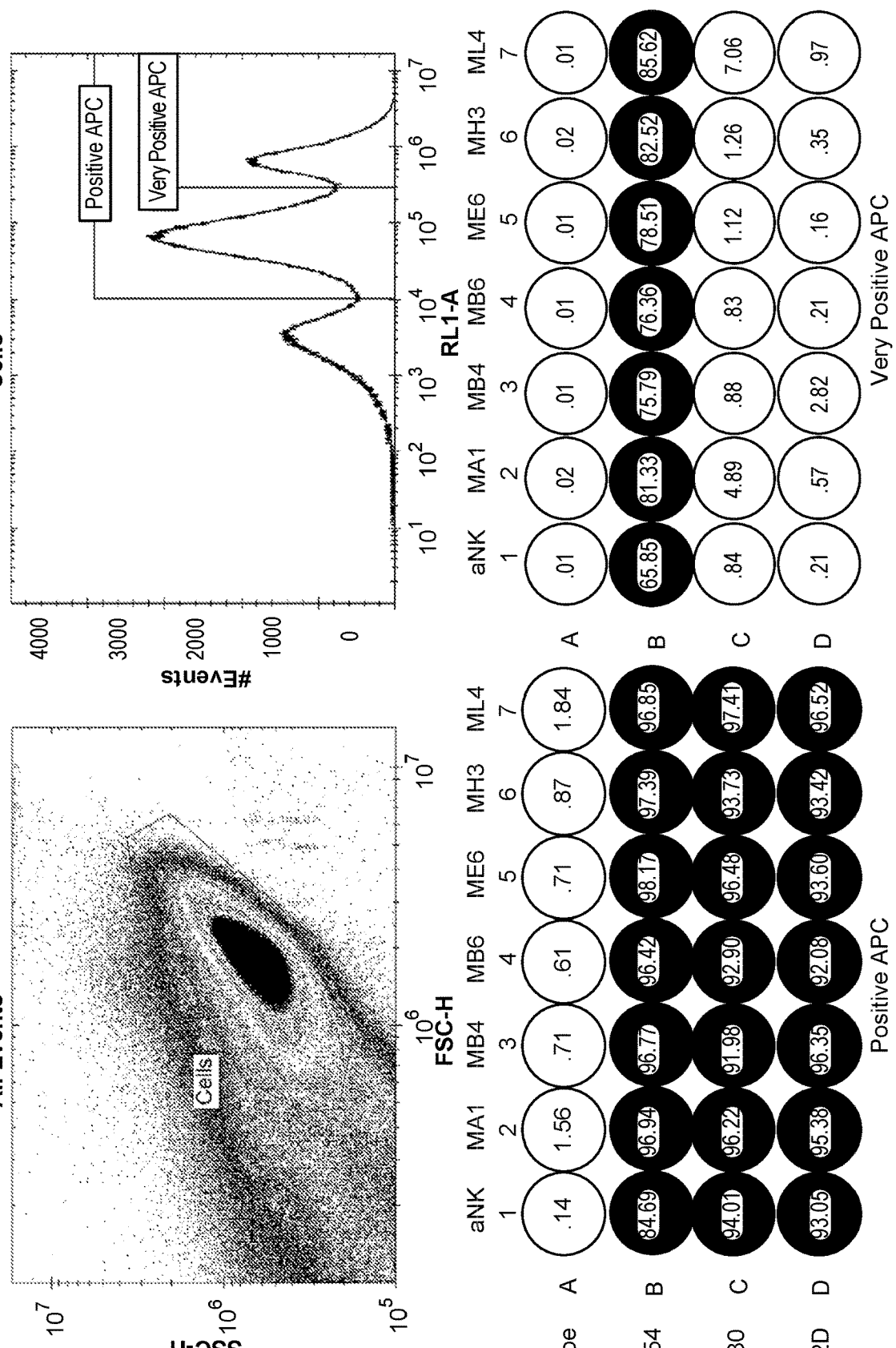
FIG. 2A-D are graphs showing expression of phenotypic markers associated with NK-92 cells (CD54, NKp30, NKG2D) in wild type NK-92 cells and CCR7-expressing NK-92 cells clonal cells.

To verify expression of CCR7 does not affect NK-92 cells, expression of NK-92 cell markers was determined. The results are shown in FIG. 2. The data in FIG. 2 was generated using an Intellicyt iQue screener plus. Cells were incubated at 4° C. for 30 minutes with either APC conjugated antibody against the described phenotypic marker, or appropriate isotype as negative control. Cells were then rinsed in PBS+1% BSA, pelleted, and re-suspended in 30 μL of PBS+1% BSA. The readout was then gated as shown in the upper left quadrant to eliminate cellular debris from the readings, and the percentage of cells above the fluorescence thresholds shown in the upper right quadrant were then displayed as two separate heatmaps, showing the percentage above the "positive" threshold, and the "very positive" threshold in the lower left and lower right quadrants respectively. FIG. 2 shows that driving expression of CCR7 does not meaningfully affect the primary phenotypic markers associated with our cell lines. Specifically, CCR7 expression does not appear to affect CD54, NKp30 or NKG2D expression.

Figure 3:
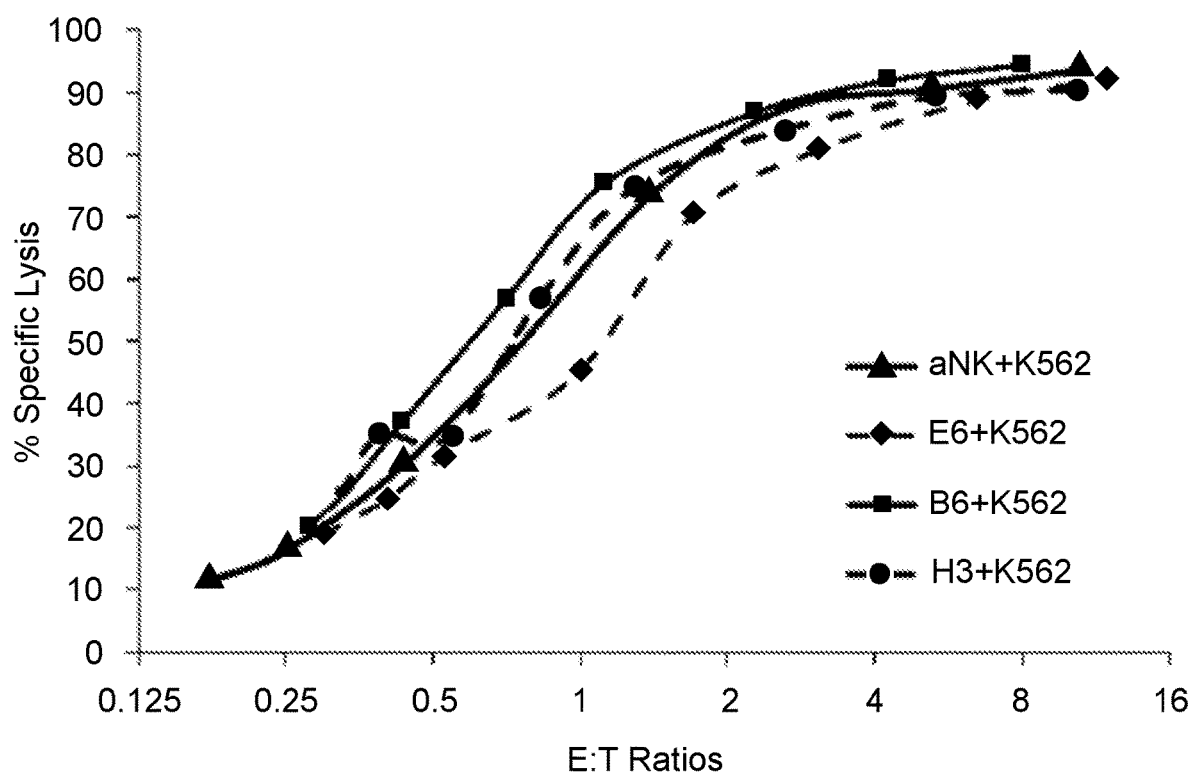
FIG. 3 is a graph showing cytoxic activity of modified NK-92 cells expressing CCR7 against K562 cells.
Figure 4:
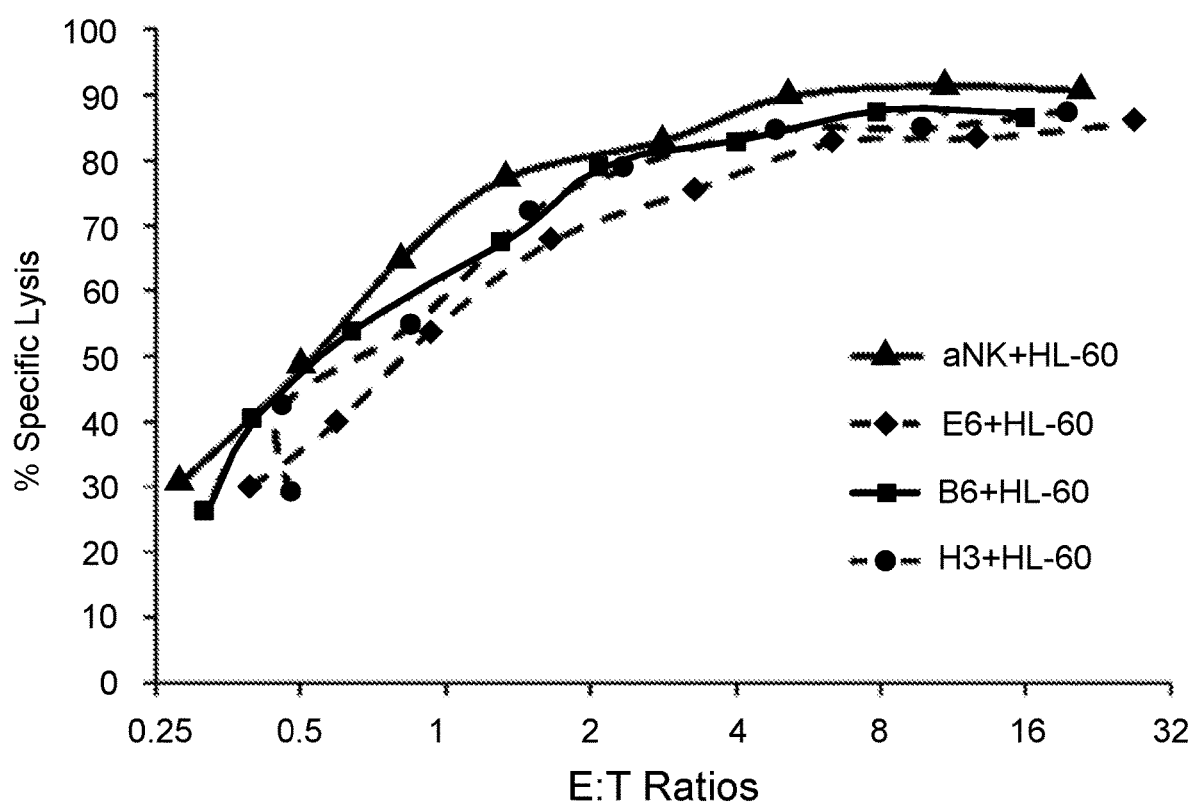
FIG. 4 is a graph showing cytoxic activity of modified NK-92 cells expressing CCR7 against HL-60 cells.

To determine cytotoxicity of the modified NK-92 cells, effector cells (NK-92 cells and modified NK-92 cell clones) were seeded into the left wells of a 96-well V-bottom plate (turned sideways), and then serially diluted across the plate, with 100 k effectors left in the highest concentration well, and with 7 further 2-fold dilutions across the 8 rows of the plate. Stained target cells (K562 (FIG. 4), HL-60 (FIG. 5) were then seeded at 10 k/well in all wells containing effectors, along with control wells of just targets to measure background death. The plate was then briefly spun down and incubated at 37° C. and 5% CO2 for 4 hours. The plate was then spun down, the supernatant aspirated off, and the cells re-suspended in PBS containing propidium iodide to measure cell death. The cells were then run through an Intellicyt iQue screener plus, and the proportion of target cells (differentiated from effectors by their stain) which are also positive for PI staining was measured. The percentage of dead cells was then compared against the number of naturally dying cells in the control wells, and a percentage of cells that are specifically killed by the effectors was calculated. The results are shown in FIGS. 3 and 4. FIG. 3 shows comparable cytotoxicity in CCR7 upregulated clones as compared to parental cell line vs. K562 cells and FIG. 4 shows comparable cytotoxicity in CCR7 upregulated clones as compared to parental cell line vs. HL-60 cells.

Figure 6:
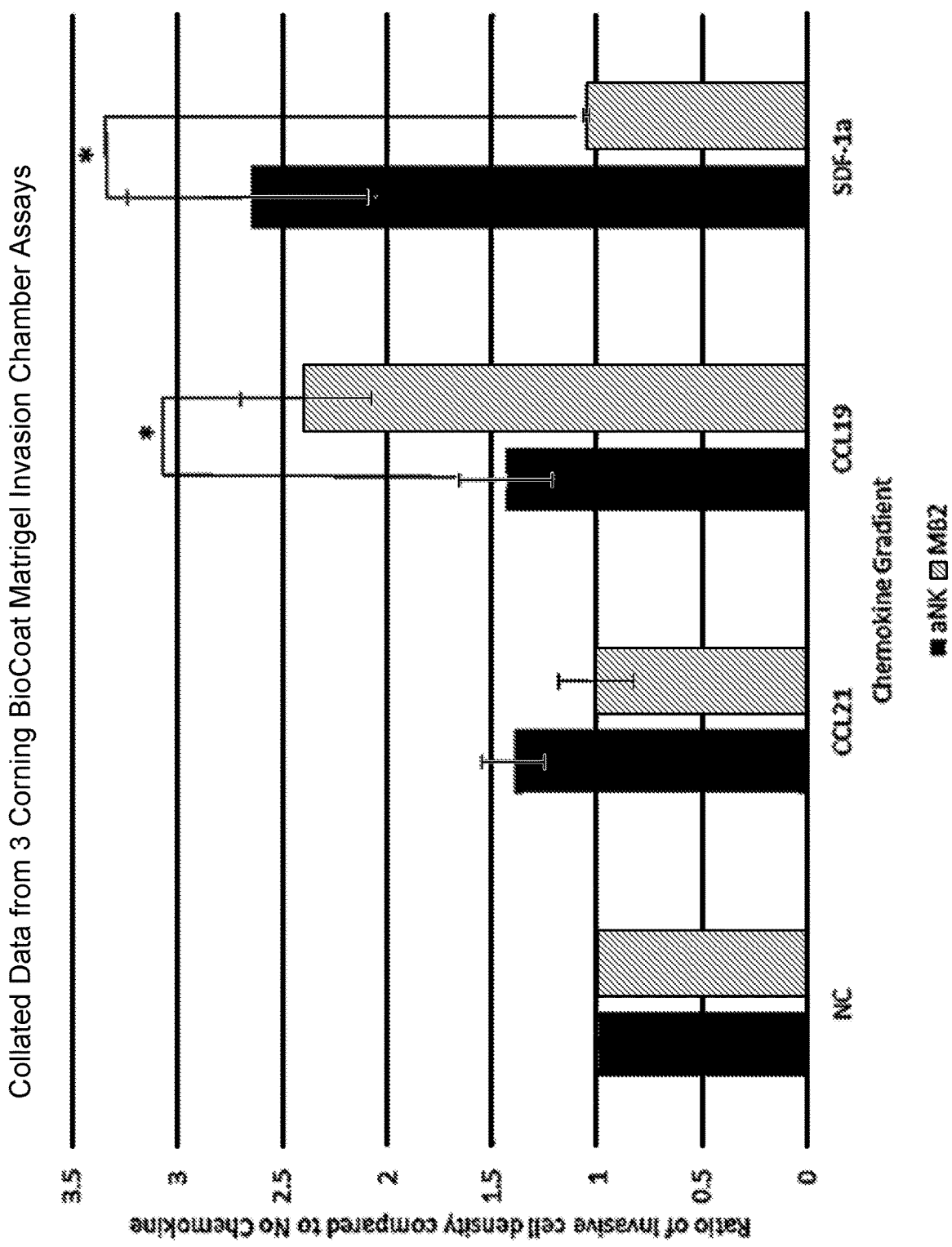
FIG. 6 is a graph showing modified NK-92 cells expressing CCR7 migrated towards the chemokines CCL19 and CCL21.

In vitro testing consisted of using Boyden chamber assays and a Matrigel layer to block migration. The modified cells expressing CCR7 showed migration towards CCL21 and CCL19 (an alternate CCR7 ligand) in these assays. Cells were placed in an upper well, and separated from a lower chamber by a thin layer of Matrigel (an ECM-like substrate) coated on 8 uM pores. The cells (25 k/well) were placed in the upper chamber, in reduced-serum media (supplemented with 1% Human Serum+500 U/mL IL-2), and the same reduced serum medium was used in the lower chamber, either by itself or containing a chemokine of interest. In this case, CCL21 was used at 15 ng/mL, CCL19 was used at 15 ng/ml, and SDF-1a was used at 20 ng/mL. Each test was done in triplicate for either NK-92 cells or modified NK-92 cells expressing CCR7. The plate was then placed in the incubator overnight for an 18 hour invasion assay, after which the upper chambers were removed, and 150 μL (of 750 μL total volume) was sampled from the lower well after thorough mixing and read on a MacsQuant FACS analysis machine. Live cells in the lower chamber were counted, and the number of cells was then compared against the wells containing no chemokine and an invasiveness index number was generated. These numbers were averaged and statistical relevance calculated using a two-tailed t-test. As the lower well was sampled without any detachment of cells from the lower membrane, those cells still attached to the lower portion of the ECM would not be represented in these numbers, likely resulting in the differences between CCL19 and CCL21. The results are shown in FIG. 6. Specifically, FIG. 6 shows statistically significant increases in invasiveness of modified NK-92 cells expressing CCR7 towards CCL19, a CCR7 chemokine. The lack of a statistically significant response to CCL21 is likely due to the nature of the assay performed. The assay measures both invasion and subsequent detachment from the ECM, a behavior consistent with CCL19 gradient migration. CCL21, while inducing migration, does not induce detachment from the matrix, requiring an additional step to demonstrate statistically significant invasive potential.

Example 4: In Vitro Testing of Modified NK Cell Line Expressing CCR7

Figure 5:
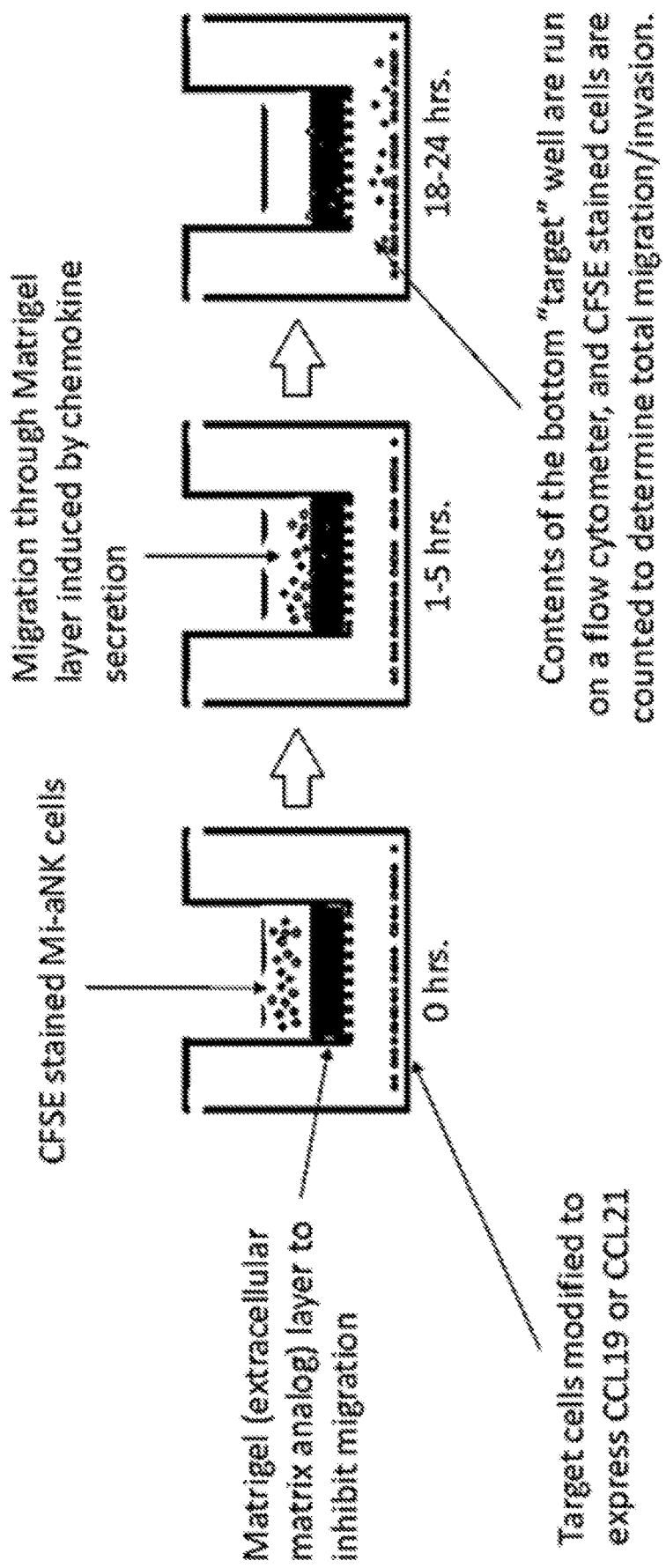
FIG. 5 shows a diagram representing an exemplary method for in vitro testing of the modified NK-92 cells described herein. Activated NK-92 cells (aNK) were modified to express a chemokine receptor (e.g., CCR7), and the target cells were modified to express a chemokine that binds to the receptor (e.g., CCL19 or CCL21). The modified NK-92 cells were tested in a Modified Boyden Chamber Transwell Assay as shown.

FIG. 5 shows the experimental protocol for in vitro testing of modified NK-92 cells transfected with nucleic acid constructs that express CCR7.

Example 5: In Vitro Cytotoxicity Assays Using Modified NK Cell Line Expressing CCR7

Figure 7:
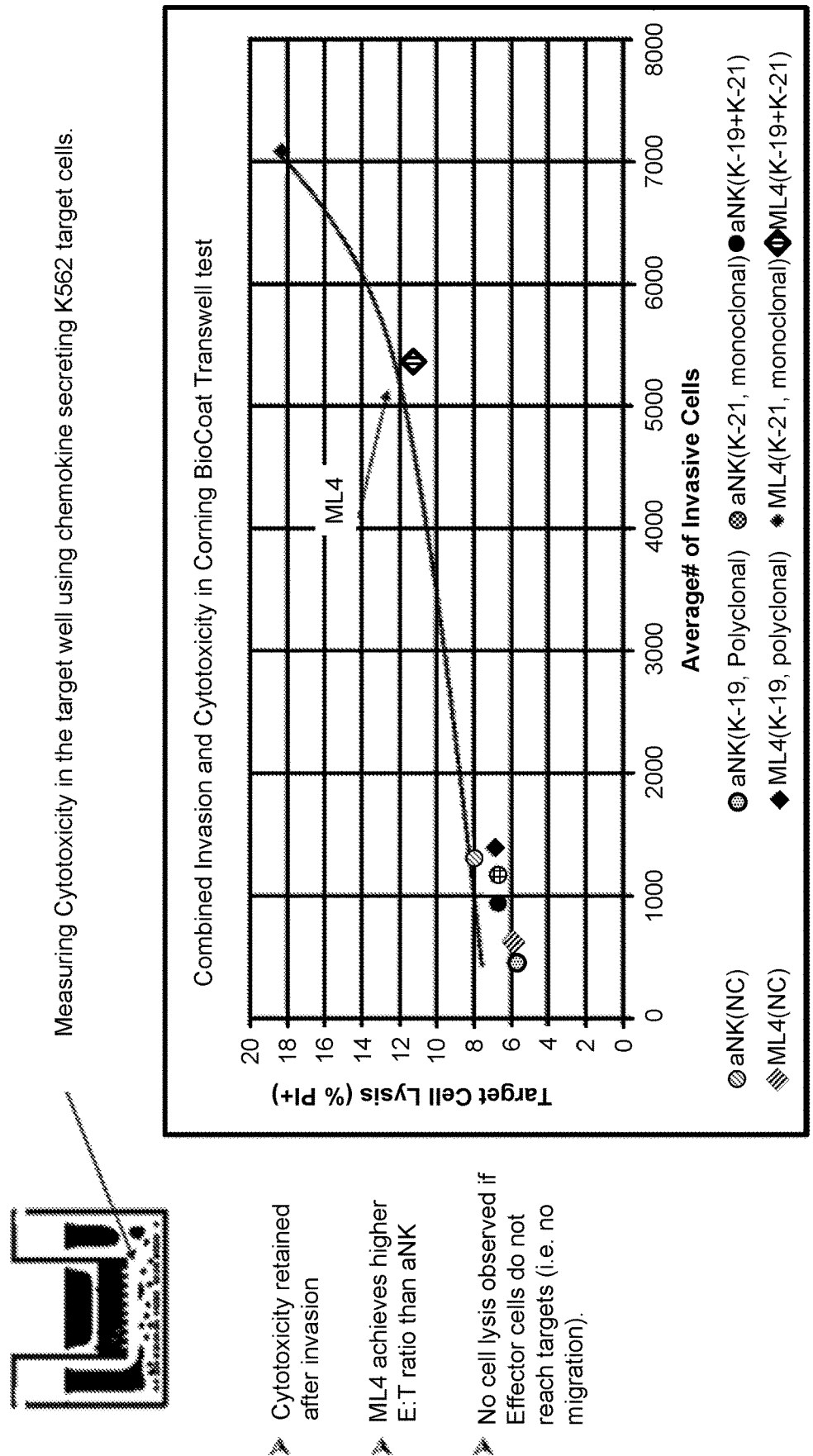
FIG. 7 shows a representative cytotoxicity assay using the modified NK-92 cells described herein. The modified NK-92 cells from FIG. 7 were tested for cytotoxicity against K562 target cells that express and secrete one or both chemokine ligands. The ML4 clone showed the highest percentage of lysis of target cells, and the percentage was increased when the K562 target cells expressed both CCL19 and CCL21.
Figure 8:
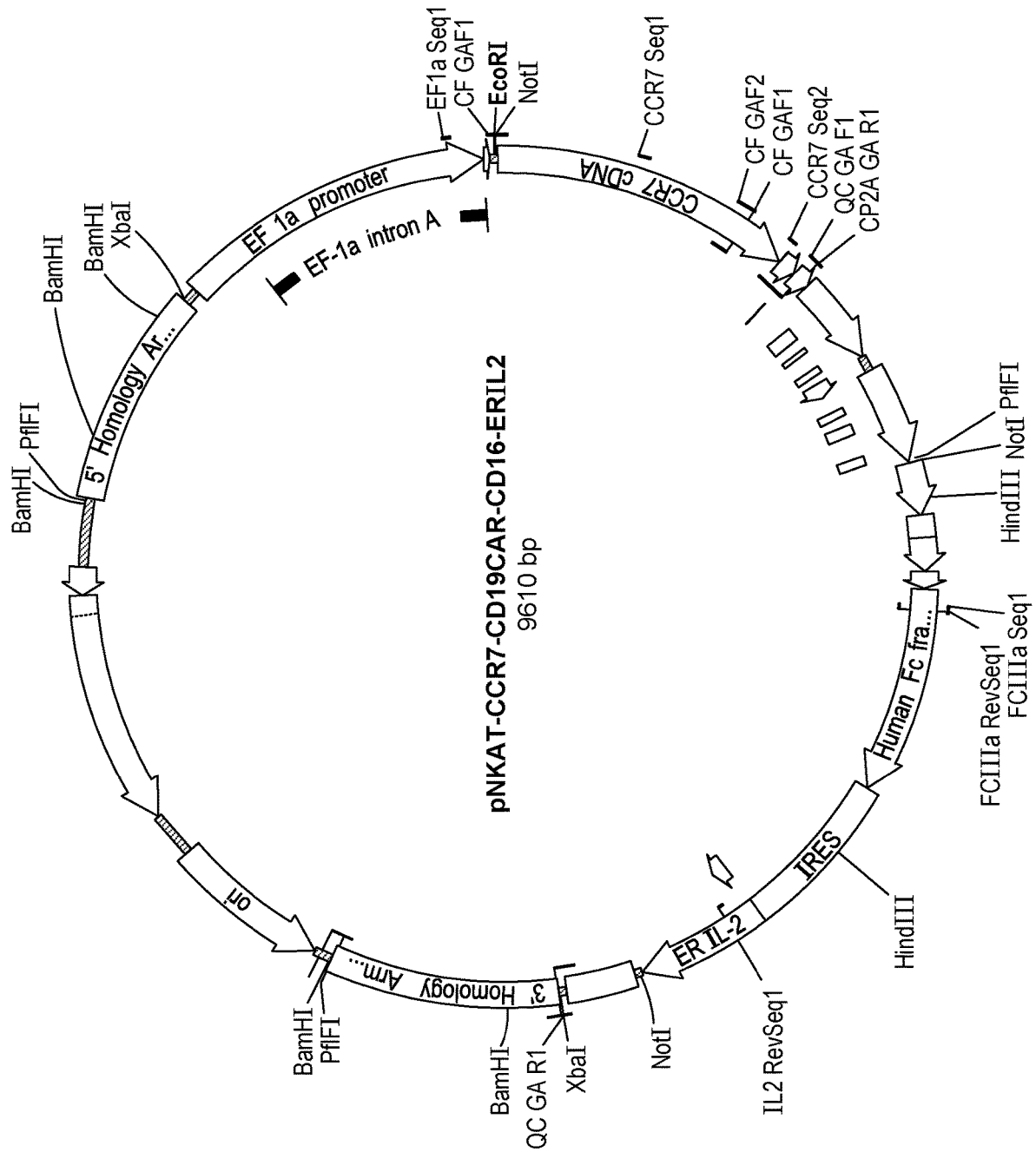
FIG. 8 is a schematic showing plasmid pNKAT-CCR7-CD19CAR-CD16-ERIL2, referred to as a "Quadricistronic Vector," which can be used to stably transfect a cell at a single insertion position.

FIG. 7 shows that NK-92 cells modified to express CCR7 maintain cytotoxicity to target cells after migration in the modified Boyden chamber transwell assay as described in Example 1.

Figure 9:
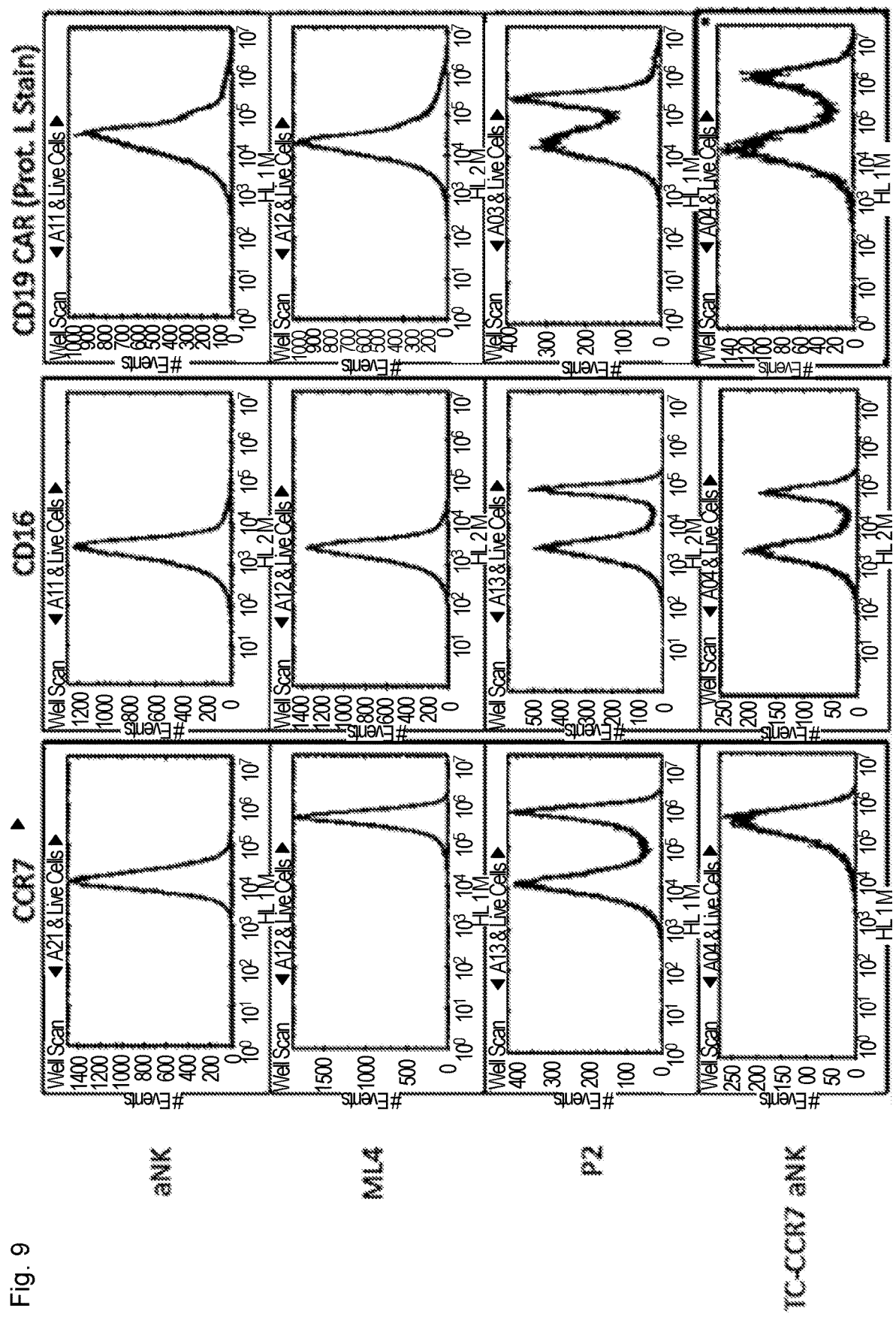
FIG. 9 shows cell surface expression of CCR7, CD16, and CD19 CAR by NK-92 cells. "aNK" is the wild-type NK-92 cell line. "ML4" is the aNK cell line transfected with a nucleic acid construct encoding CCR7 operably linked to a promoter. "P2" is the aNK cell line transfected with a nucleic acid construct that encodes CCR7, CD16, ER-IL2 and CD19 CAR. The nucleic acids encoding i) CCR7, it) CD16 plus ER-IL2, and iii) CD19 CAR were operably linked to the same promoter. "TC-CCR7aNK" is the aNK cell line transfected with a nucleic acid construct that encodes CCR7, CD16, ER-IL2 and CD19 CAR. The nucleic acids encoding i) CCR7 and ii) CD16 plus ER-IL2 plus CD19 CAR were operably linked to different promoters.

Example 6: Cell Surface Expression of CCR7, CD16, and CD19 Car in NK-92 Cells Transfected with Nucleic Acid Constructs FIG. 9 shows that modified NK-92 cells transfected with nucleic acid constructs encoding CCR7, CD16, and CD19 CAR express high levels of the respective proteins on the cell surface.

Example 7: Lysis of Target Cells by NK-92 Cells that Express CCR7, CD16, ER-IL2 and CD19 CAR This Example demonstrates that modified NK-92 cells transfected with nucleic acid constructs encoding CCR7, CD16, ER-IL2 and CD19 CAR efficiently lyse target cells compared to unmodified NK-92, and increase antibody dependent cellular cytotoxicity (ADCC) compared to control cells.

To determine cytotoxicity of the modified NK-92 cells (co-expressing CCR7, CD19 CAR, CD16, and ERIL-2), effector cells (aNK cells and R7-19.1 cell clone) were serially diluted across the plate, with 100 k effectors left in the highest concentration well, and with 7 further 2-fold dilutions across the 8 rows of the plate. CFSE-stained target cells (SUP-B15, or SUP-B15 CD19−/CD20+) were then seeded at 10 k/well in all wells containing effectors, along with control wells of just targets to measure background death. The plate was then briefly spun down and incubated at 37° C. and 5% CO2 for 4 hours. The plate was then centrifuged, the supernatant aspirated off, and the cells re-suspended in PBS containing propidium iodide to measure cell death. The cells were then run through an Intellicyt iQue screener plus, and the proportion of target cells (differentiated from effectors by their stain) which are also positive for PI staining was measured. The percentage of dead cells was then compared against the number of naturally dying cells in the control wells, and a percentage of cells that are specifically killed by the effectors was calculated. To determine ADCC, CFSE-stained SUP-B15 CD19−/

CD20+ target cells were first incubated with rituxan antibody (anti-CD20) or Herceptin antibody (control, anti-HER2/neu) for 20 min before being seeded in the plate containing effectors.

Figure 10:
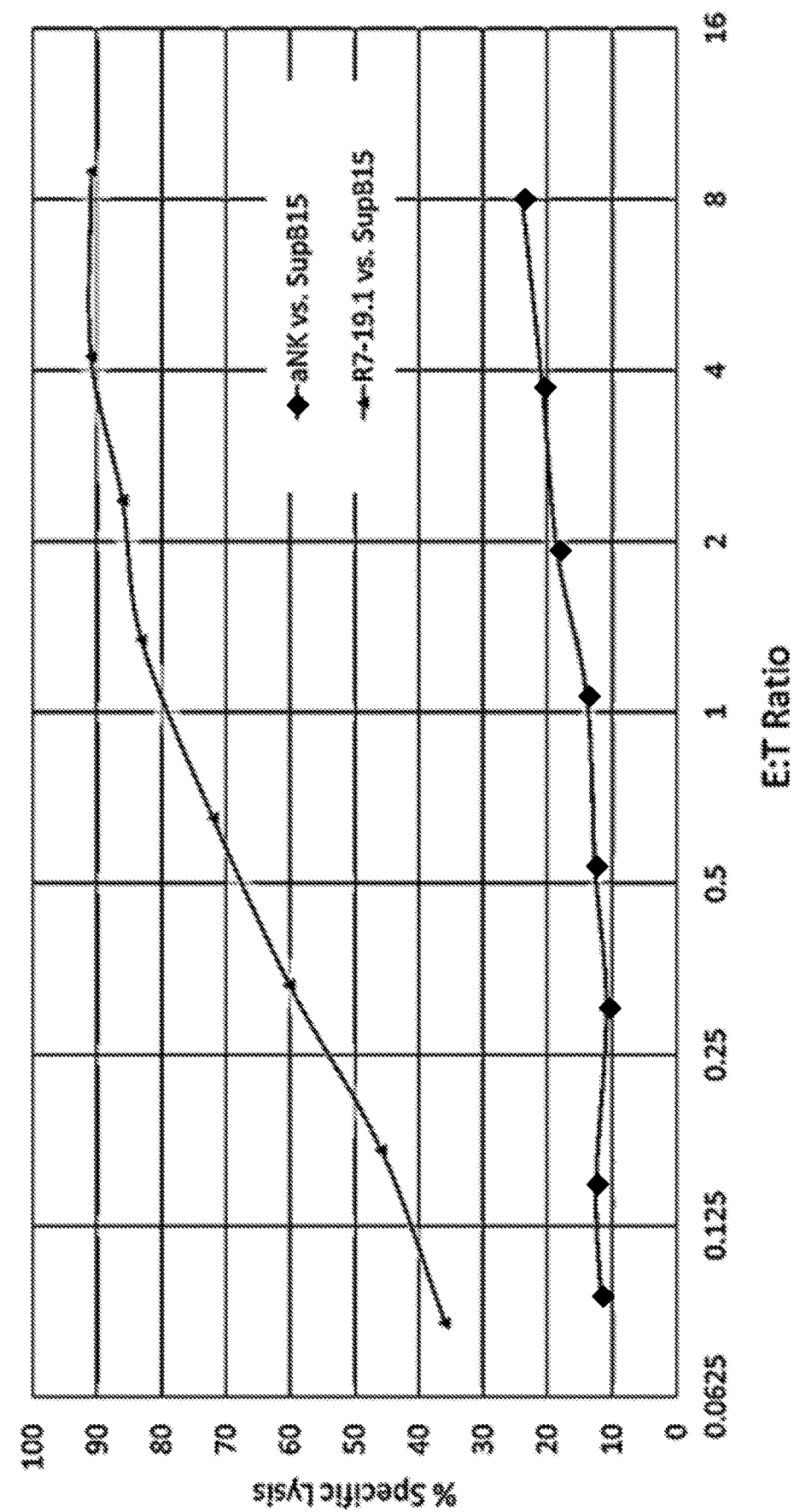
FIG. 10 shows a representative cytotoxicity assay using a modified NK-92 cell line (R7-19.1) transfected with a nucleic acid construct that encodes CCR7, CD16, ER-IL2 and CD19 CAR, compared to an unmodified NK-92 cell (aNK). Lysis of SUP-B15 target cells was greatly increased using the R7-19.1 cell line compared to unmodified NK-92 cells.

FIG. 10 shows a representative cytotoxicity assay using a modified NK-92 cell line (R7-19.1) transfected with a nucleic acid construct that encodes CCR7, CD16, ER-IL2 and CD19 CAR, compared to an unmodified NK-92 cell (aNK). Lysis of the CD19+, NK-resistant SUP-B15 target cells was greatly increased using the R7-19.1 cell line compared to unmodified NK-92 cells.

Figure 11A:
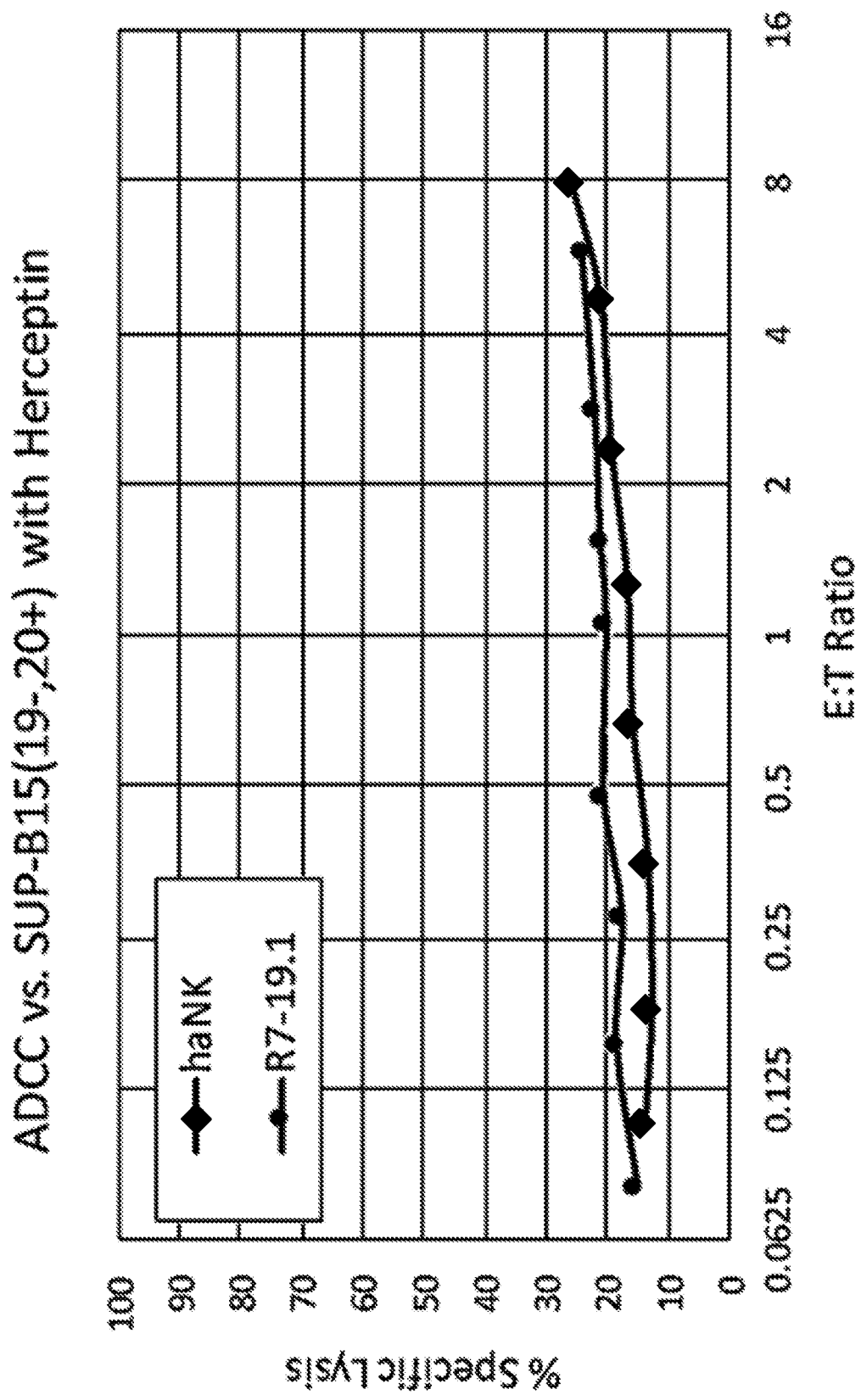
FIGS. 11A and 11B show antibody dependent cellular cytotoxicity (ADCC) assays using the R7-19.1 cell line in combination with Herceptin (FIG. 11A) and Rituxumab (FIG. 11B) versus SUP-B15 (CD19−, CD20+) target cells.
Figure 11B:
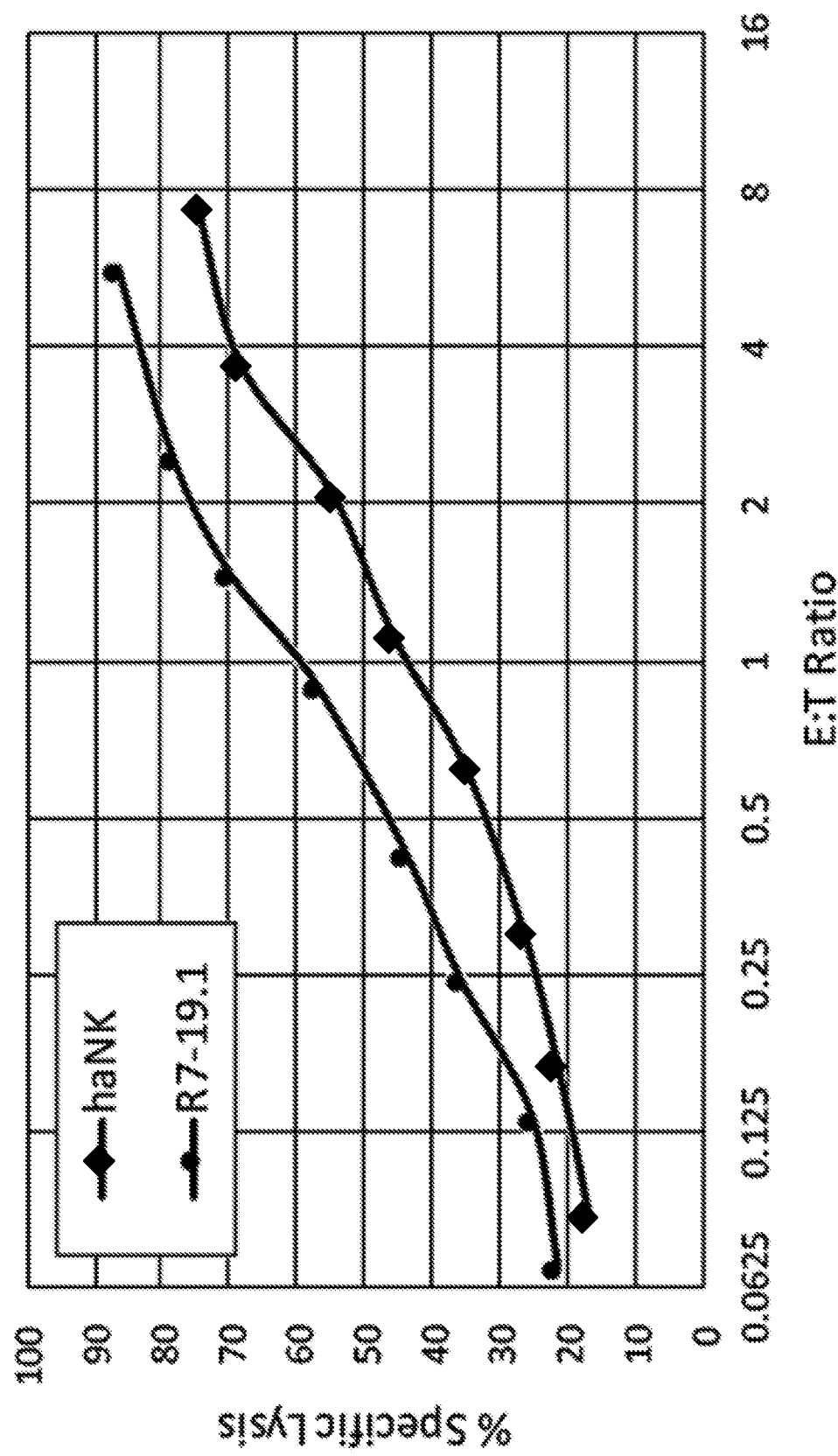

FIGS. 11A and 11B show ADCC assays using the modified R7-19.1 NK-92 cell line in combination with Herceptin (FIG. 11A) and Rituxumab (FIG. 11B). The target cells are a variant of SUP-B15 cells that do not express CD19 (CD19−), but do express CD20 (CD20+). As can be seen in FIG. 11A, no increase in ADCC was observed with Herceptin compared to control haNK cells that express CD16. In contrast, there was an increase in ADCC with Rituxumab, which binds CD20, for both the R7-19.1 cell line and control haNK cells, and the R7-19.1 cell line showed increased cytotoxicity compared to control cells.

It is understood that the examples and embodiments described herein are for illustrative purposes only and that various modifications or changes in light thereof will be suggested to persons skilled in the art and are to be included within the spirit and purview of this application and scope of the appended claims. All publications, sequence accession numbers, patents, and patent applications cited herein are hereby incorporated by reference in their entirety for all purposes.

What is claimed is:

1. A method for detecting migration and cytotoxicity of effector cells, the method comprising:
   providing a device comprising two or more chambers, wherein at least a first chamber is separated by a membrane from a second chamber, the membrane comprising pores having a diameter that permits cells to pass through the membrane;
   adding effector cells to the first chamber, wherein the effector cell is modified to express a homing receptor, wherein the homing receptor is CCR7;
   adding target cells to the second chamber, wherein the target cell is modified to express a ligand that binds to the homing receptor;
   allowing the effector cells to migrate from the first chamber to the second chamber; and
   measuring the number of target cells killed by the effector cells in the second chamber, wherein the effector cells are NK-92 cells.

2. The method of claim 1, wherein the first chamber is located above the second chamber.

3. The method of claim 1, wherein the membrane comprises an extra-cellular matrix component or analog that inhibits migration of the effector cell.

4. The method of claim 1, wherein the effector cell is stained with a vital dye.

5. The method of claim 1, wherein the method further comprises determining the number of effector cells that migrated into the second chamber.

6. The method of claim 1, wherein the ligand expressed by the target cell is selected from C-C Motif Chemokine Ligand 19 (CCL19 (SEQ ID NO: 2)), C-C Motif Chemokine Ligand 21 (CCL21 (SEQ ID NO: 4)), interleukin 8 (IL8 or CXCL8 (SEQ ID NO: 6)), C-X-C motif chemokine ligand 1 (CXCL1 (SEQ ID NO: 8)), or C-X-C Motif Chemokine Ligand 14 (CXCL14 (SEQ ID NO: 10)).

7. The method of claim 1, wherein the amino acid sequence of CCR7 has at least 90% identity to SEQ ID NO: 14, and the effector cell is capable of migrating towards the ligand expressed by the target cell.

8. The method of claim 1, wherein the effector cell is further modified to express a chimeric antigen receptor (CAR) and wherein the CAR specifically binds:

i) CD19 and comprises an amino acid sequence selected from SEQ ID NOs: 46, 47, or 63; or
ii) CD20 and comprises an amino acid sequence of SEQ ID NO: 65; or
iii) GD2 and comprises an amino acid sequence selected from SEQ ID NOs: 80 or 81; or
iv) HER-2 and comprises an amino acid sequence of SEQ ID NO: 77; or
v) CD30 and comprises an amino acid sequence of SEQ ID NO: 75; or
vi) EGFR and comprises an amino acid sequence of SEQ ID NO: 71; or
vii) FAP and comprises an amino acid sequence selected from SEQ ID NOs: 95 or 96; or
viii) CD33 and comprises an amino acid sequence of SEQ ID NO: 67; or
ix) CD123 and comprises an amino acid sequence of SEQ ID NO: 86; or
x) PD-L1 and comprises an amino acid sequence of SEQ ID NO: 88); or
xi) IGF1R and comprises an amino acid sequence of SEQ ID NO: 73; or
xii) CSPG4 and comprises an amino acid sequence of SEQ ID NO: 69; or
xiii) B7-H4 and comprises an amino acid sequence of SEQ ID NO: 90.

9. The method of claim 8, wherein the CAR specifically binds CD19, or comprises an amino acid sequence having at least 90% identity to SEQ ID NO: 46, 47, or 63, and the target cell is killed by the effector cell.

10. The method of claim 8, wherein the CAR comprises an Fc Epsilon signaling domain.

11. The method of claim 1, wherein the effector cell comprises a nucleic acid encoding a chemokine receptor operably linked to a promoter.

12. The method of claim 1, wherein the target cell comprises a nucleic acid encoding a chemokine operably linked to a promoter.

13. The method of claim 1, wherein the ligand expressed by the target cell is a ligand that binds CD62L (SEQ ID NO: 12).

* * * * *